US012274402B2

(12) United States Patent
Chung et al.

(10) Patent No.: US 12,274,402 B2
(45) **Date of Patent: *Apr. 15, 2025**

(54) TOILET

(71) Applicant: Kohler Co., Kohler, WI (US)

(72) Inventors: Chanseol Chung, Milwaukee, WI (US); Karger D. Kohler, Kohler, WI (US); Daniel N. Halloran, Fredonia, WI (US); Jeffrey T. Laundre, Sheboygan, WI (US); Keith E. Muellenbach, Sheboygan, WI (US); Jennifer Tarplee, Sheboygan, WI (US); Craig Loest, Kohler, WI (US)

(73) Assignee: Kohler Co., Kohler, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/390,616

(22) Filed: Dec. 20, 2023

(65) Prior Publication Data

US 2024/0115089 A1 Apr. 11, 2024

Related U.S. Application Data

(63) Continuation of application No. 18/233,588, filed on Aug. 14, 2023, now Pat. No. 12,121,189, which is a (Continued)

(51) Int. Cl.

*A47K 13/24* (2006.01)
*A47K 13/10* (2006.01)

(Continued)

(52) U.S. Cl.

CPC ............ *A47K 13/247* (2013.01); *A47K 13/10* (2013.01); *A47K 13/12* (2013.01); *A47K 13/28* (2013.01);

(Continued)

(58) Field of Classification Search

CPC ...... A47K 13/247; A47K 13/10; A47K 13/12; A47K 13/28; A47K 13/242; A47K 13/245;

(Continued)

(56) References Cited

U.S. PATENT DOCUMENTS

| | | | |
|---|---|---|---|
| 4,709,426 | A | 12/1987 | Godwin, Jr. |
| 4,951,328 | A | 8/1990 | Potvin |

(Continued)

FOREIGN PATENT DOCUMENTS

| | | | |
|---|---|---|---|
| CN | 101021080 | A | 8/2007 |
| CN | 201183978 | Y | 1/2009 |

(Continued)

OTHER PUBLICATIONS

Chinese Office Action for Chinese App. No. 201980037797.3 mailed Sep. 22, 2021.

(Continued)

*Primary Examiner* — Lori L Baker

(74) *Attorney, Agent, or Firm* — Lempia Summerfield Katz LLC

(57) ABSTRACT

A toilet includes a base, a cover, and a seat. The seat is rotatably coupled to the base, and the cover is rotatably coupled to the seat. The cover and the seat define an angled axis that is oriented upward and forward toward a front end of the base. The cover and the seat are each configured to rotate about the angled axis between a lowered position in which the cover and the seat are located adjacent the base and a stowed position in which the cover and the seat are oriented in an upward direction.

20 Claims, 44 Drawing Sheets

Related U.S. Application Data continuation of application No. 17/985,461, filed on Nov. 11, 2022, now Pat. No. 11,759,065, which is a continuation of application No. 17/322,335, filed on May 17, 2021, now Pat. No. 11,529,030, which is a continuation of application No. 17/046,506, filed as application No. PCT/US2019/026727 on Apr. 10, 2019, now Pat. No. 11,039,719.

(60) Provisional application No. 62/655,904, filed on Apr. 11, 2018.

(51) Int. Cl.
*A47K 13/12* (2006.01)
*A47K 13/28* (2006.01)
*A61G 5/14* (2006.01)

(52) U.S. Cl.
CPC .......... *A47K 13/242* (2013.01); *A47K 13/245* (2013.01); *A61G 5/14* (2013.01)

(58) Field of Classification Search
CPC ...... A47K 13/305; A61G 5/14; A61G 7/1007; A61G 7/1019
USPC ................. 4/246.1, 246.2, 246.3, 241, 243.1
See application file for complete search history.

(56) References Cited

U.S. PATENT DOCUMENTS

| | | | | |
|---|---|---|---|---|
| 6,754,917 | B1 | 6/2004 | Rhoades | |
| 6,772,452 | B1 | 8/2004 | Miller et al. | |
| 8,646,123 | B1 | 2/2014 | Potvin | |
| 9,486,119 | B2 * | 11/2016 | Laundre | A47K 13/04 |
| 11,039,719 | B2 * | 6/2021 | Chung | A47K 13/10 |
| 2001/0047542 | A1 | 12/2001 | Luckenbill | |
| 2007/0273182 | A1 | 11/2007 | Allmann | |
| 2009/0235450 | A1 | 9/2009 | Nugent | |
| 2009/0313753 | A1 | 12/2009 | Campbell | |
| 2010/0083431 | A1 | 4/2010 | Hallett | |
| 2010/0095453 | A1 | 4/2010 | Lin | |
| 2010/0275353 | A1 | 11/2010 | Gong | |
| 2012/0151665 | A1 | 6/2012 | Leibfried | |
| 2015/0257956 | A1 | 9/2015 | Wang | |
| 2020/0277775 | A1 | 9/2020 | Halloran et al. | |
| 2020/0390297 | A1 * | 12/2020 | Hall | A47K 13/105 |
| 2022/0074182 | A1 | 3/2022 | Garrels et al. | |

FOREIGN PATENT DOCUMENTS

| | | | | |
|---|---|---|---|---|
| CN | 101600318 | A | 12/2009 | |
| CN | 101715313 | A | 5/2010 | |
| CN | 101764861 | A | 6/2010 | |
| CN | 102637718 | A | 8/2012 | |
| CN | 102805591 | A | 12/2012 | |
| CN | 102973198 | A | 3/2013 | |
| CN | 103046631 | A | 4/2013 | |
| CN | 103202623 | A | 7/2013 | |
| CN | 105799563 | A | 7/2016 | |
| CN | 109281362 | A | 1/2019 | |
| DE | 29713014 | U1 | 9/1997 | |
| DE | 102010010306 | B4 | 9/2012 | |
| EP | 0474576 | A1 | 3/1992 | |
| EP | 4420580 | A1 * | 8/2024 | A47K 13/10 |
| JP | 2010229738 | A | 10/2010 | |
| KR | 100858410 | B1 | 9/2008 | |
| KR | 20100105062 | A | 9/2010 | |
| KR | 20190000315 | U * | 2/2019 | A47K 13/10 |
| TW | 201306779 | A | 2/2013 | |
| WO | WO-2023038511 | A1 * | 3/2023 | A47K 13/10 |

OTHER PUBLICATIONS

European Search Report for European Application No. 19785431.8-1005 dated Nov. 23, 2021.

Indian Office Action for Indian Patent Application No. 202017043998 dispatched Apr. 22, 2021.

PCT International Search Report and Written Opinion of International Searching Authority, corresponding to PCT International Application No. PCT/US 19/26727 mailed Jun. 26, 2019.

Extended European Search Report from European Patent Application No. 24168306.9, dated May 24, 2024, 9 pages.

* cited by examiner

TOILET

CROSS-REFERENCE TO RELATED APPLICATION

This application is a continuation under 37 C.F.R. § 1.53(b) and 35 U.S.C. § 120 of U.S. patent application Ser. No. 18/233,588 filed Aug. 14, 2023, which is a continuation of U.S. patent application Ser. No. 17/985,461 filed Nov. 11, 2022, which is a continuation of U.S. patent application Ser. No. 17/322,335 filed May 17, 2021, which is a continuation of Ser. No. 17/046,506 filed Oct. 9, 2020, which is a § 371 nationalization of PCT Application Serial No. PCT/US19/26727, filed Apr. 10, 2019, which claims the benefit of and priority to U.S. Provisional Application No. 62/655,904, filed Apr. 11, 2018, the entire disclosure of each is hereby incorporated by reference herein.

BACKGROUND

The present disclosure relates generally to toilets. More specifically, the present disclosure relates to toilets having features that improve the cleanliness, maintenance, and use thereof.

SUMMARY

At least one embodiment relates to a toilet. The toilet includes a base, a cover, and a seat. The seat is rotatably coupled to the base, and the cover is rotatably coupled to the seat. The cover and the seat define an angled axis that is oriented upward and forward toward a front end of the base. The cover and the seat are each configured to rotate about the angled axis between a lowered position in which the cover and the seat are located adjacent the base and a stowed position in which the cover and the seat are oriented in an upward direction away from the base.

Another embodiment relates to a toilet. The toilet includes a base, a cover, a seat, and a housing. The seat is rotatably coupled to the housing, and the cover is rotatably coupled to the seat. The housing is detachably coupled to the base. The cover and the seat are each configured to rotate about an angled axis between a lowered position in which the cover and the seat are located adjacent the base and a stowed position in which the cover and the seat are oriented in an upward direction away from the base. The angled axis is oriented upward and forward toward a front end of the base.

Yet another embodiment relates to a toilet. The toilet includes a base, a cover, and a seat. The seat is rotatably coupled to the base, and the cover is rotatably coupled to the seat. The cover and the seat define an angled axis that is oriented upward and forward toward a front end of the base. The cover and the seat are each configured to rotate about the angled axis between a lowered position and a stowed position. The cover and the seat are each further configured to translate axially along the angled axis relative to the base to assist a user with standing from a seated position on the seat.

In some exemplary embodiments, the seat is configured to rotate between the lowered position and the stowed position while the cover is in the lowered position.

In some exemplary embodiments, the cover includes an elongated member extending outwardly away from a bottom surface of the cover, and the elongated member defines the angled axis of the cover.

In some exemplary embodiments, the seat includes a hollow elongated member extending from a bottom surface of the seat, and the elongated member of the cover is at least partially received in, and rotatably coupled to, the hollow elongated member of the seat.

In some exemplary embodiments, the toilet further comprises a housing, wherein the cover and the seat are each rotatably coupled to the housing, and wherein the housing is detachably coupled to the base to rotatably couple the cover and the seat to the base.

In some exemplary embodiments, the cover and the seat are each configured to translate axially along the angled axis relative to the base to assist a user with standing from a seated position on the seat.

In some exemplary embodiments, the cover includes a top surface having a substantially convex portion, and wherein the top surface faces toward the front end of the base when the cover is at the stowed position.

In some exemplary embodiments, the toilet further comprises a motor operatively coupled to the seat and the cover, wherein the motor is configured to automatically rotate the seat and the cover between the lowered position and the stowed position in response to a user input.

Those skilled in the art will appreciate that this summary is illustrative only and is not intended to be in any way limiting.

BRIEF DESCRIPTION OF THE DRAWINGS

Further features, characteristics, and advantages of the present disclosure will become apparent to a person of ordinary skill in the art from the following detailed description of embodiments of the present disclosure, made with reference to the drawings annexed, in which like reference characters refer to like elements.

DETAILED DESCRIPTION

Figure 2:
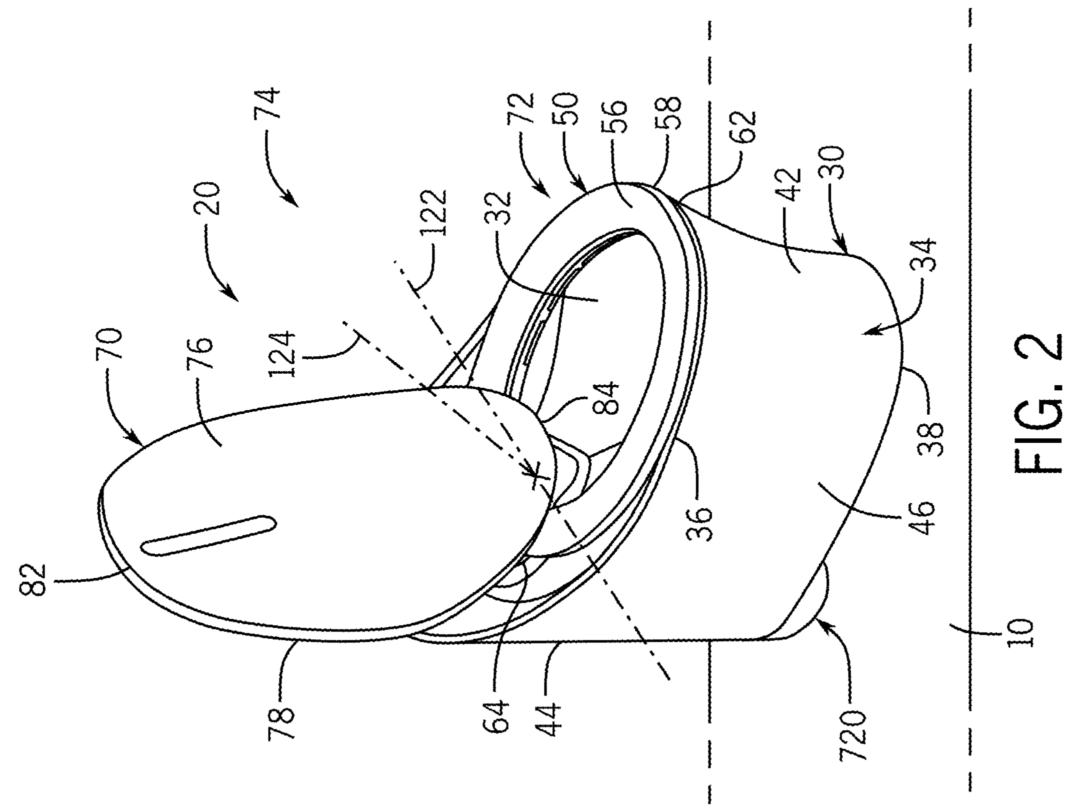
FIG. 2 is a perspective view of the toilet of FIG. 1 with the cover in a stowed position and the seat in a lowered position.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Various aspects of the disclosure will now be described with regard to certain examples and embodiments, which are intended to illustrate but not to limit the disclosure. Nothing in this disclosure is intended to imply that any particular feature or characteristic of the disclosed embodiments is essential. The scope of protection is not defined by any particular embodiment described herein.

Referring generally to the figures, disclosed herein are toilets (referred to herein as a toilet 20 and a toilet 20') that include structural features, components, and integrated systems that can provide for a cleaner and more hygienic user experience, as compared to some conventional toilets. For example, the various components, features, and configuration of the toilets 20,20', as described further herein, allow the toilets 20,20' to help maintain their cleanliness, look cleaner, and have a more simplified, elegant, and hygienic structure, as compared to some conventional toilets. The various features described herein (e.g., the opening mechanisms 120,120', the vacuum mechanism 220, the heating mechanism 420, the flush mechanisms 620,620', and the bidet mechanisms 840,840', etc.) can, advantageously, be activated automatically to provide for an enhanced user experience. Furthermore, various features allow each of the toilets 20,20' to operate as an intelligent toilet to suit a user's needs.

It should be noted that the toilets 20,20' described herein are configured to have similar structural features, components, functions, and integrated systems. Accordingly, for the sake of brevity, the following description focuses primarily on the various features and functions of the toilet 20, but it should be appreciated that these features and functions may also apply to the toilet 20' and vice versa, except where noted otherwise.

Toilet Cover and Seat Opening Mechanism

In some conventional toilets, the toilet covers and seats are typically hingeably attached to a portion of a toilet base, such that a user can raise the front of each of the cover and the seat from a closed or lowered position to an open or stowed position. The cover and the seat each pivot about a horizontal axis between the lowered position and the stowed position. However, it is often difficult to maintain both the cleanliness of the toilet, particularly at the hinge location, and the overall look and aesthetics of the toilet with this traditional configuration and movement.

Figure 1:
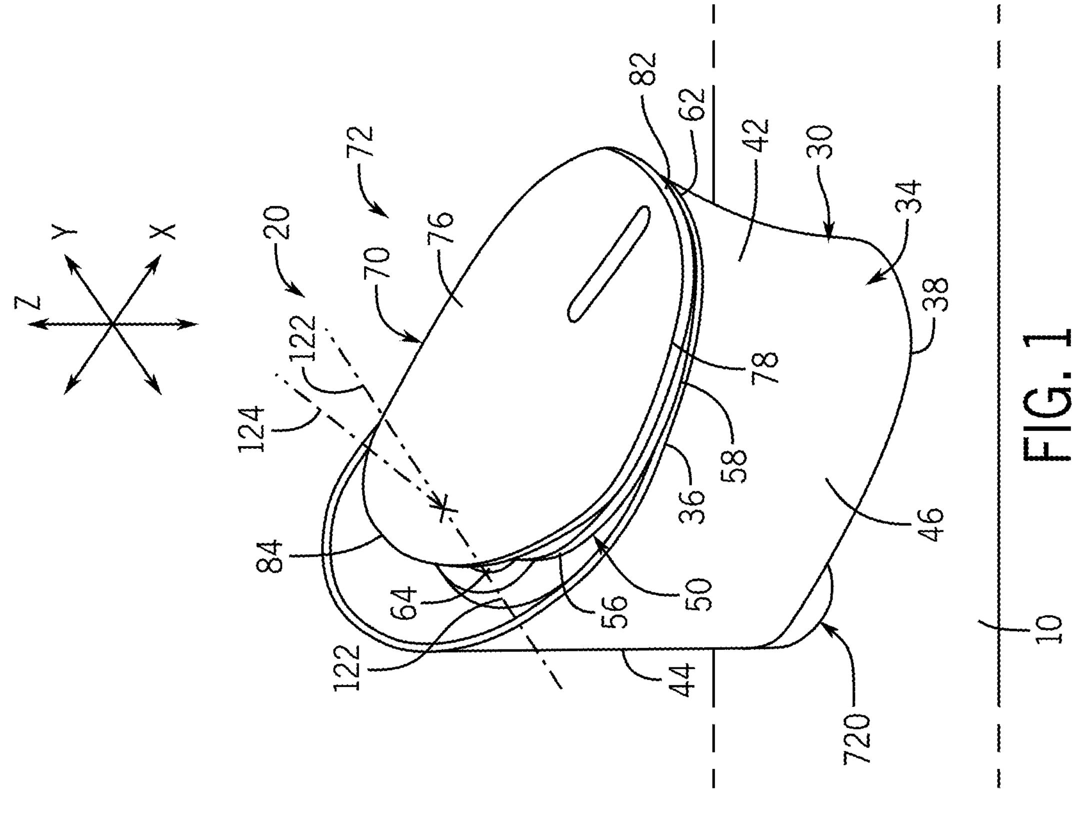
FIG. 1 is a perspective view of a toilet according to an exemplary embodiment.
Figure 4:
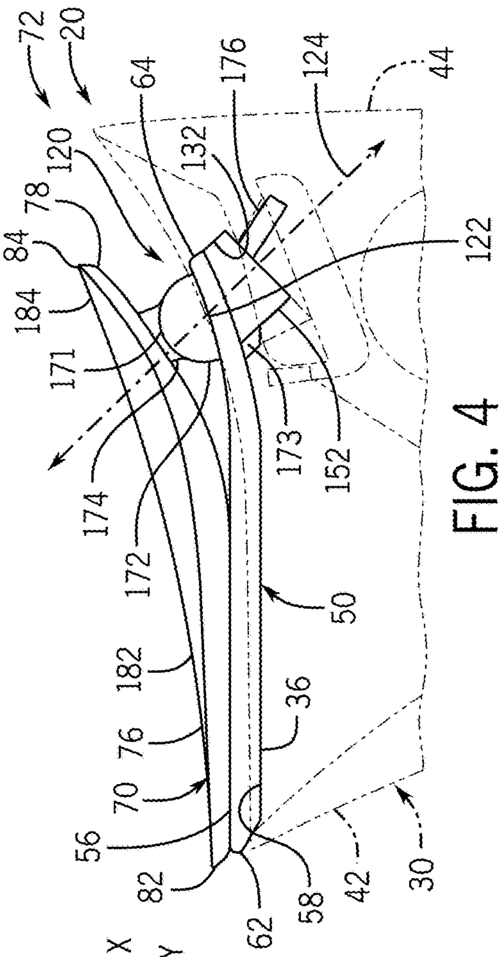
FIG. 4 is a side view of the toilet of FIG. 1 with the cover and the seat in the lowered position.
Figure 5:
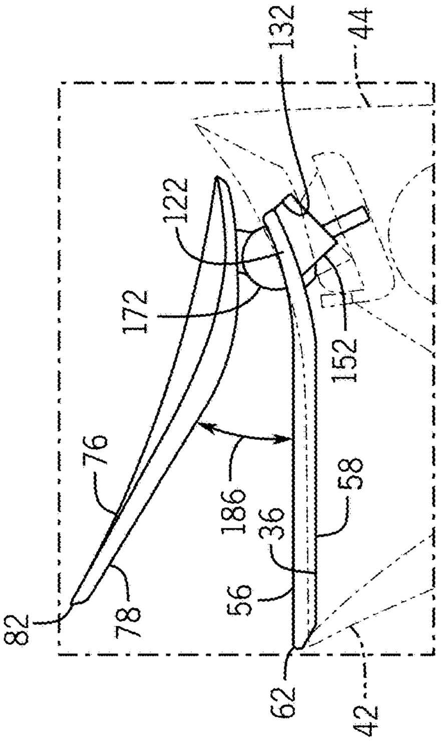
FIGS. 5-10 are side, partially-transparent views of the toilet of FIG. 1 with the cover and the seat being moved from the lowered position to the stowed position.
Figure 3:
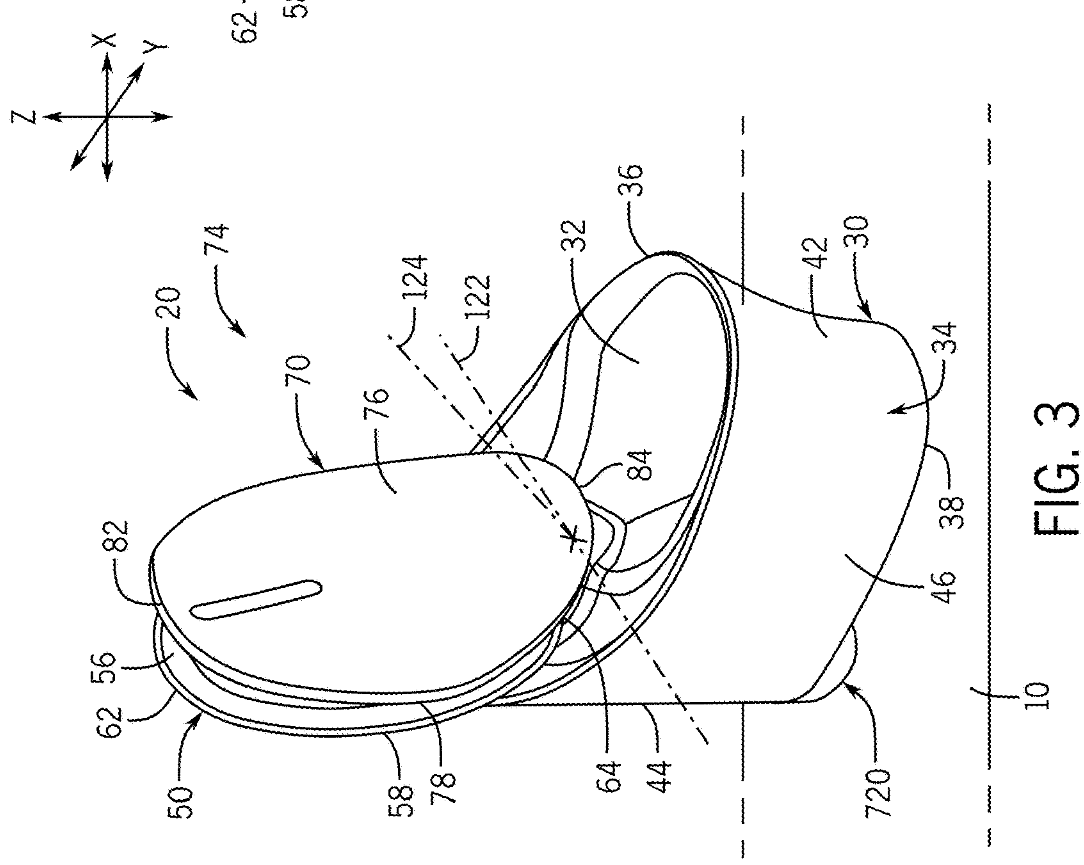
FIG. 3 is a perspective view of the toilet of FIG. 1 with the cover and the seat in the stowed position.
Figure 6:
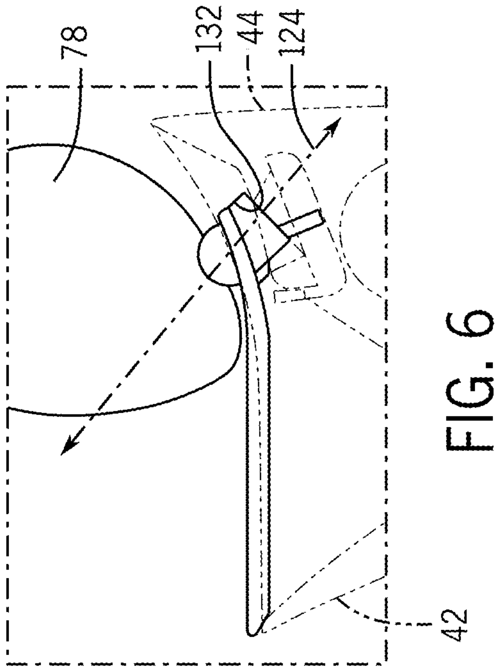
Figure 7:
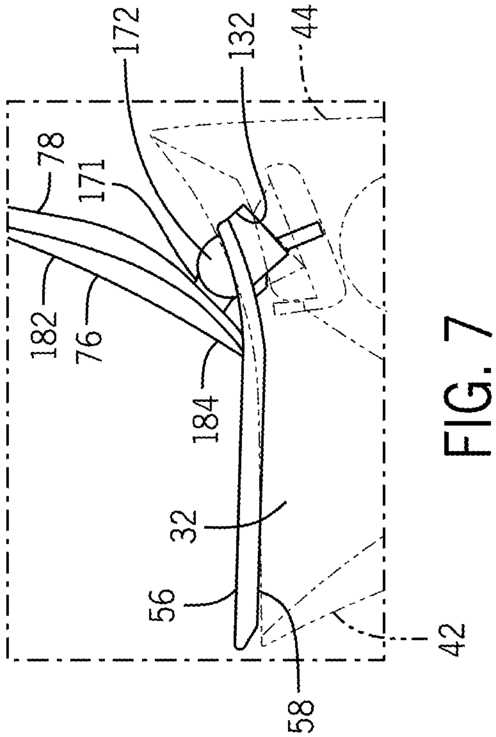
Figure 8:
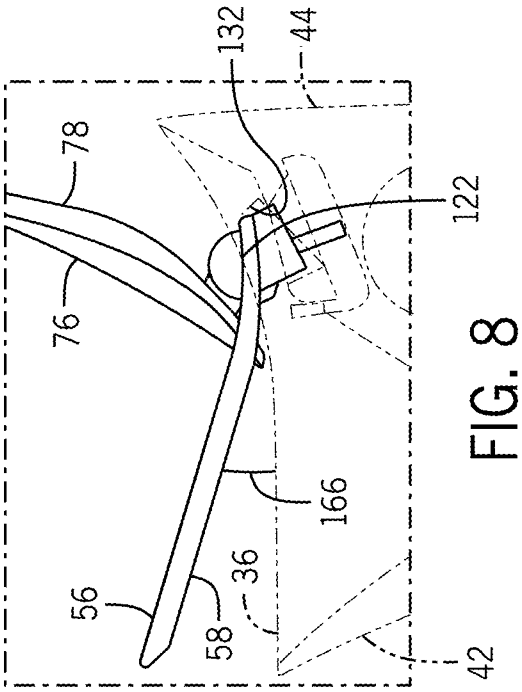
Figure 9:
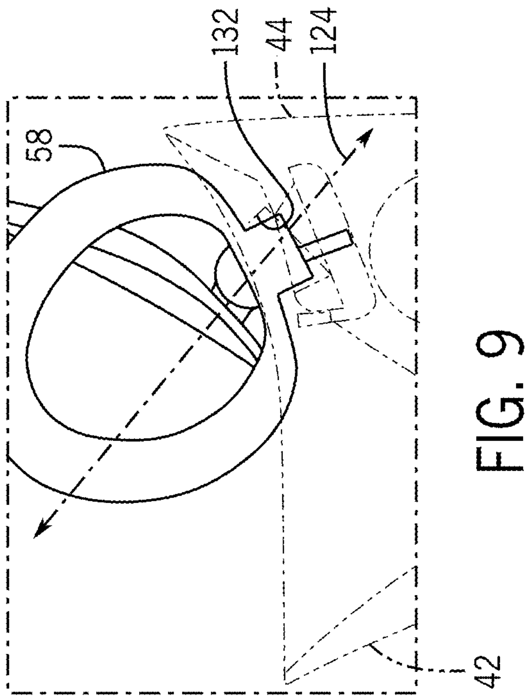

Accordingly, as shown in the exemplary embodiment of FIGS. 1-11, the toilet 20 includes a cover and seat opening mechanism 120 that allows both a cover 70 and a seat 50 to be easily moved relative to the toilet 20 and to maintain the cleanliness (in particular during use) of the toilet 20. More specifically, as shown in FIGS. 1-3, the hinge, pivot, or opening mechanism 120 allows each of the cover 70 and the seat 50 to be moved between a lowered position 72, in which the cover 70 and seat 50 are located adjacent a base 30 (as shown in FIG. 1), and a stowed position 74, in which the cover 70 and the seat 50 are oriented in an upward direction away from the base 30 (as shown in FIGS. 2-3). The cover 70 and the seat 50 may be moved individually and separately (i.e., at different times). Alternatively, the cover 70 and the seat 50 may be moved together (i.e., at the same time) and may be moved aligned with each other or misaligned with each other (as shown in FIGS. 6 and 9), according to a user's preference.

In order to allow the cover 70 and the seat 50 to move between the lowered position 72 and the stowed position 74, the opening mechanism 120 includes a ball-and-socket hinge or joint between the cover 70 and the base 30, as shown in the embodiment FIGS. 4-10. The ball-and-socket joint allows the cover 70 and the seat 50 to each pivot and rotate (or swivel) about two different axes. As shown in FIG. 4, the cover 70 includes a ball 172, the seat 50 includes a ring 152, and the base 30 includes or defines a socket 132 that is configured to receive at least a portion of the ball 172, the extension 176, and/or the ring 152 to allow the cover 70 and the seat 50 to move relative to the base 30. However, a portion of the ball 172 and optionally the ring 152 may extend outside of the socket 132.

As shown in FIG. 4, the ball 172 of the cover 70 extends from the bottom surface 78 of the cover 70. The ball 172 includes a first side 171 and a second side 173 that are approximately opposite each other. The first side 171 of the ball 172 is closest to and connects to the bottom surface 78 of the cover 70. The ball 172 is centered along the width of the cover 70 (i.e., along the y-axis).

According to the exemplary embodiment shown, the cover 70 may further include a projection 174 that extends between and connects the bottom surface 78 of the cover 70 and the first side 171 of the ball 172 together, as shown in FIG. 4. Alternatively, the ball 172 may extend directly from the bottom surface 78 of the cover 70 along the first side 171 of the ball 172.

The projection 174 and the ball 172 are positioned between a front end 82 and a back end 84 of the cover 70 and are positioned toward or closer to the back end 84 of the cover 70 along a bottom surface 78 of the cover 70 such that the majority of the cover 70 (i.e., a top surface 76 and the bottom surface 78) is positioned between the projection 174 (or the ball 172) and the front end 82 of the cover 70, and the back end 84 of the cover 70 is spaced apart from and extends beyond the ball 172 along the length of the cover 70. The portion of the cover 70 between the front end 82 of the cover 70 and the projection 174 (or the ball 172) is a front portion 182 of the cover 70. The portion of the cover 70 between the back end 84 of the cover 70 and the projection 174 (or the ball 172) is a back portion 184 of the cover 70. The front portion 182 and the back portion 184 of the cover 70 each include portions of both the top surface 76 and the bottom surface 78 of the cover 70.

As shown in FIG. 4, the cover 70 further includes an extension 176 that extends from the second side 173 of the ball 172 in a direction approximately away from the bottom surface 78 of the cover 70. Accordingly, the cover 70 and the extension 176 are on approximately opposite sides of the ball 172. The extension 176 extends further into the base and provides an area for a motor (e.g., motor 61' shown in FIG. 15, etc.) within the toilet (e.g., within the base 30) to control and move the ball 172 and thereby move the cover 70 relative to the base 30. However, it is understood that, according to another embodiment, the cover 70 may be manually moved by a user.

As shown in FIG. 4, the ring 152 of the seat 50 is positioned along a back end 64 of the seat 50. The ring 152 defines an opening (that is separate and in addition to the main opening of the seat 50 that leads into the bowl 32) that extends completely through the seat 50 in order to provide an area for at least a portion of the ball 172 and/or the extension 176 to extend through, into an inner area of the base 30. The ring 152 is centered along the width of the seat 50 (i.e., along the y-axis). The ring 152 is positioned around and rotates about a portion of the ball 172, such as the second side 173 of the ball 172, and the extension 176. The ring 152 is also positioned and rotates within the socket 132 of the base 30 such that the ring 152 is sandwiched between the ball 172 and the socket 132. Accordingly, a top surface of the ring 152 is complementary to (in size and shape) the second side 173 of the ball 172 and a bottom surface of the ring 152 is complementary to (in size and shape) a top surface of the socket 132. The ring 152 also connects (independently from the ball 172 and the extension 176) to the motor within the base 30 such that the motor can control and move the ring 152 and thereby move the seat 50 relative to the base 30 and the cover 70. However, it is understood that, according to another embodiment, the seat 50 may be moved manually by the user.

As shown in FIG. 4, the socket 132 of the base 30 is an opening within the base 30 that is sized and positioned to receive at least a portion of the ball 172, the extension 176, and/or the ring 152. Accordingly, a top surface of the socket 132 is complementary to (in size and shape) a bottom surface of the ring 152. The socket 132 is a separate and additional opening from the top opening of the bowl 32 of the base 30 and is positioned closer to the back end 44 of the base 30 than the bowl 32. The socket 132 is centered along the width of the base 30 (i.e., along the y-axis).

As shown in FIGS. 4-10, the cover 70, the seat 50, and the base 30 are each movably attached to each other toward the respective back ends of each of the cover 70, the seat 50, and the base 30 via the ball 172, the ring 152, and the socket 132 (i.e., the cover 70 and the seat 50 are attached to an area of the base 30 that is closer to the back end 44 of the base 30). Accordingly, the ball 172 is positioned toward the back end 84 of the cover 70 along the bottom surface 78 of the cover 70. The ring 152 is positioned at the back end 64 of the seat 50 and extends from the bottom surface 58 of the seat 50. The socket 132 is positioned toward the top and the back end 44 of the base 30 (e.g., near or at the back of the top rim 36 of the base 30). According to one embodiment, the cover 70 may have only one ball 172, the seat 50 may have only one ring 152, and the base 30 may have only one socket 132 such that the cover 70, the seat 50, and the base 30 are only connected to each other through one ball-and-socket joint or opening mechanism 120.

As shown in FIGS. 4-10, the ball 172 and the extension 176 of the cover 70 are movable and rotatable within the socket 132 and the ring 152 to allow the cover 70 to move relative to the base 30 and the seat 50. Additionally, the ring 152 is movable and rotatable within the socket 132 to allow the seat 50 to move relative to the base 30 (and the cover 70). The motor within the base 30 is configured to move the cover 70 and the seat 50 relative to the base 30 (however, according to another embodiment, the cover 70 and the seat 50 may be each moved manually by the user, instead of using a motor). Accordingly, as shown in FIGS. 17-60 and as described further herein, each of the cover 70 and the seat 50 are configured to be moved relative to the base 30 between the lowered position 72 and the stowed position 74.

As described in more detail and as shown in FIGS. 4-11, the opening mechanism 120 allows the cover 70 and the seat 50 to each be pivoted upward then rotated backward about two different axes in order to move between the lowered position 72 and the stowed position 74. Specifically, the cover 70 and the seat 50 are each first pivoted upward about a substantially lateral axis 122 to a certain angle (as described further herein) and then swiveled or rotated backward about an angled axis 124 to move from the lowered position 72 into the stowed position 74. The transverse or lateral axis 122 (i.e., the y-axis, shown in FIG. 4) refers to a direction extending horizontally along the width of the base 30. The lateral axis 122 extends through the width of the ball 172 and/or the extension 176 of the cover 70 and through the width of the ring 152 of the seat 50. The lateral axis 122 that the cover 70 and the seat 50 first pivot about may be the same lateral axis or two parallel lateral axes. The angled axis 124 is an axis that extends at an angle relative to the vertical and longitudinal axes (where the vertical axis (i.e., the z-axis) extends vertically along the height of the base and the longitudinal axis (i.e., the x-axis) extends horizontally along the depth of the base (i.e., between the front end 42 and the back end 44 of the base 30), as shown in FIG. 4) and is substantially perpendicular to the lateral axis 122. Alternatively, the angled axis 124 extends substantially along the vertical axis. The angled axis 124 extends through the ball 172 of the cover 70 and lengthwise through the opening of the ring 152 of the seat 50. The lateral axis (i.e., the y-axis), the vertical axis (i.e., the z-axis), and the longitudinal axis (i.e., the x-axis) are substantially perpendicular to each other.

FIGS. 4-10 show how the cover 70 and the seat 50 move relative to the base 30. As shown in FIG. 4, the toilet 20 is in the non-use position when the cover 70 and the seat 50 are in the lowered position 72. Accordingly, the bowl 32 (shown in FIGS. 2-3) is concealed. In the non-use position of the toilet 20, the bottom surface 58 of the seat 50 is directly next to the top rim 36 of the base 30 and the top surface 56 of the seat 50 is directly next to the bottom surface 78 of the cover 70 such that the seat 50 is sandwiched between the base 30 and the cover 70. In the non-use position, the cover 70, the seat 50, and the top rim 36 of the base 30 are located adjacent each other (as shown in FIG. 4).

As shown in FIG. 5, in order to move the cover 70 from the lowered position 72 into the stowed position 74, the cover 70 is first partially raised by pivoting the cover 70 upward about the lateral axis 122 to a cover pivot angle 186. As the cover 70 is pivoted about the lateral axis 122, the ball 172 and the extension 176 move within the ring 152. By pivoting the cover 70 about the lateral axis 122, the front end 82 of the cover 70 is lifted vertically upward away from the front end 42 (and the top rim 36) of the base 30 and the front end 62 of the seat 50 such that the cover 70 is angled at the cover pivot angle 186 above the top surface 56 of the seat 50. The cover pivot angle 186, which is the angle between the bottom surface 78 of the cover 70 and the top surface 56 of the seat 50, may be a variety of different angles in which the cover 70 is raised upward above the seat 50 and the base 30, but not yet fully upright yet (e.g., the cover pivot angle 186 may be approximately 35° away from the top rim 36 of the base 30).

After pivoting the cover 70 about the lateral axis 122, the cover 70 is then subsequently rotated approximately 180° backward (i.e., away from the front end 42 of the base 30), as shown in FIG. 6, about the angled axis 124 toward the back end 44 of the base 30 into the stowed position 74, as shown in FIG. 7. As the cover 70 is rotated about the angled axis 124, the ball 172 and the extension 176 move (i.e., rotate) within the ring 152. By rotating the cover 70 about the angled axis 124, the cover 70 is moved from a position in which the majority of the cover 70 is in front of the socket 132 (i.e., closer to the front end 42 of the base 30, as shown in FIG. 5), through a position in which the majority of the cover 70 is to the side of the socket 132 (as shown in FIG.

6), and to a position in which the majority of the cover 70 is behind (or directly above) the socket 132 (i.e., closer to the back end 44 of the base 30, as shown in FIG. 7). Accordingly, as the cover 70 rotates about the angled axis 124, the cover 70 moves toward and then away from one side 46 of the base 30.

The cover 70 is rotated such that the top surface 76 of the cover 70 is always visible and facing away from the base 30, and the bottom surface 78 of the cover 70 is always obscured or hidden and facing toward the base 30. More specifically, in the lowered position 72, the top surface 76 of the cover 70 is visible and facing away from the top rim 36 and the bowl 32 of the base 30 and the bottom surface 78 of the cover 70 is obscured and facing toward the top rim 36 and the bowl 32 of the base 30. In the stowed position 74, the top surface 76 of the cover 70 is visible and facing toward and visible from the front end 42 of the base 30, and the bottom surface 78 of the cover 70 is obscured and facing toward the back end 44 of the base 30 in the stowed position 74.

As shown, as the cover 70 moves between the lowered position 72 and the stowed position 74, the seat 50 may stay still in the same position, as shown in FIG. 7 (compared to FIG. 4). As the cover 70 rotates about the angled axis 124, the cover 70 moves from a partially horizontal (i.e., angled) orientation, in which the top surface 56 of the seat 50 and the bowl 32 are still partially obscured (as shown in FIG. 5) into an upward orientation away from the base 30, in which the top surface 56 of the seat 50 and the bowl 32 are exposed (as shown in FIG. 7).

While the cover 70 is in the stowed position 74 and the seat 50 is in the lowered position 72 (as shown in FIG. 7), the inside of the base 30 (i.e., the bowl 32) is exposed and the user may therefore use the toilet 20. For example, the user may sit down on the top surface 56 of the seat 50, and optionally rest their back on the top surface 76 of the cover 70, in order to use the toilet 20 in this position.

Figure 11:
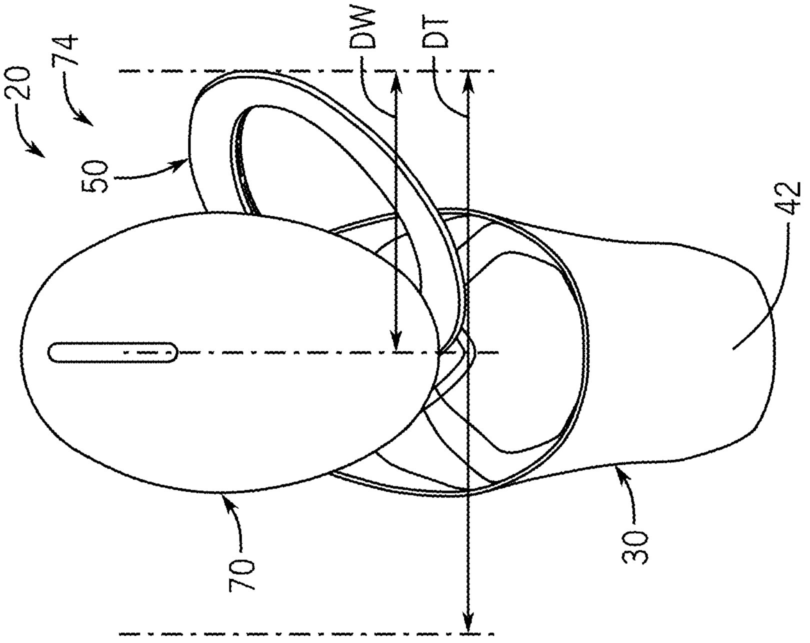
FIG. 11 is a front perspective view of the toilet of FIG. 1 with the cover in the stowed position and the seat at a position in between the lowered position and the stowed position.

While the cover 70 is in the stowed position 74 (regardless of the position of the seat 50), the back portion 184 of the cover 70 obscures or covers the portion of the opening mechanism 120 that extends outside of the socket 132 of the base 30. More specifically, the back portion 184 of the cover 70 covers, obscures, blocks, or shields the portion of the ball 172 of the cover 70 and the portion of the ring 152 of the seat 50 that extend outside of the socket 132 of the base 30 from being exposed to the bowl 32 when the cover 70 is in the stowed position 74. FIG. 11, in which the ball 172 and the ring 152 are not visible from the front end 42 of the base 30 since the cover 70 is in the stowed position 74, shows how the back portion 184 of the cover 70 shields the ball 172 and the ring 152 from the bowl 32. FIG. 7 also shows how the back portion 184 of the cover 70 covers the first side 171 of the ball 172. Spacing out the ball 172 and the projection 174 from the back end 84 of the cover 70 (as described further herein) is what allows the back portion 184 of the cover 70 to cover this portion of the opening mechanism 120. By substantially blocking the opening mechanism 120 from the bowl 32, the opening mechanism 120 is less likely to get dirty (e.g., splashed, etc.) while the toilet 20 is being used (by waste and/or water), thereby helping to maintain the cleanliness of the toilet 20 since hinges on toilets are often difficult to clean. By substantially obscuring the opening mechanism 120, the toilet 20 also has a more streamlined and clean look with an "invisible hinge" since a user cannot see the opening mechanism from the front end 42 of the base 30.

The seat 50 is moved from the lowered position 72 to the stowed position 74 in a similar manner that the cover 70 is moved. More specifically, as shown in FIG. 8, in order to move the seat 50 from the lowered position 72 to the stowed position 74, the seat 50 is first partially raised by pivoting the seat 50 upward about the lateral axis 122 to a seat pivot angle 166. As the seat 50 is pivoted about the lateral axis 122, the ring 152 moves around the ball 172 and the extension 176 and moves within the socket 132. By pivoting the seat 50 about the lateral axis 122, the front end 62 of the seat 50 is lifted vertically upward away from the front end 42 of the base 30 such that the seat 50 is angled at the seat pivot angle 166 above the top rim 36 of the base 30. The seat pivot angle 166, which is the angle between the bottom surface 58 of the seat 50 and the top rim 36 of the base 30, may be a variety of different angles in which the seat 50 is raised upward above the base 30, but not yet fully upright yet (e.g., the seat pivot angle 166 may be approximately 17° away from the top rim 36 of the base 30). The seat pivot angle 166 and the cover pivot angle 186 may be the same as or different from each other.

Figure 10:
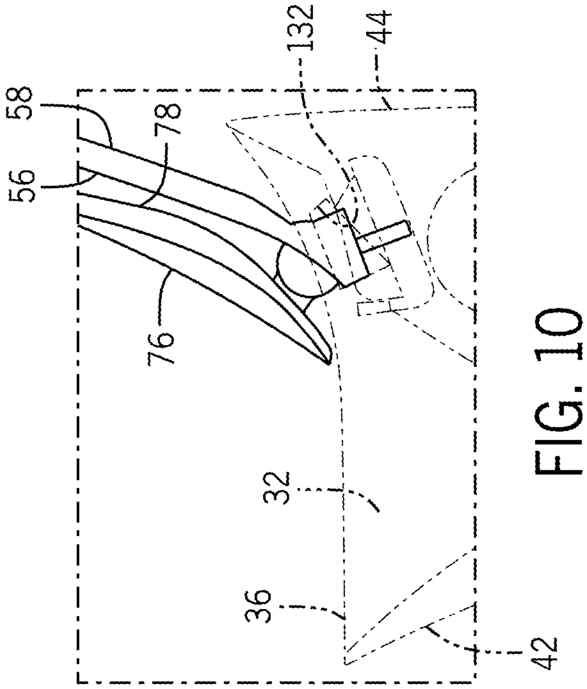
Figure 12:
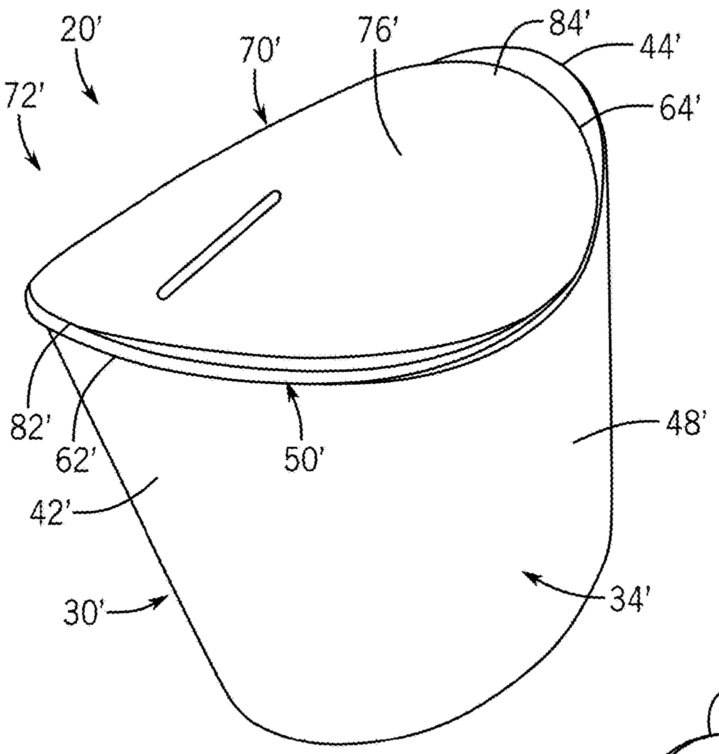
FIG. 12 is a perspective view of a toilet according to another exemplary embodiment.
Figure 14:
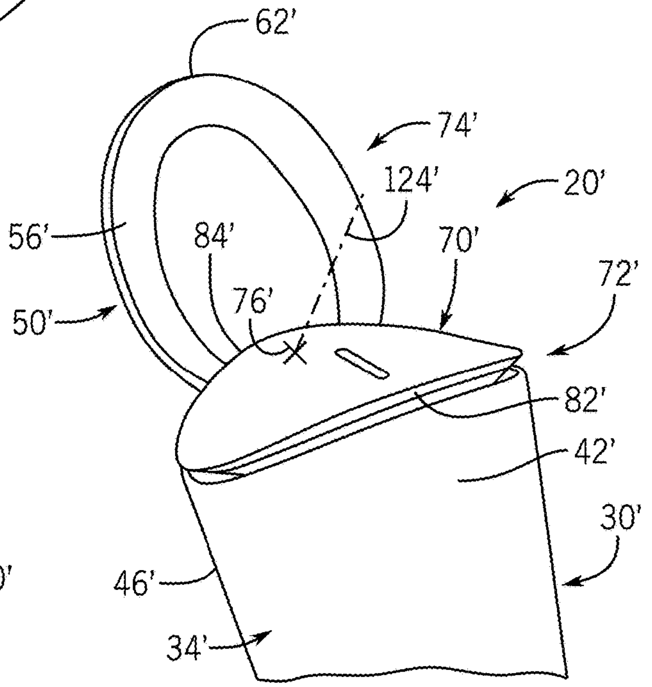
FIG. 14 is a partial perspective view of the toilet of FIG. 12 with the seat in the stowed position and the cover in the lowered position.
Figure 13:
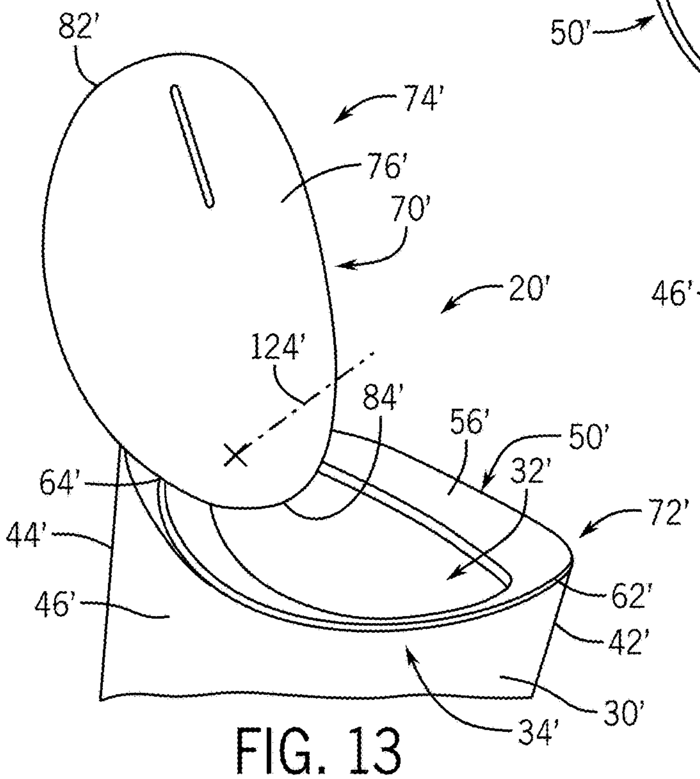
FIG. 13 is a partial perspective view of the toilet of FIG. 12 with a seat in a lowered position and a cover in a stowed position.

After pivoting the seat 50 about the lateral axis 122, the seat 50 is subsequently rotated approximately 180° backward (i.e., away from the front end 42 of the base 30), as shown in FIG. 9, about the angled axis 124 toward the back end 44 of the base 30 into the stowed position 74, as shown in FIG. 10. As the seat 50 is rotated about the angled axis 124, the ring 152 moves (i.e., rotates) around the ball 172 and the extension 176 and moves (i.e., rotates) within the socket 132. By rotating the seat 50 about the angled axis 124, the seat 50 is moved from a position in which the majority of the seat 50 is in front of the socket 132 (i.e., closer to the front end 42 of the base 30, as shown in FIG. 8), through a position in which the majority of the seat 50 is to the side of the socket 132 (as shown in FIG. 9), and to a position in which the majority of the seat 50 is behind (or directly above) the socket 132 (i.e., closer to the back end 44 of the base 30, as shown in FIG. 10). Accordingly, as the seat 50 rotates about the angled axis 124, the seat 50 moves toward and then away from one side 46 of the base 30. Furthermore, by rotating the seat 50 about the angled axis 124 while the cover 70 is in the stowed position 74, the majority of the seat 50 moves from the front of the cover 70, which corresponds to the top surface 76, to the back of or behind the cover 70, which corresponds to the bottom surface 78.

The seat 50 is rotated such that, in the lowered position 72, the top surface 56 of the seat 50 faces away from the bowl 32 and the top rim 36 of the base 30, and the bottom surface 58 of the seat 50 faces toward the bowl 32 and the top rim 36 of the base 30. In the stowed position 74, the top surface 56 of the seat 50 faces toward the front end 42 of the base and the bottom surface 78 of the cover 70, and the bottom surface 58 of the seat 50 faces toward the back end 44 of the base 30. As the seat 50 rotates about the angled axis 124, the seat 50 moves from a partially horizontal (i.e., angled) position adjacent the base 30, in which the top rim 36 of the base 30 is still partially obscured, as shown in FIG. 8, into an upward or substantially upright orientation, in which the top rim 36 of the base 30 is exposed, as shown in FIG. 10.

While the cover 70 and the seat 50 are in the stowed position 74, the top rim 36 and the bowl 32 of the base 30 are exposed and the user may therefore use the toilet 20. For example, the user may use the toilet 20 while standing and thus facing the top surface 76 of the cover 70 in this position.

It is understood that, in order to move the cover 70 and the seat 50 back from the stowed position 74 to the lowered position 72, the cover 70 and the seat 50 are moved in the same, but opposite, manner as described above.

As shown, when the cover 70 and the seat 50 are in the lowered position 72, the seat 50 is positioned between the cover 70 and the top rim 36 of the base 30 such that the cover 70 covers and obscures the seat 50. Additionally, when the cover 70 and the seat 50 are in the stowed position 74, the seat 50 is positioned between the cover 70 and the back end 44 of the base 30 such that the cover 70 also covers and obscures the seat 50 in this position.

According to another exemplary embodiment shown in FIGS. 12-24, the toilet 20' includes a cover and seat opening mechanism 120' that allows both a cover 70' and a seat 50' to be easily moved relative to the toilet 20' and to maintain the cleanliness (in particular during use) of the toilet 20', similar to the opening mechanism 120 of the toilet 20 discussed above. As shown in FIGS. 12-18, the toilet 20' includes a cover 70', a seat 50', and a base 30'. The cover 70', the seat 50', and the base 30' have a similar structural configuration as the corresponding cover 70, seat 50, and base 30 of the toilet 20 discussed above, except that the cover 70', the seat 50', and the base 30' include features that cooperatively define an opening mechanism 120' that is different than the opening mechanism 120. The opening mechanism 120' can, advantageously, allow for the cover 70' and the seat 50' to each be rotated about an angled axis 124' between a lowered position 72', in which the cover 70' and the seat 50' are located adjacent the base 30' (shown in FIGS. 12 and 19), and a stowed position 74', in which the cover 70' and the seat 50' are oriented in an upward direction away from the base 30' (shown in FIG. 24), the details of which are discussed in the paragraphs that follow. The cover 70' and the seat 50' may be moved individually and separately (i.e., at different times). Alternatively, the cover 70' and the seat 50' may be moved together (i.e., at the same time) and may be moved aligned with each other or misaligned with each other, according to a user's preference.

As shown in FIGS. 19-24, the cover 70' and the seat 50' can be rotated in a similar manner as the cover 70 and seat 50 of the toilet 20 discussed above. However, the cover 70' and the seat 50' only rotate about a single, angled axis 124' between the lowered position 72' and the stowed position 74', instead of two different axes (e.g., a lateral axis 122 and an angled axis 124). The rotational movement of the cover 70' and the seat 50' is enabled by the opening mechanism 120'.

Figure 15:
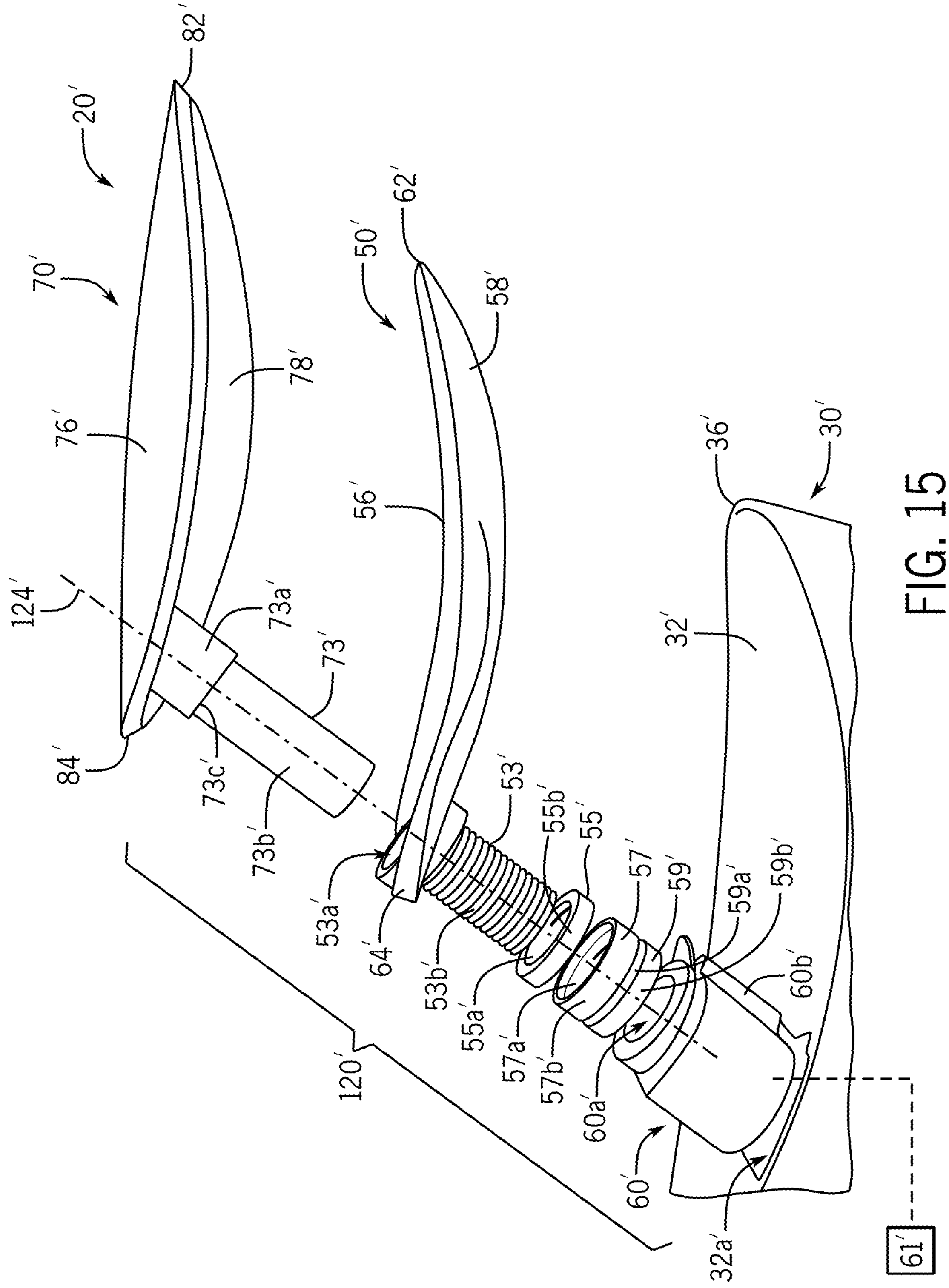
FIG. 15 is an exploded view of a cover and seat opening mechanism of the toilet of FIG. 12.
Figure 16:
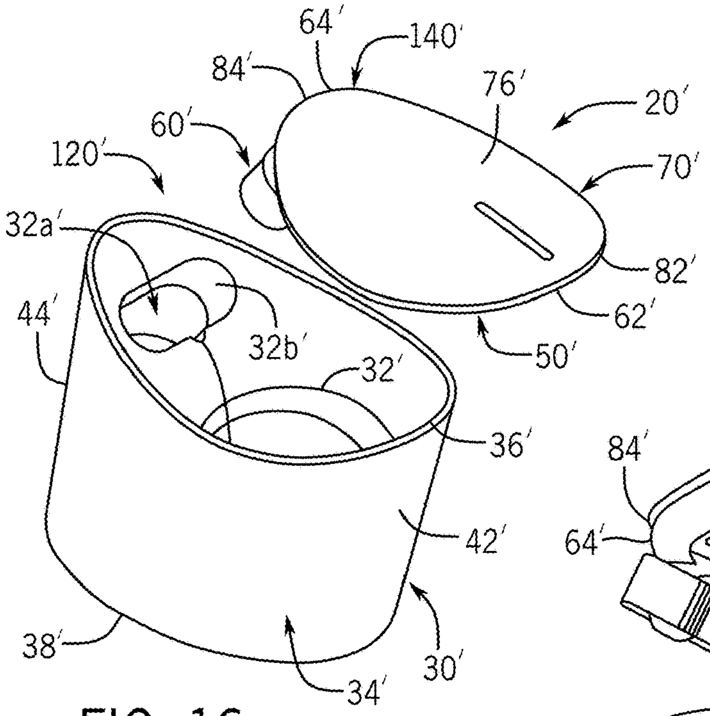
FIGS. 16-17 are exploded views of the toilet of FIG. 12.
Figure 17:
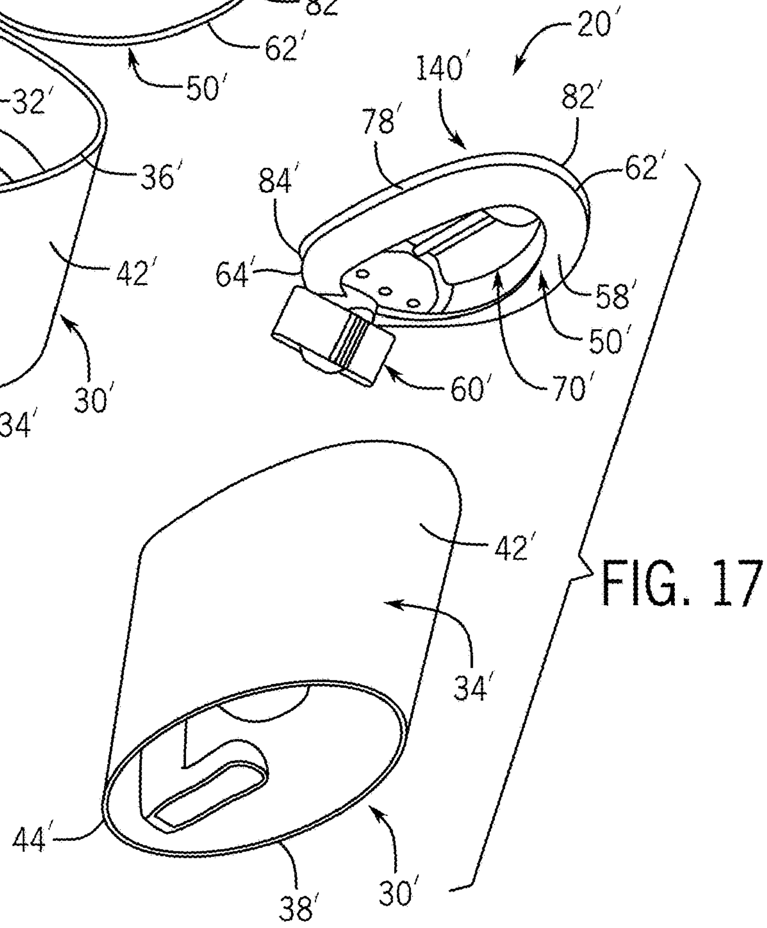
Figure 18:
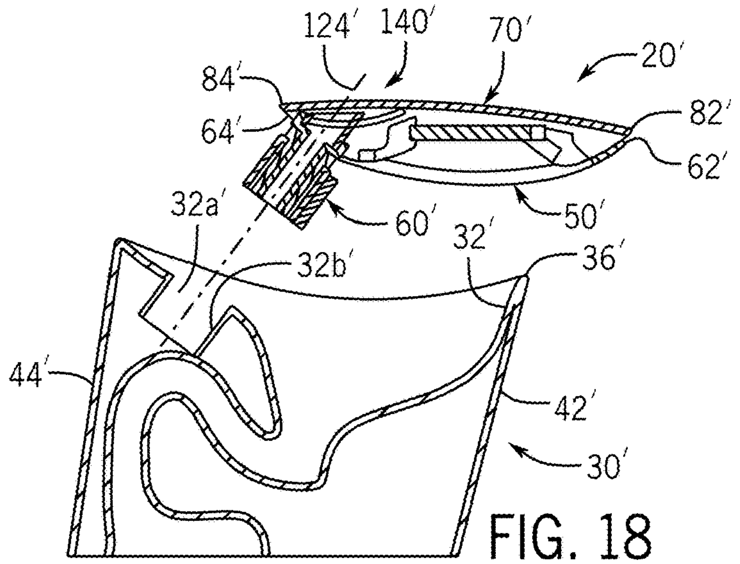
FIG. 18 is a side cross-sectional view of the toilet of FIG. 12.

As shown in FIG. 15, the opening mechanism 120' is cooperatively defined by features of the cover 70', the seat 50', a housing 60', and the base 30'. For example, the cover 70' includes a top surface 76' having a generally convex shape or portion, and a bottom surface 78' located opposite the top surface 76' having a generally concave shape or portion. The cover 70' further defines a front end 82' and a back end 84' located opposite the front end 82'. The cover 70' includes an elongated member 73' extending outwardly away from the bottom surface 78' toward the back end 84'. The elongated member 73' has a generally cylindrical shape defined by a first portion **73*a*' and a second portion 73*b*' extending from the first portion 73*a*'. The elongated member 73' may include one or more openings extending therethrough to receive, for example, a fluid conduit, electrical wiring, or other components of the cover 70' (e.g., flush mechanism 620', bidet mechanism 840', etc.), the details of which are discussed below with reference to FIGS. 50 and 63-68. The first portion 73*a*' has a diameter that is greater than the diameter of the second portion 73*b*', so as to define a flange 73*c*' for limiting an axial position of the cover 70' relative to the seat 50', the details of which are discussed in the paragraphs that follow. The elongated member 73' also defines the angled axis 124' for the cover 70'** to rotate about, as discussed in greater detail below.

Still referring to FIGS. 12-24, the seat 50' includes a top surface 56' having a generally convex shape that is complementary to the surface profile of the bottom surface 78' of the cover 70'. The seat 50' further includes a bottom surface 58' located opposite the top surface 56'. The seat 50' further defines a front end 62' and a back end 64' located opposite the front end 62'. The seat 50' includes a substantially hollow elongated member 53' extending outwardly away from the bottom surface 58' toward the back end 64'. The hollow elongated member 53' has a generally hollow cylindrical shape that defines an opening **53*a*' extending through the top surface 56' of the seat and through the entire length of the hollow elongated member 53'. The hollow elongated member 53' may receive the elongated member 73' of the cover 70' through at least a portion of, or the entire length of, the opening 53*a*'**.

According to an exemplary embodiment, the opening **53*a*' is countersunk to define an inner flange for engaging the flange 73*c*' of the elongated member 73' near the top surface 56', so as to limit the axial position of the cover 70' relative to the seat 50' to permit relative rotational movement between the cover 70' and the seat 50'. The cover 70' can rotate relative to the seat 50' via the elongated member 73' within the opening 53*a*' of the hollow elongated member 53'. Likewise, the seat 50' can rotate relative to the cover 70' via the hollow elongated member 53'. As such, both the elongated member 73' and the hollow elongated member 53' cooperatively define the same angled axis 124'. As shown in FIG. 15, the hollow elongated member 53' also includes an outer surface having an outer thread 53*b*' for threadably engaging a first rotatable member 55'. The first rotatable member 55' has a ring shape that defines an inner thread 55*a*' and an outer surface 55*b*'. The inner thread 55*a*' may selectively threadably engage the outer thread 53*b*' to permit translational movement of the seat 50' and the cover 70' in an axial direction along the angled axis 124', the details of which are discussed below with reference to FIGS. 30-32**.

Still referring to FIG. 15, the opening mechanism 120' further includes a second rotatable member 57' for coupling to the elongated member 73'. For example, the elongated member 73' may have a length sufficient to extend through the opening **53*a*' at a distal end of the hollow elongated member 53', such that the second rotatable member 57' can couple to a portion of the elongated member 73' that extends through the opening 53*a*'. The second rotatable 57' has a ring shape that defines an inner surface 57*a*' and an outer surface 57*b*'. The inner surface 57*a*' may be fixedly coupled to an outer surface of the second portion 73*b*' of the elongated member 73'. According to an exemplary embodiment, the outer surface 57*b*' may define one or more gear teeth for engaging one or more separate drive gears of a motor 61', shown schematically in FIG. 15. For example, the motor 61' may be an electric motor that includes one or more separate drive gears including gear teeth that can rotatably engage complementary gear teeth on the outer surface 57*b*' of the second rotatable member 57', so as to selectively rotate the second rotatable member 57' and the cover 70' about the angled axis 124' via the elongated member 73' in response to a user input (e.g., via a control 522 on control structure 520 shown in FIGS. 36-40, etc.). According to other exemplary embodiments, the motor 61' may be configured to engage and rotate the second rotatable member 57' in other ways besides a gear arrangement, such as rotatable bearings, a belt drive, etc. In this manner, the cover 70' can be automatically, and independently, rotated about the angled axis 124' via the motor 61'**.

Still referring to FIG. 15, the opening mechanism 120' further includes a third rotatable member 59' for coupling to the hollow elongated member 53'. The third rotatable member 59' has a ring shape that defines an inner surface 59*a*' and an outer surface 59*b*'. The inner surface 59*a*' may be fixedly coupled to the second portion 53*b*' of the hollow elongated member 53'. According to an exemplary embodiment, the outer surface 59*b*' may define one or more gear teeth for engaging one or more separate drive gears of the motor 61'. For example, the motor 61' may be an electric motor that includes one or more separate drive gears including gear teeth that can rotatably engage complementary gear teeth on the outer surface 59*b*' of the third rotatable member 59', so as to selectively rotate the third rotatable member 59' and the seat 50' about the angled axis 124' via the hollow elongated member 53' in response to a user input. According to other exemplary embodiments, the motor 61' may include a plurality of separate motors for separately engaging the first rotatable member 55', the second rotatable member 57', and the third rotatable member 59', respectively. According to other exemplary embodiments, the motor 61' may be configured to engage and rotate the third rotatable member 59' in other ways besides a gear arrangement. In this manner, the seat 50' can be automatically, and independently, rotated about the angled axis 124' in a similar manner as the cover 70'.

As shown in FIG. 15, the opening mechanism 120' further includes a housing 60' for containing the first rotatable member 55', the second rotatable member 57', the third rotatable member 59', and portions of the elongated members 53',73'. The housing 60' includes an opening 60*a*' for receiving portions of the elongated members 53',73' therein. The housing 60' may include additional openings to provide an interface between the rotatable members 55',57',59' and the one or more separate drive gears of the motor 61', which may be coupled to an inner portion of the base 30'. According to another exemplary embodiment, the housing 60' houses the motor 61' or a plurality of motors 61' therein.

As shown in FIGS. 15-18, the housing 60' further includes an outer surface 60*b*' that defines a poke-a-yoke feature for locating and aligning the housing 60' relative to the base 30'. For example, the housing 60' may include a longitudinal protrusion on the outer surface 60*b*' that is configured to engage a complementary feature defined by an inner surface 32*b*' of the base 30' that defines an opening 32', so as to align and detachably couple the housing 60' to the base 30'. The housing 60' and/or the base 30' may include a fastening arrangement for detachably coupling the housing 60' to the base 30', such as snap-fit features, bayonet features, or other types of fastening arrangements to allow the housing 60' to be removable from the base 30'. In this way, the cover 70' and the seat 50' may be selectively removed from the base 30' via the housing 60' as a seat and cover sub-assembly 140', so as to allow for repair, maintenance, or cleaning of the various components of the toilet 20'.

Referring to FIGS. 15-24, the opening mechanism 120' allows the cover 70' and the seat 50' to each be pivoted or rotated backward about an angled axis 124' in order to move between the lowered position 72' and the stowed position 74'. The angled axis 124' is an axis that extends in an upward direction at an angle relative to the vertical and longitudinal axes (e.g., an oblique angle) forward toward a front end 42' of the base 30' (where the vertical axis (i.e., the z-axis) extends vertically along the height of the base 30' and the longitudinal axis (i.e., the x-axis) extends horizontally along the depth of the base 30' (i.e., between the front end 42' and the back end 44' of the base 30'). The angled axis 124' extends through the elongated members 53',73' lengthwise through the opening 53*a*'. The lateral axis (i.e., the y-axis), the vertical axis (i.e., the z-axis), and the longitudinal axis (i.e., the x-axis) are substantially perpendicular to each other.

Figure 19:
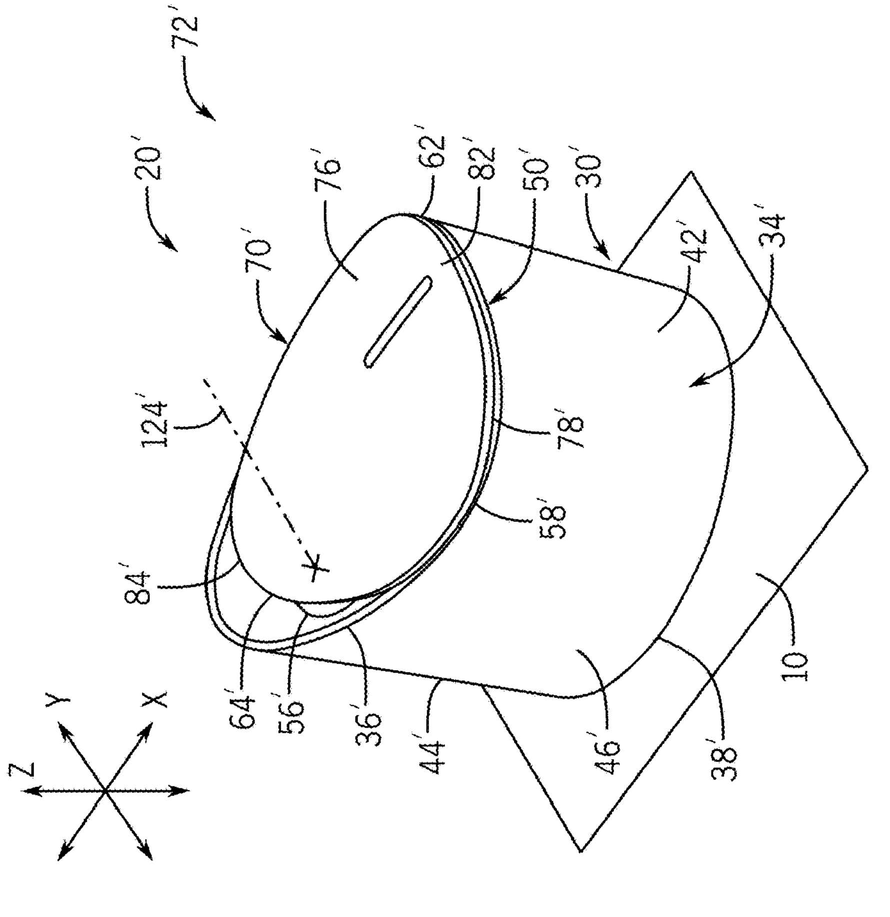

FIGS. 19-24 show how the cover 70' and the seat 50' move relative to the base 30'. As shown in FIG. 19, the toilet 20' is in the non-use position when the cover 70' and the seat 50' are in the lowered position 72'. Accordingly, the bowl 32' is substantially concealed. In the non-use position of the toilet 20', the bottom surface 58' of the seat 50' is directly next to the top rim 36' of the base 30' and the top surface 56' of the seat 50' is directly next to the bottom surface 78' of the cover 70', such that the seat 50' is sandwiched between the base 30' and the cover 70'. In the non-use or lowered 72' position, the cover 70', the seat 50', and the top rim 36' of the base 30' are located adjacent each other.

Figure 20:
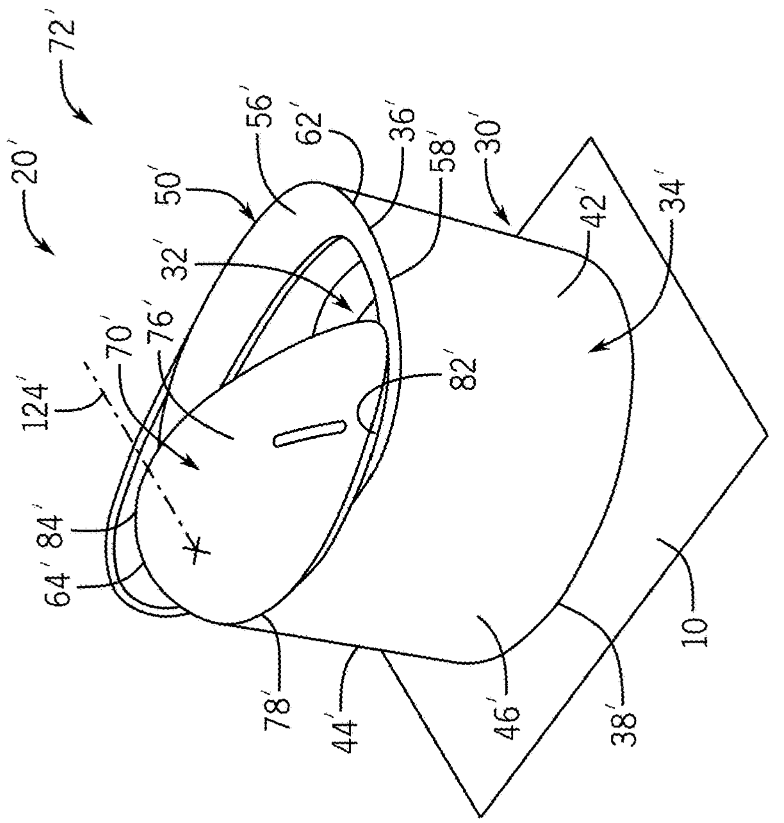
FIGS. 19-24 are perspective views of the toilet of FIG. 12 with the cover and the seat being moved from the lowered position to the stowed position.
Figure 22:
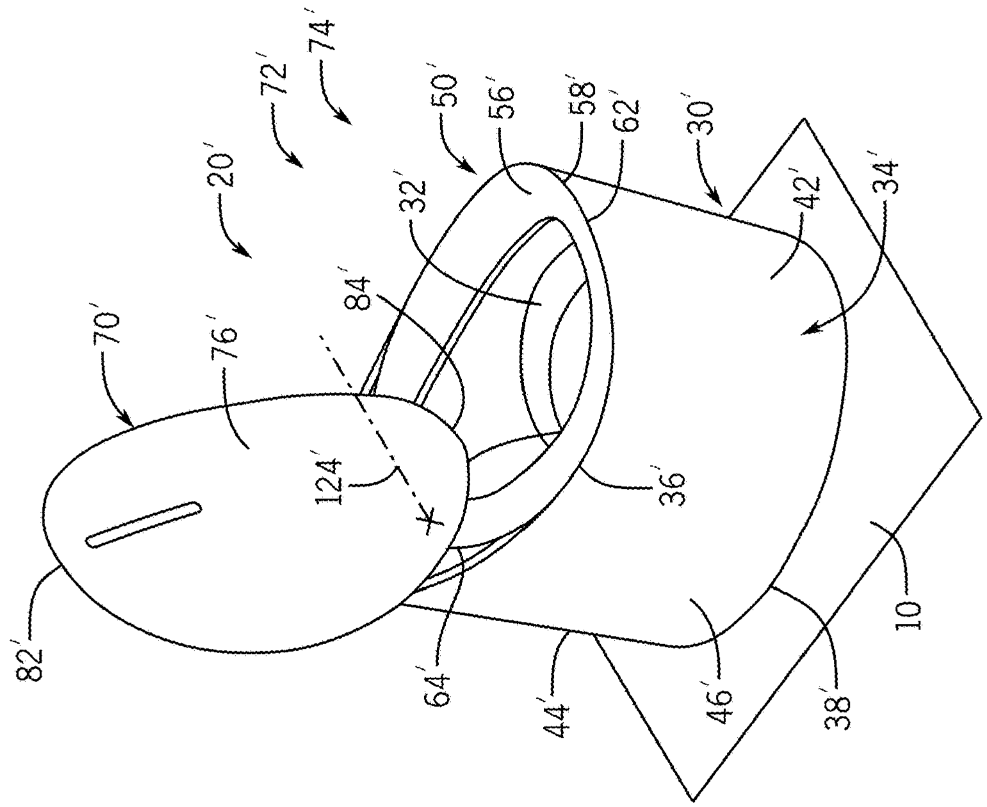
Figure 21:
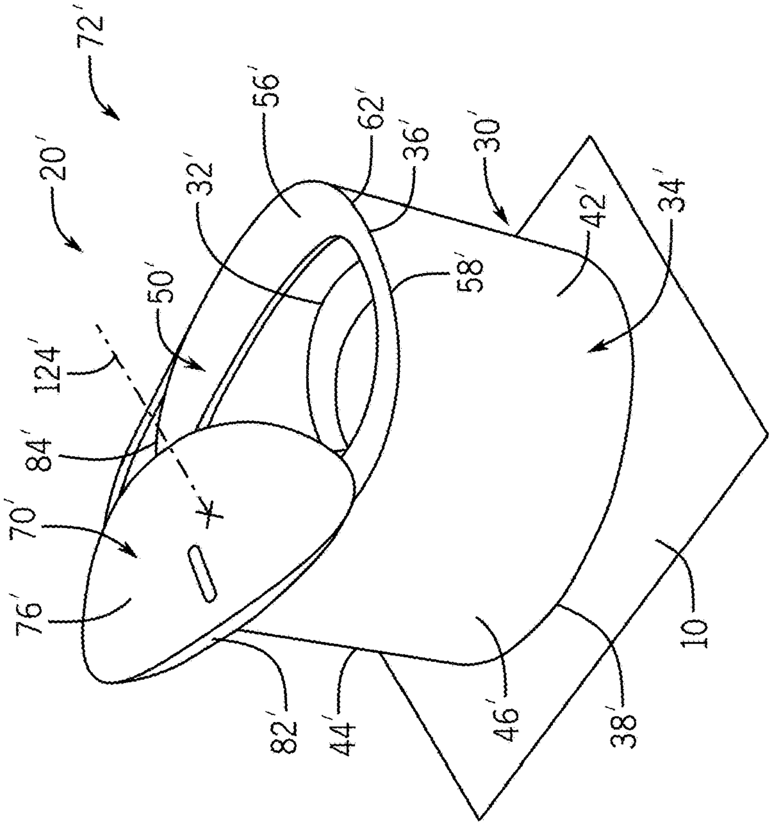

As shown in FIGS. 20-21, in order to move the cover 70' from the lowered position 72' to the stowed position 74', the cover 70' is rotated approximately 180° backward (i.e., away from the front end 42' of the base 30') about the angled axis 124' toward the back end 44' of the base 30' into the stowed position 74' (as shown in FIG. 22). As the cover 70' is rotated about the angled axis 124', the elongated member 73' rotates within the opening 53*a*' of the hollow elongated member 53' of the seat 50' (e.g., by selectively rotating the second rotatable member 57' via the motor 61', etc.). By rotating the cover 70' about the angled axis 124', the cover 70' is moved from a position in which the majority of the cover 70' is in front of the housing 60' (i.e., closer to the front end 42' of the base 30'), through a position in which the majority of the cover 70' is to the side of the housing 60' (as shown in FIGS. 20-21), and to a position in which the majority of the cover 70' is behind (or directly above) the housing 60' (i.e., closer to the back end 44' of the base 30'). Accordingly, as the cover 70' rotates about the angled axis 124', the cover 70' moves toward and then away from one side 46' of the base 30'.

The cover 70' is rotated such that the top surface 76' of the cover 70' is always visible and facing away from the base 30', and the bottom surface 78' of the cover 70' is always substantially obscured or hidden and facing toward the base 30'. More specifically, in the lowered position 72', the top surface 76' of the cover 70' is visible and facing away from the top rim 36' and the bowl 32' of the base 30' and the bottom surface 78' of the cover 70' is obscured and facing toward the top rim 36' and the bowl 32' of the base 30' (as shown in FIG. 19). In the stowed position 74', the top surface 76' of the cover 70' is visible and facing toward and visible from the front end 42' of the base 30', and the bottom surface 78' of the cover 70' is obscured and facing toward the back end 44' of the base 30' in the stowed position 74' (as shown in FIG. 22).

As shown, as the cover 70' moves between the lowered position 72' and the stowed position 74', the seat 50' may stay still in the same position, as shown in FIGS. 20-21 (compared to FIG. 19). As the cover 70' rotates about the angled axis 124', the cover 70' moves from a partially horizontal (i.e., angled) orientation, in which the top surface 56' of the seat 50' and the bowl 32' are still partially obscured (as shown in FIGS. 20-21) into an upward orientation away from the base 30', in which the top surface 56' of the seat 50' and the bowl 32' are exposed (as shown in FIG. 22).

While the cover 70' is in the stowed position 74' and the seat 50' is in the lowered position 72' (as shown in FIG. 22), the inside of the base 30' (i.e., the bowl 32') is exposed and the user may therefore use the toilet 20'. For example, the user may sit down on the top surface 56' of the seat 50', and optionally rest their back on the top surface 76' of the cover 70', in order to use the toilet 20' in this position.

While the cover 70' is in the stowed position 74', a portion of the cover 70' obscures or covers the opening mechanism 120'. More specifically, the back end 84' of the cover 70' substantially covers, obscures, blocks, or shields a portion of the elongated member 53' and a portion of the seat 50' that extend outside of the housing 60' from being exposed to the bowl 32' when the cover 70' is in the stowed position 74'. By substantially blocking the opening mechanism 120' from the bowl 32', the opening mechanism 120' is less likely to get dirty (e.g., splashed, etc.) while the toilet 20' is being used (by waste and/or water), thereby helping to maintain the cleanliness of the toilet 20' since hinges on toilets are often difficult to clean. By obscuring the opening mechanism 120', the toilet 20' also has a more streamlined and clean look with an “invisible hinge” since a user cannot see the opening mechanism 120' from the front end 42' of the base 30', similar to the toilet 20 discussed above.

Figure 23:
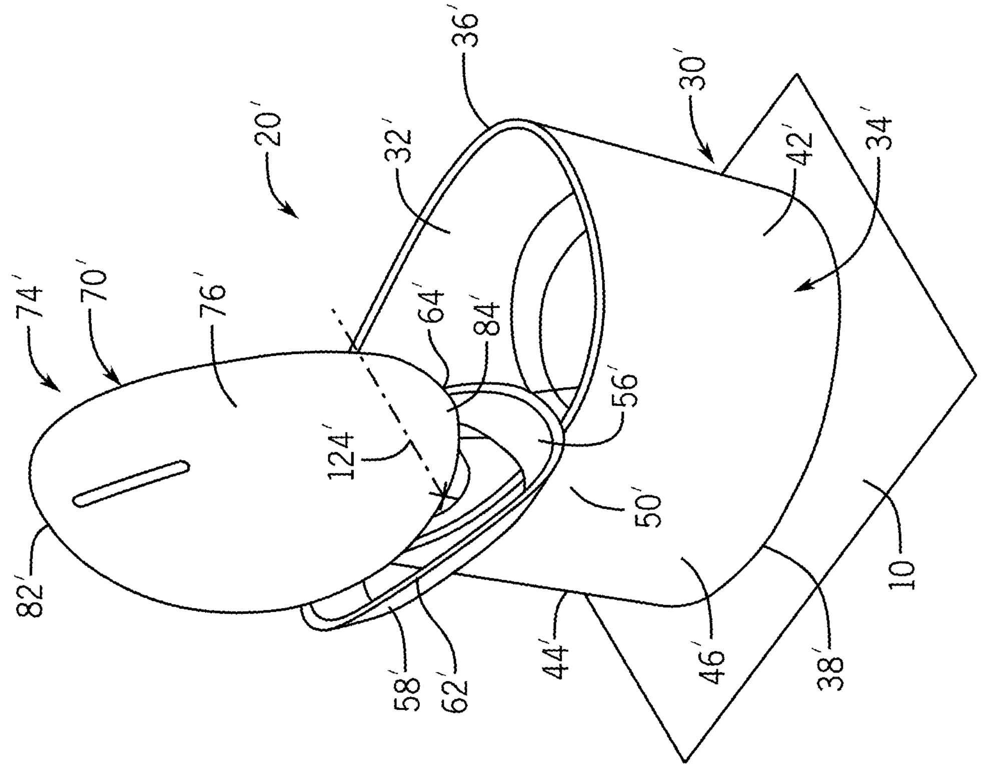
Figure 24:
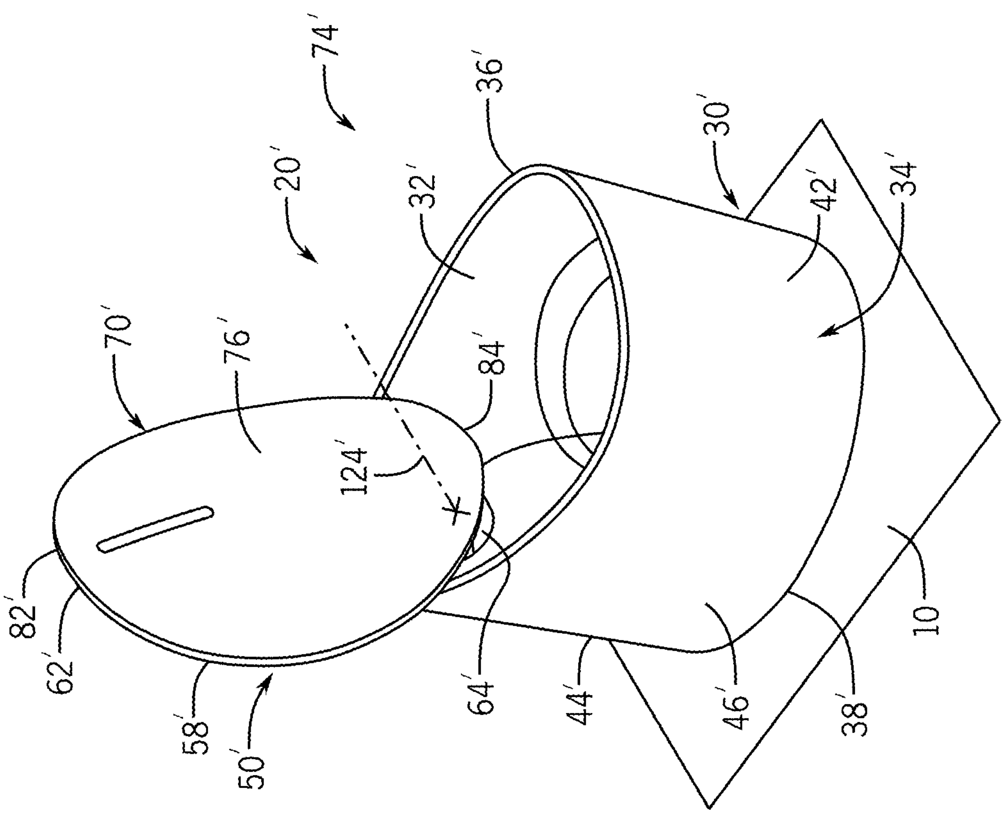

The seat 50' is moved from the lowered position 72' to the stowed position 74' in a similar manner that the cover 70' is moved. More specifically, as shown in FIGS. 22-24, in order to move the seat 50' from the lowered position 72' to the stowed position 74', the seat 50' is rotated approximately 180° backward (i.e., away from the front end 42' of the base 30'), as shown in FIG. 23, about the angled axis 124' toward the back end 44' of the base 30' into the stowed position 74' (as shown in FIG. 24). As the seat 50' is rotated about the angled axis 124', the hollow elongated member 53' rotates within the housing 60' relative to the elongated member 73' (e.g., by selectively rotating the third rotatable member 59' via the motor 61', etc.). By rotating the seat 50' about the angled axis 124', the seat 50' is moved from a position in which the majority of the seat 50' is in front of the housing 60' (i.e., closer to the front end 42' of the base 30'), through a position in which the majority of the seat 50' is to the side of the housing 60' (as shown in FIG. 23), and to a position in which the majority of the seat 50' is behind (or directly above) the housing 60' (i.e., closer to the back end 44' of the base 30', as shown in FIG. 24). Accordingly, as the seat 50' rotates about the angled axis 124', the seat 50' moves toward and then away from one side 46' of the base 30'. Furthermore, by rotating the seat 50' about the angled axis 124' while the cover 70' is in the stowed position 74', the majority of the seat 50' moves from the front of the cover 70', which corresponds to the top surface 76', to the back of or behind the cover 70', which corresponds to the bottom surface 78'.

The seat 50' is rotated such that, in the lowered position 72', the top surface 56' of the seat 50' faces away from the bowl 32' and the top rim 36' of the base 30', and the bottom surface 58' of the seat 50' faces toward the bowl 32' and the top rim 36' of the base 30', as shown in FIG. 22. In the stowed position 74', the top surface 56' of the seat 50' faces toward the front end 42' of the base 30' and the bottom surface 78' of the cover 70', and the bottom surface 58' of the seat 50' faces toward the back end 44' of the base 30', as shown in FIG. 24. As the seat 50' rotates about the angled axis 124', the seat 50' moves from a partially horizontal (i.e., angled) position adjacent the base 30', in which the top rim 36' of the base 30' is still partially obscured (as shown in FIG. 22) into an upward or substantially upright orientation, in which the top rim 36' of the base 30' is exposed (as shown in FIG. 24).

While the cover 70' and the seat 50' are in the stowed position 74' shown in FIG. 24, the top rim 36' and the bowl 32' of the base 30' are exposed and the user may therefore use the toilet 20'. For example, the user may use the toilet 20' while standing and thus facing the top surface 76' of the cover 70' in this position.

It is understood that, in order to move the cover 70' and the seat 50' back from the stowed position 74' to the lowered position 72', the cover 70' and the seat 50' are moved in the same, but opposite, manner as described above.

With the opening mechanisms 120,120', the toilets 20,20' are relatively compact and upright, which allows the toilets 20,20' to fit within a variety of different bathing environments. For example, according to some regulations, toilets must be centered in an area that extends widthwise a minimum of 30 inches. Accordingly, the width of the toilets cannot be greater than 30 inches. However, as shown in the exemplary embodiment of FIG. 11, the maximum that the seat 50 extends outward along the width of the toilets 20,20' (i.e., when the seat 50 is being moved) is a distance DW of approximately 13.75 inches, which also applies to the seat 50' of the toilet 20'. Accordingly, the total distance DT that the toilets 20,20' take up along the width is 27.5 inches, which is less than the width of the minimum area that the toilets 20,20' are positioned within according to some regulations (i.e., 30 inches).

The covers 70,70' and the seats 50,50' can be raised completely or partially automatically by a motor or a plurality of motors (e.g., motor 61', etc.). The motor(s) may be operatively coupled to a control system (e.g., control system 500 shown in FIG. 41, etc.) to enable the electronic control of the movement of the covers 70,70' and the seats 50,50' in response to a user input, the details of which are discussed below with reference to FIG. 41. Alternatively, the covers 70,70' and the seats 50,50' can be manually or mechanically raised by a user. According to another embodiment, the opening mechanisms 120,120' may optionally be spring-guided or spring-loaded. Accordingly, the opening mechanisms 120,120' may include springs to assist or guide the movement the covers 70,70' and the seats 50,50' in either or both directions (in particular during their respective rotation about the angled axis 124 and angled axis 124'). According to another embodiment, the line pressure of water may be used to coil, wind-up, actuate, or charge the spring by counter-torquing the spring. The spring may optionally be charged when the toilets 20,20' are pre-washed during a courtesy flush. Additionally, due to the size and configuration of the opening mechanisms 120,120', air and/or liquid can be delivered to the seats 50,50' and/or covers 70,70' through the opening mechanisms 120,120' to be used for a vacuum mechanism 220 or flush mechanisms 620,620', as described further herein.

Toilet Vacuum Mechanism

Some conventional toilets include a conventional vacuum mechanism in an attempt to reduce odors escaping from the toilet. However, due to the configuration of the hinge for the seat of these toilets, the vacuum mechanism is relatively limited in size and strength. Accordingly, the vacuum mechanism is only positioned along or draws from an area toward the back of the toilet seat, which prevents odors within the toilet from being completely evacuated from the toilet bowl. For example, odors may escape out of the front of the toilet bowl, through the legs of a user.

Figure 26:
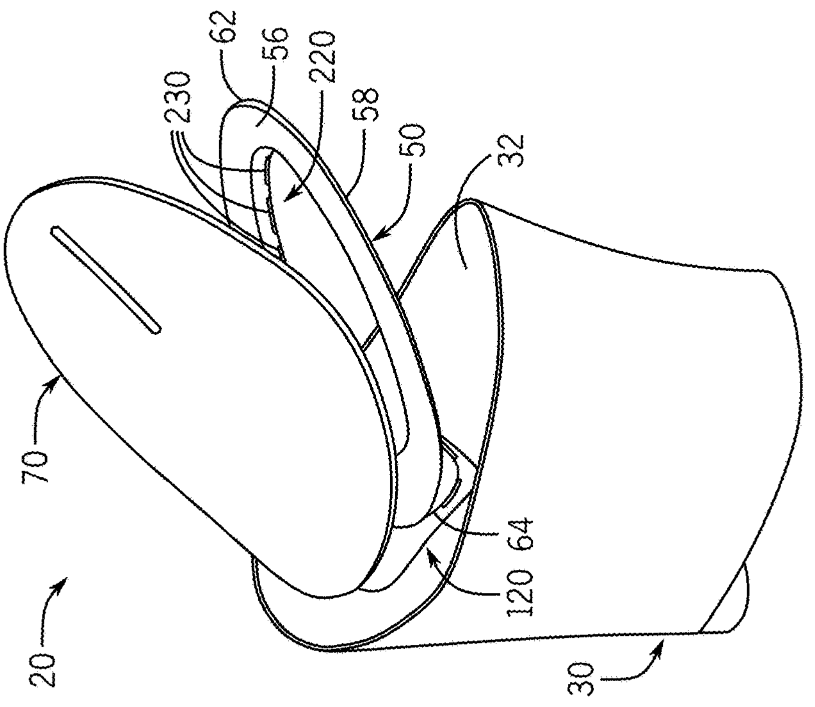
FIGS. 25-26 are perspective views of the toilet of FIG. 1 with a vacuum mechanism according to one embodiment.
Figure 25:
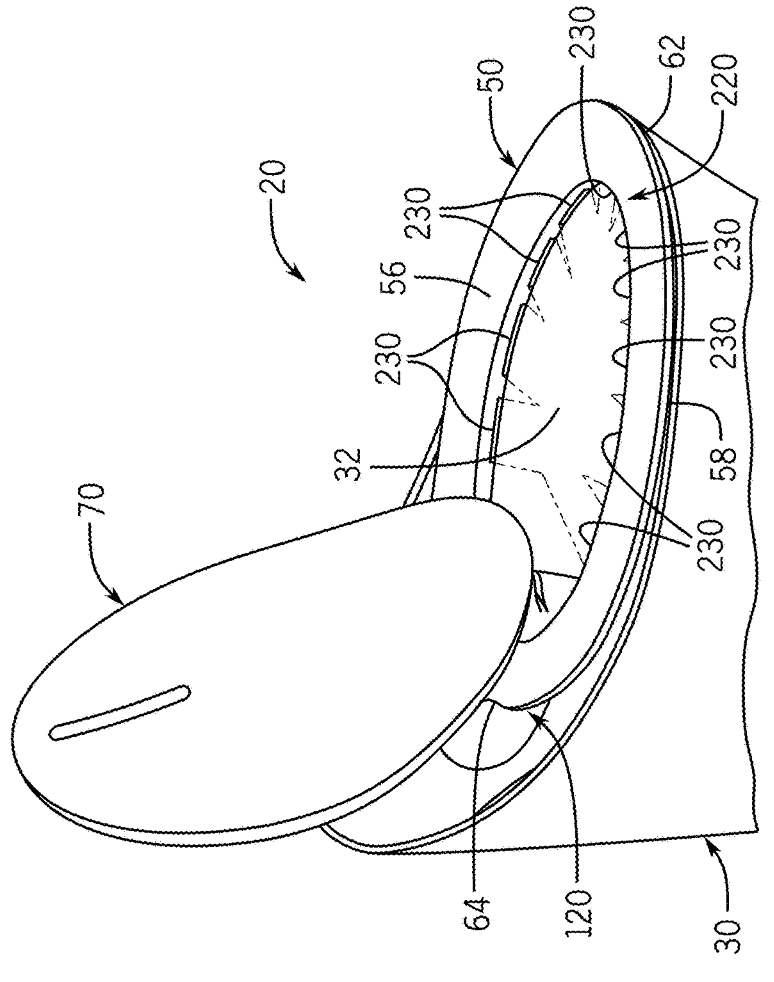

Accordingly, as shown in FIGS. 25-26, the toilet 20 includes a vacuum mechanism 220 that can substantially eliminate odors from the toilet 20 and prevent any odor from drifting into the area surrounding the toilet 20 (e.g., the rest of the bathroom, etc.). It should be appreciated that the vacuum mechanism 220 may be similarly applied to the toilet 20', according to another exemplary embodiment. As shown in the exemplary embodiment of FIG. 25, the vacuum mechanism 220 draws or vacuums air from within the bowl 32 and into the seat 50 in order to prevent odor from escaping the toilet 20 and flowing into the surrounding area (e.g., the bathroom). As described further herein, due to the size of the opening mechanism 120 of the toilet 20, the vacuum mechanism 220 can provide a larger amount of suction, relative to conventional toilet vacuum arrangements.

The vacuum mechanism 220 may include a motor positioned within a portion of the toilet 20 (such as within the base 30 or the seat 50) and at least one opening 230 that allows air to be drawn into the seat 50. The motor is configured to power the vacuum mechanism 220 and draw air from the bowl 32, into and through the openings 230, the seat 50, the opening mechanism 120, and the base 30 and out from the toilet 20. The relatively large size and the configuration of the opening mechanism 120 provides sufficient space to allow a relatively large fluid channel (compared to airways provided in conventional toilets) to extend through the opening mechanism 120. The fluid channel may be, for example an airway that allows air to flow through or a liquid channel or waterway that allows liquid to flow through.

Accordingly, since the motor remotely powers the vacuum mechanism 220 and does not have to be positioned within the seat 50, the motor can be relatively larger than motors for conventional vacuum mechanisms in which the motor is positioned within the seat 50. This relatively larger motor allows more air to be vacuumed into the seat 50 and provides a stronger and more powerful suction to the inner perimeter of the seat 50. Furthermore, due to the strength of the motor, the vacuum mechanism 220 can extend along a larger area along the seat 50 (including the front of the seat 50), thereby vacuuming more odors. It is noted that the vacuum mechanism 220 can draw air from the bowl 32 into the seat 50 regardless of the position of the cover 70 (i.e., the lowered position 72 or the stowed position 74).

As shown in FIGS. 25-26, the slots or openings 230 are positioned along and spaced about the inner perimeter (or inner circumference or rim) of the seat 50, between the top surface 56 and the bottom surface 58 of the seat 50. The openings 230 open into an inner hollow portion of the seat 50 that defines a fluid channel (i.e., an airway) of the vacuum mechanism 220 and fluidly connect the fluid channel to an area outside of the seat 50 (i.e., the inside of the bowl 32). The vacuum mechanism 220 may include any number of openings 230 that are shaped and sized in a variety of different manners. According to one embodiment, the vacuum mechanism 220 includes ten openings 230 along the inner perimeter of the seat 50 that are spaced apart from each other along the perimeter of the seat 50 and in line with each along the height of the seat 50. These openings 230 are shaped like slits that are relatively long with a height that is less than the length.

The openings 230 may extend around the majority of the inner perimeter of the seat 50 or around the entire inner perimeter of the seat 50. In particular, the openings 230 are positioned along the front portion of the seat 50 (i.e., along a portion of the inner perimeter of the seat 50 that is closest to the front end 62 of the seat 50 and furthest away from the opening mechanism 120) in order to ensure that odors do not escape from the front of the bowl 32. Accordingly, the vacuum mechanism 220 substantially blocks odor from escaping around approximately 360° of the inner edge of the seat 50.

FIG. 25 shows how the air flows from the bowl 32, into and through the openings 230 (and the rest of the seat 50), the opening mechanism 120, and the base 30, and out from the toilet 20. In order to allow the air to move from the bowl 32, through the openings 230, and into the base 30 to be expelled out from the toilet 20, a hollow fluid channel (e.g., an air path or airway) extends from the openings 230 and through the inside of the seat 50, the opening mechanism 120, and the base 30 for the air to move within and the vacuum mechanism 220 to draw air through. The vacuum mechanism 220 drawings air from the openings 230 along the seat 50 and through the fluid channel.

The fluid channel extends along at least a portion of, the majority of, or the entire inner perimeter of the seat 50. Accordingly, the fluid channel extends around at least a portion of, extends around the majority of, or extends completely around the main opening of the seat 50 from the back end 64 of the seat 50 (where the main opening of the seat provides an area for waste to pass through the seat and into the bowl 32) in order to fluidly couple to all of the openings 230. In particular, the fluid channel extends along the front end 62 of the seat in order to fluidly couple to the openings 230 along the front portion of the seat 50.

In order to be used with the vacuum mechanism 220, the fluid channel is an airway that draws air from within the bowl 32. However, according to another embodiment, the fluid channel may blow air (e.g., a deodorant, etc.) into the bowl 32. Additionally, as a further alternative embodiment, the fluid channel is a waterway that dispenses water from the seat 50 into the bowl 32 when the toilet 20 is flushed. This water from the seat 50 may function as the "rim wash" for the toilet 20 to replace or be an addition to the conventional rim wash in conventional toilets. The water flows through the vacuum mechanism 220 in an opposite direction as the air flowing in the fluid channel (that flows as a result of the vacuum mechanism). Specifically, the water flows through the fluid channel from the base 30, into and through the opening mechanism 120, the seat 50, and the openings 230, and into the bowl 32. The water is dispensed from the openings 230 into the bowl 32 such that the water flows along the inner sides or walls of the bowl 32 in order to clean the bowl 32.

Lumbar Support and Standing Assistance

Generally speaking, some conventional toilets have covers that are designed to cover the toilet seat while the cover is in the lowered position and may also optionally provide seating for a user along the top surface of the cover while the cover is in the lowered position. However, conventional toilet covers do not provide any specialized support for the back of the user while the cover is in the open or stowed position. In addition, most conventional toilet covers and seats are not capable of translating or moving to help assist a user with moving from a seated position on the seat to a standing position off of the seat.

Figure 28:
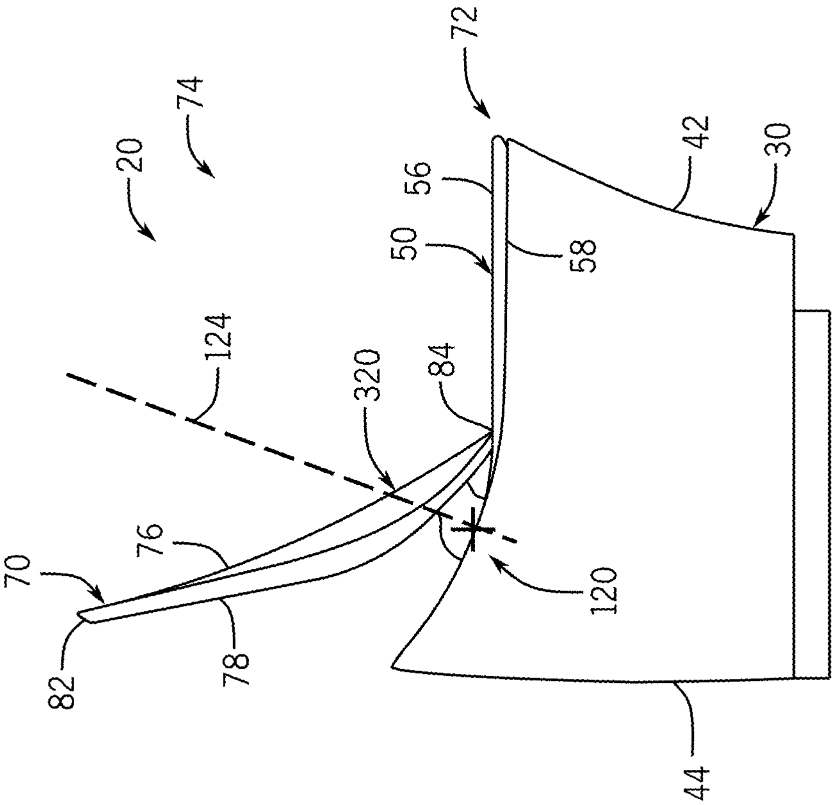
FIG. 28 is a side view of the toilet of FIG. 1 with the cover in the stowed position and the seat in the lowered position.
Figure 27:
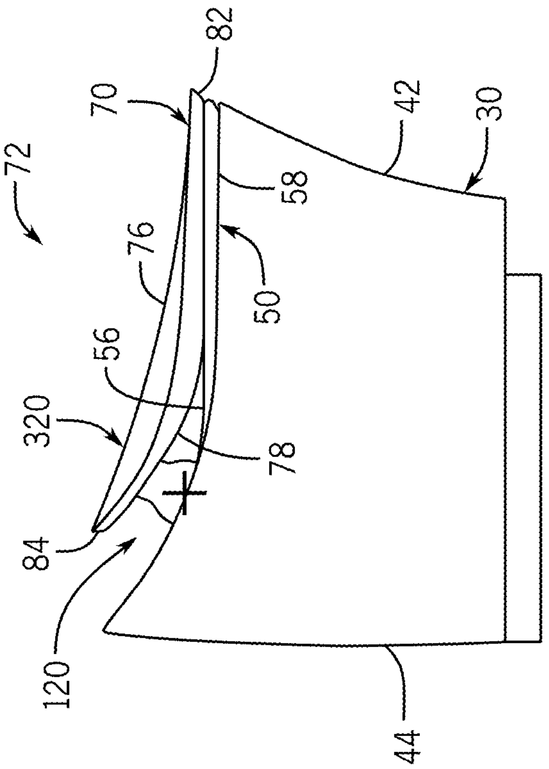
FIG. 27 is a side view of the toilet of FIG. 1 with the cover and the seat in the lowered position.
Figure 29:
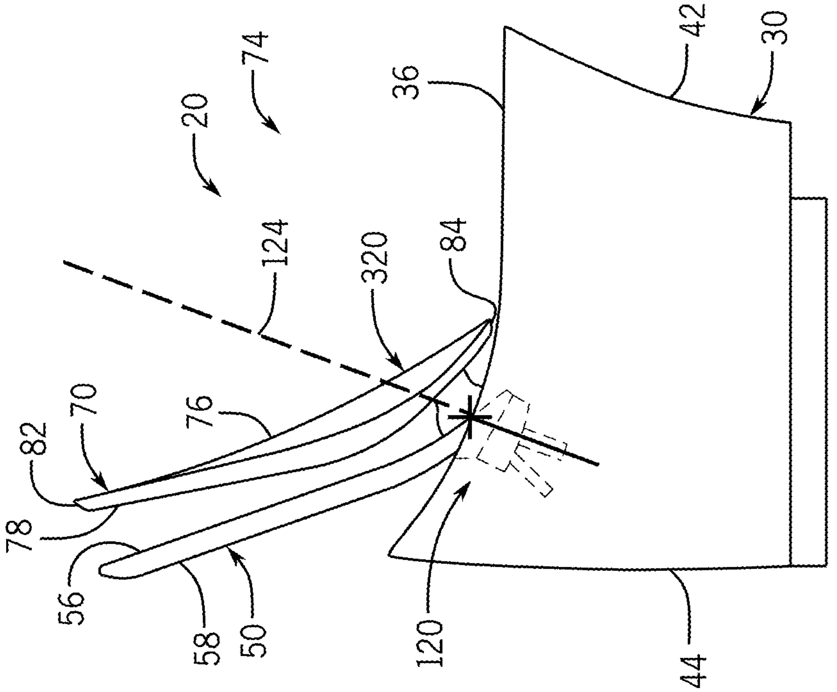
FIG. 29 is a side view of the toilet of FIG. 1 with the cover and the seat in the stowed position.

Accordingly, as shown in the exemplary embodiment FIGS. 27-29, the cover 70 of the toilet 20 includes lumbar support 320 configured to support the back (in particular the lumbar region) of the user when the cover 70 is in the stowed position 74. It should be appreciated that the cover 70' of the toilet 20' may include a similar lumbar support, according to another exemplary embodiment. The lumbar support 320 can be a variety of different features that are configured to provide support to the lumbar region of the user, including but not limited to protrusions, indentations, various angled surfaces, and/or various curvatures or contours. For example, the lumbar support 320 may be a protruded or convex portion along the length of the cover 70 (e.g., between the front end 82 and the back end 84 of the cover 70) that protrudes or extends forward, away from the bottom surface 78 of the cover 70. The lumbar support 320 is complementary to the lumbar region of a human.

The lumbar support 320 is positioned on and extends along the top surface 76 of the cover 70, where the bottom surface 78 of the cover 70 faces toward or is directly next to the top surface 56 of the seat 50 when the cover 70 is in the lowered position 72 and the seat 50 is in the use position 52 (as shown in FIG. 28) and also when the cover 70 is in the stowed position 74 and the seat 50 is in the stowed position 54 (as shown in FIG. 29). As described further herein, the cover 70 is movable between the lowered position 72 and the stowed position 74. In the lowered position 72, the top surface 76 of the cover 70 is visible and faces away from the base 30 (and the bottom surface 78 of the cover 70 is hidden and faces toward the base 30). Due to the opening mechanism 120, the cover 70 is pivoted about the lateral axis 122 and rotated about the angled axis 124 in order to move from the lowered position 72 to the stowed position 74, as previously described. Accordingly, in the stowed position 74 (as shown in FIGS. 28-29), the top surface 76 of the cover 70 is visible and faces toward the front end 42 of the base 30, and the bottom surface 78 of the cover 70 is hidden and faces toward the back end 44 of the base 30. Therefore, since the lumbar support 320 is positioned along the top surface 76 of the cover 70, the lumbar support 320 is able to provide support to the back of a user when the cover 70 is in the stowed position 74.

Accordingly, in order to utilize the lumbar support, the user may open the cover 70 into the stowed position 74 (leaving the seat 50 in the use position 52) and sits on the top surface 56 of the seat 50, facing toward the front end 42 of the base 30, as shown in FIG. 28. Since the top surface 76 of the cover 70 faces toward the back of the user in this position, the lumbar support 320 provides lumbar support to the lumbar region or the lower back of the user when the user leans back on or against the top surface 76 of the cover 70 while seated on the toilet 20 and while the cover 70 is in the stowed position 74.

In order to support and align with the lumbar region of the user's back, the lumbar support 320 is positioned closer toward the back end 84 of the cover 70 (e.g., along a lower region of the cover 70 relative to when the cover 70 is in the stowed position 74) than the front end 82 of the cover 70. As described further herein, the cover 70 is pivotably coupled to the base 30 along a region of the cover 70 that is closer to the back end 84 of the cover 70 than the front end 82 of the cover 70.

Figure 60:
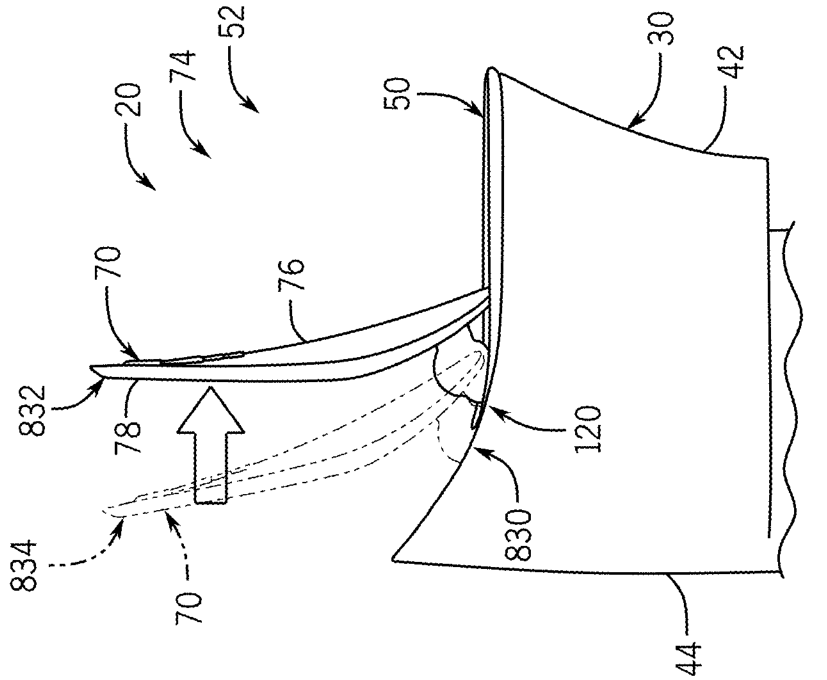
FIG. 60 is a side view of the toilet of FIG. 1 with a cover adjustment mechanism adjusting the position of the cover.

According to another embodiment as shown in FIG. 60, in the (fully) stowed position 74, the cover 70 is tilted or angled slightly forward (i.e., toward the front end 42 of the base 30) in order to lean the user's back slightly forward while the user is seated on the toilet 20. By leaning the user's back forward, the cover 70 positions the user's body in a more ergonomic position that is closer to a squatting position (relative to an upright or leaned-back position) that helps the user to go to the bathroom more easily.

According to an exemplary embodiment, the cover 70 is angled forward such that the front end 82 of the cover 70 is closer to the front end 42 of the base 30 (along the depth of the base 30) than the back end 84 of the cover 70 when the cover 70 is in the stowed position 74. The stowed position 74 refers to the position of the cover 70 in which the toilet 20 is usable as a toilet and the cover 70 is moved completely into the stowed position 74 (i.e., not partially moved out of the lowered position 72).

Figure 30:
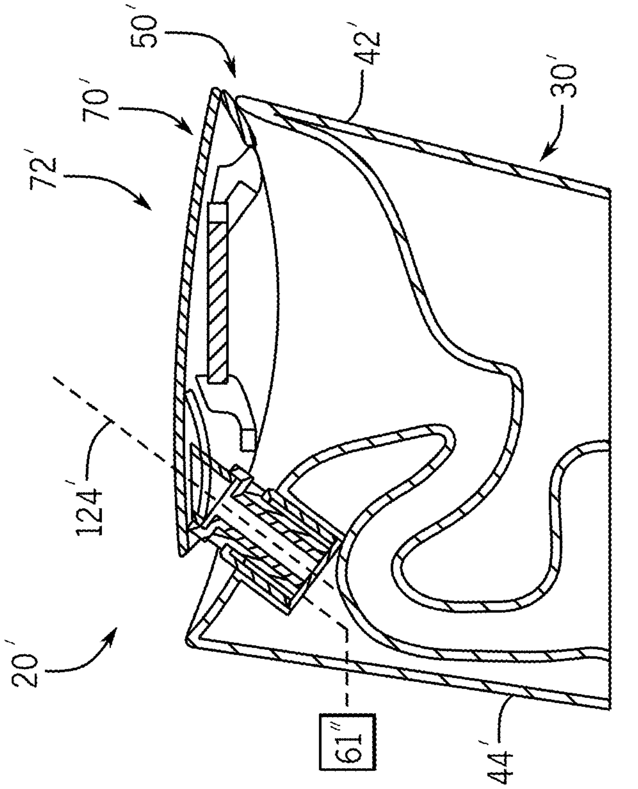
FIG. 30 is a side cross-sectional view of the toilet of FIG. 12 with the cover and the seat in the lowered position.
Figure 32:
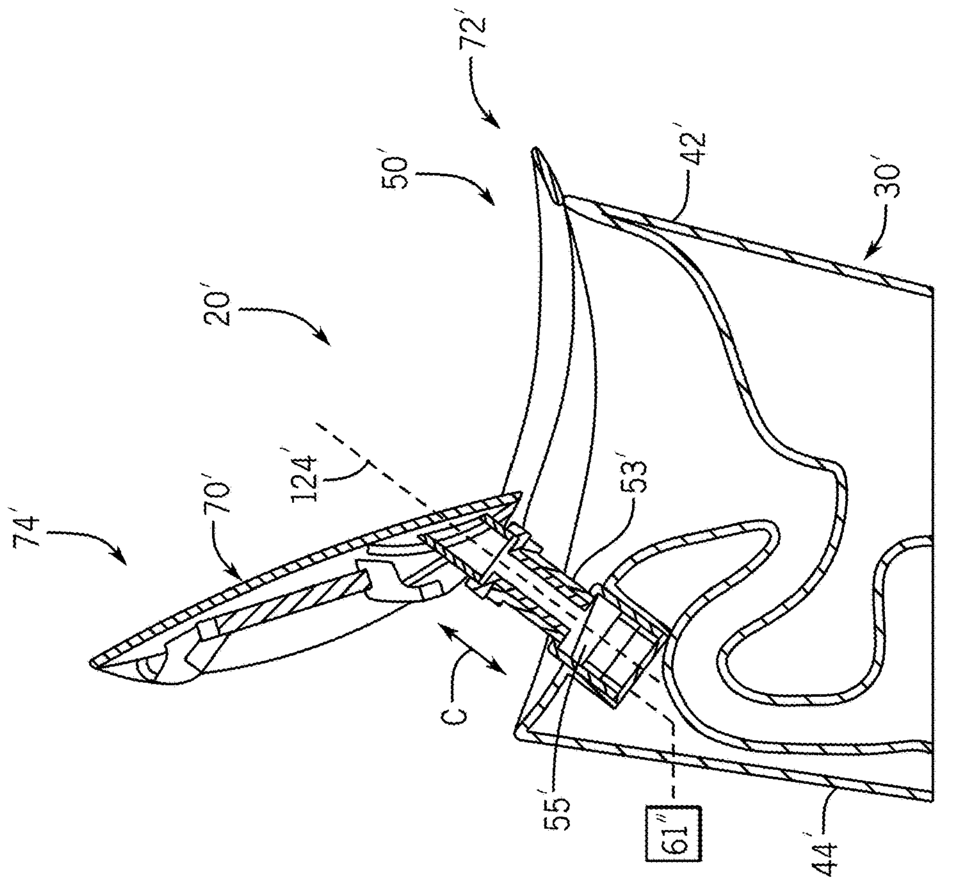
FIGS. 31-32 are side cross-sectional views of the toilet of FIG. 12 with the cover and the seat translating along an axis to assist a user with standing from a seated position on the seat.
Figure 31:
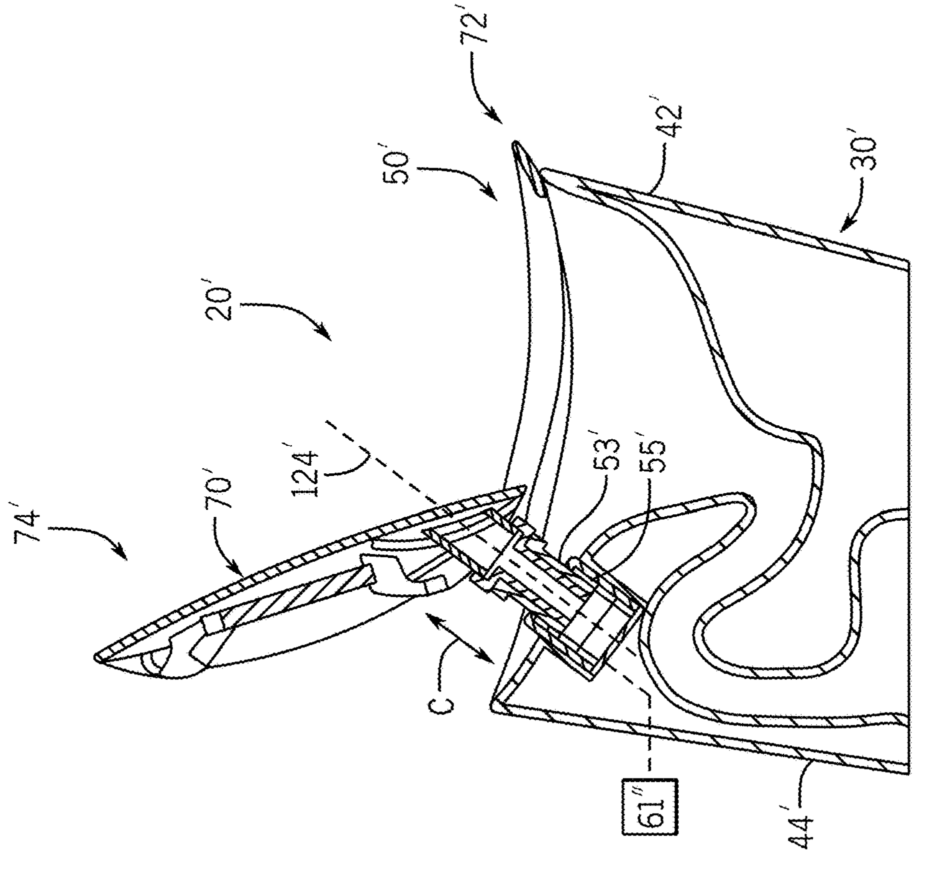

According to another exemplary embodiment shown in FIGS. 30-32, the toilet 20' is configured to provide assistance to a user to move from a seated position on the seat 50' to a standing position off of the seat 50'. As shown in FIG. 30, the cover 70' and the seat 50' are in a lowered position 72' on the toilet 20' prior to being used by a user. The cover 70' may be selectively rotated about the angled axis 124' from the lowered position 72' shown in FIG. 30 to the stowed position 74' shown in FIG. 31 by, for example, selectively operating the motor 61' to rotatably engage the second rotatable member 57' and the elongated member 73', as discussed above. In the position shown in FIG. 31, a user may sit on the top surface 56' of the seat 50' to use the toilet 20'. As shown in FIGS. 31-32, when the user is finished using the toilet 20', the user may selectively operate the motor 61' by providing an electronic signal from a control system (e.g., control system 500 shown in FIG. 41) via a user input (e.g., by actuating a control 522 of the control structure 520 on the cover 70' shown in FIGS. 36-40, etc.). In response to the electronic signal, the motor 61' can operate to translate the hollow elongated member 53' along the angled axis 124' such that the cover 70' and the seat 50' both move along the angled axis 124' (as shown in FIG. 32) to assist the user with standing from the seated position shown in FIG. 31.

For example, referring to FIGS. 15 and 31-32, according to an exemplary embodiment, the motor 61' may selectively rotatably engage the first rotatable member 55' to rotate the rotatable member 55' about the angled axis 124' (e.g., through a gear arrangement, etc.) in response to the user input. The first rotatable member 55' is threadably engaged with the threads **53*b*' of the hollow rotatable member 53'. Thus, rotating the first rotatable member 55' about the angled axis 124' will cause the hollow elongated member 53' to telescope or translate outwardly in a direction indicated generally by arrow "C" in FIGS. 31-32 along the angled axis 124' via the threads 53*b*'. This translational movement will cause the seat 50' and the cover 70' to both move in an upward and forward direction along the angled axis 124' toward a front end of the base 30'**.

The motor 61' may be selectively operated by a user to rotate the first rotatable member 55' in an opposite rotational direction to return the seat 50' and the cover 70' back to the position shown in FIG. 31 in response to another user input (e.g., actuating a different control 522 on the control structure 520, etc.). In this manner, the seat 50' and the cover 70' can be selectively translated along the angled axis 124' to assist a user with standing from a seated position on the seat 50', which may be particularly useful for the elderly or for children who may require such assistance.

Heating Mechanism

Generally speaking, some conventional toilets include a heating mechanism within the toilet seat in order to provide warmth or heat to a user. However, since the heat only comes from the seat, only the area underneath the user's thighs is heated and heat is not provided to other areas of the user's body.

Figure 33:
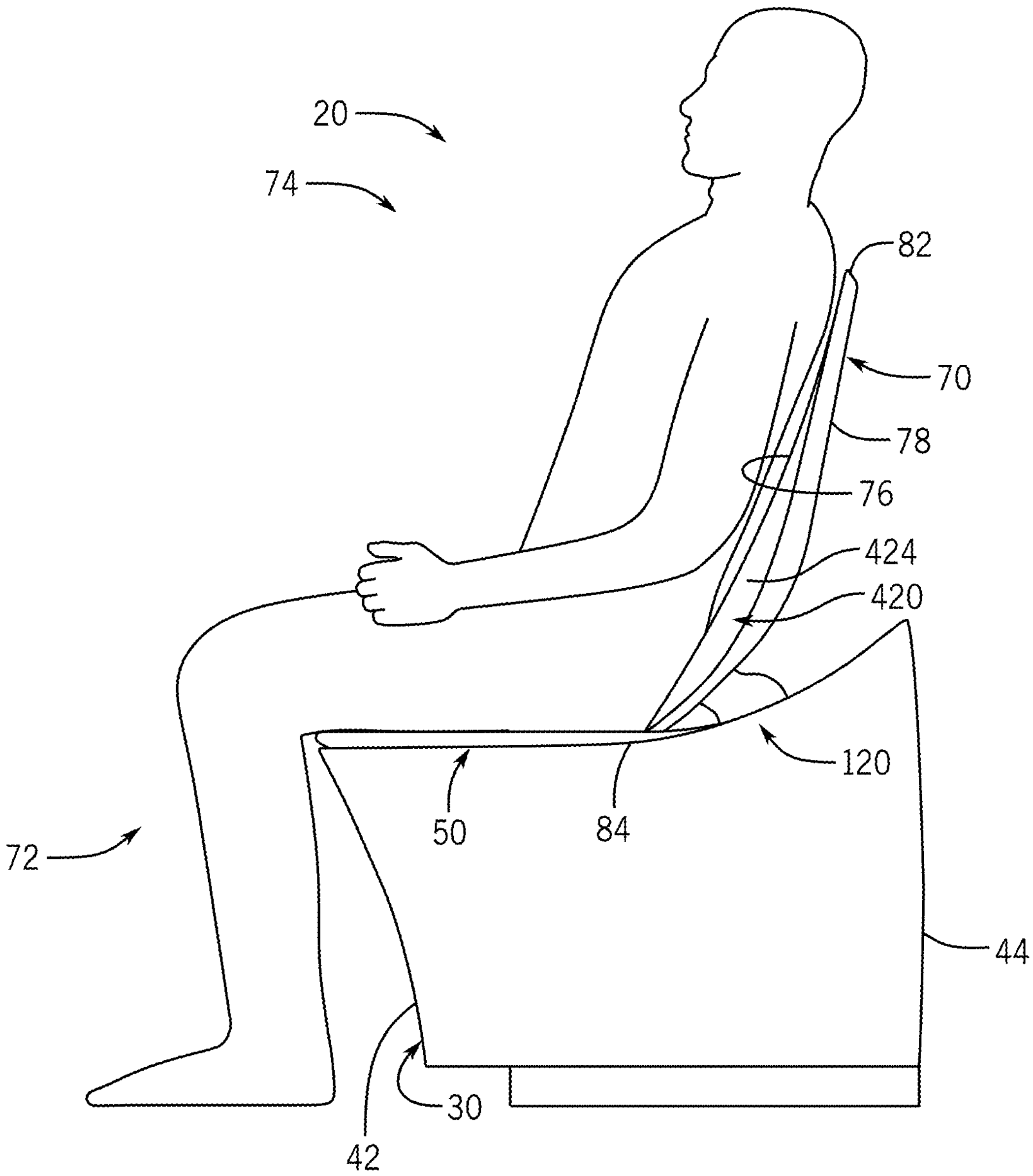
FIG. 33 is a side view of the toilet of FIG. 1 with a user sitting on the seat.
Figure 35:
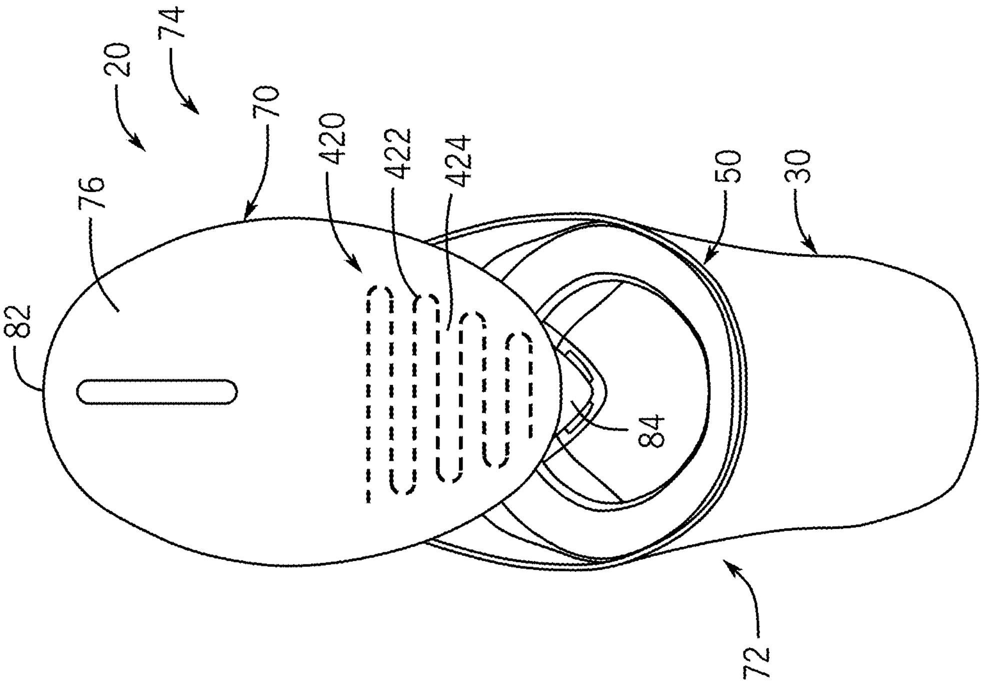
FIG. 35 is a front view of the toilet of FIG. 1 with the cover in the open position and the seat in the use position according to another embodiment.
Figure 34:
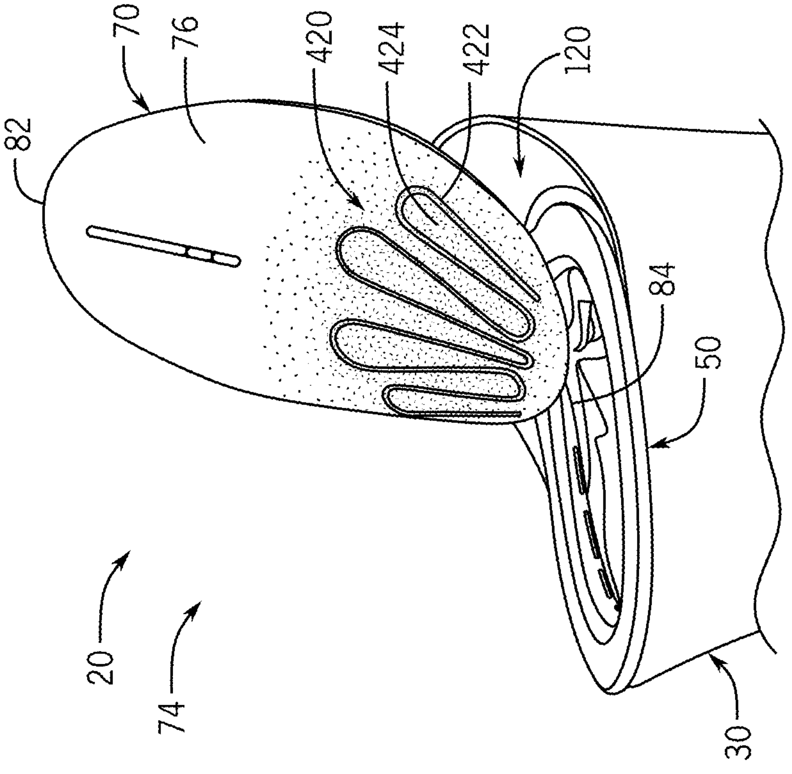
FIG. 34 is a perspective view of the toilet of FIG. 1 with the cover in the stowed position and the seat in the lowered position.

Accordingly, as shown in FIGS. 33-35, the toilet 20 includes a body or heating mechanism 420 within the cover 70 that is configured to heat or warm at least a portion of the user's upper body, in particular the user's back when the cover 70 is in the stowed position 74, as shown in FIG. 33. It should be appreciated that the heating mechanism 420 may be similarly applied to the cover 70' of the toilet 20', according to another exemplary embodiment. The heating mechanism 420 may provide heat to a lower portion of the cover 70 (relative to when the cover 70 is in the stowed position 74) in order to warm the lower back of the user. It may be particularly advantageous to warm the lower back of the user in order provide heat relief for female users with menstruation cramps or back aches. The heating mechanism 420 may provide heat to only the lower portion of the cover 70 to warm only the lower back of the user, may provide heat to other areas of the cover 70 in order to warm other areas of the user's back, or may provide heat to the entire cover 70 in order to warm the entire back of the user.

As shown in FIGS. 34-35, the heating mechanism 420 includes a heating element 422 that is positioned within the cover 70 that radiates heat from within the cover 70. The heating element 422 may be configured in a variety of different ways and configurations, as shown, for example, between FIG. 34 and FIG. 35. According to an exemplary embodiment, the heating element 422 is configured as a wire that extends in a longitudinal direction along at least a portion of the length of the cover 70, as shown in FIG. 34, and/or extends in a lateral direction along the width of the cover 70, as shown in FIG. 34, for at least a portion of the length of the cover 70. The wiring for the heating mechanism 420 may extend through the opening mechanism 120 that movably connects the cover 70 to the base 30 (as described further herein) in order to provide power for the heating mechanism 420. The heating mechanism 420 may be operatively coupled to a control system (e.g., control system 500 shown in FIG. 41, etc.) to enable electronic control of the heating mechanism 420 in response to a user input (e.g., via a control structure 520 on the cover 70, etc.).

When the heating mechanism 420 is turned on, the heating element 422 creates a heated area 424 along the cover 70 that is a warmed or heated portion of the cover 70. The size and position of heated area 424 directly depends on the size and position of the cover 70 that the heating element 422 extends along and provides heat to or that heat from the heating element 422 can easily transmit to.

The heating element 422, and therefore the heated area 424, extends along at least a portion of the length of the cover 70 between the back end 84 of the cover 70 and the front end 82 of the cover 70. According to one embodiment, the heating element 422 extends completely between the back end 84 of the cover 70 and the front end 82 of the cover 70 and therefore covers and heats the entire area of the cover 70 between the back end 84 and the front end 82. According to another embodiment, the heating element 422 extends along only a portion of the cover 70 between the back end 84 and the front end 82. For example, as shown in FIGS. 34-35, the heating element 422 extends along less than half of the length of the cover 70, where the length of the cover 70 extends between the front end 82 and the back end 84, and the heating element 422 is positioned closer toward the back end 84 of the cover 70 (e.g., along a lower region of the cover 70 relative to when the cover 70 is in the stowed position 74) than the front end 82 of the cover 70 in order to align with and provide heat to the lower back of the user. As described further herein, the cover 70 is pivotably coupled to the base 30 along a region of the cover 70 that is closer to the back end 84 of the cover 70 than the front end 82 of the cover 70.

The heating mechanism 420 may be configured to only provide heat to the top surface 76 of the cover 70 since the top surface 76 of the cover 70 is closest to (or directly abutting) the back of the user when the user is seated on the seat 50. Accordingly, the heating element 422 is positioned closer to the top surface 76 of the cover 70 than the bottom surface 78 of the cover 70, such that heat is directed toward only one side of the cover 70 (i.e., the top surface 76) and the heated area 424 extends substantially only along the top surface 76 of the cover 70, rather than the bottom surface 78 of the cover 70, so as to not waste energy. According to one embodiment, the heating element 422 extends along the top surface 76 of the cover 70. The heating element 422 may extend completely between the front end 82 and the back end 84 of the cover 70 such that the entire top surface 76 is heated by the heating element 422 or may extend along only a portion of the cover 70 between the front end 82 and the back end 84 such that only a portion (e.g., a lower region (relative to when the cover 70 is in the stowed position 74) that is closer to the back end 84) of the top surface 76 is heated by the heating element 422. As described further herein, the opening mechanism 120 moves the cover 70 such that the top surface 76 of the cover 70 is visible and faces toward the front end 42 of the base 30 in the stowed position 74 (and the bottom surface 78 of the cover 70 is hidden and faces toward the back end 44 of the base 30). Therefore, in the stowed position 74, the top surface 76 of the cover 70 is closest to the back of the user (relative to the bottom surface 78 of the cover 70) and is configured to support the back of the user if the user leans back while sitting on the seat 50.

In order to use the heating mechanism 420 (as shown in FIG. 33), the user opens the cover 70 into the stowed position 74 (leaving the seat 50 in the lowered position 72), sits on the top surface 56 of the seat 50 (facing toward the front end 42 of the base 30), and turns on the heating mechanism 420 by providing a user input (e.g., by actuating a control 522 of a control structure 520 on the cover 70 shown in FIGS. 36-40, etc.). Since the top surface 76 of the cover 70 faces toward the back of the user in this position, the user can warm their back by leaning back on or against the top surface 76 of the cover 70 while seated on the toilet 20 and while the cover 70 is in the stowed position 74.

Control Structure

Generally speaking, most conventional toilets are controlled (e.g., flushed, etc.) with a control or actuator (e.g., a lever, etc.) positioned along the body of the toilet, such as on a tank of the toilet. However, the control(s) on a conventional toilet may not always be convenient for a user to access.

Figure 36:
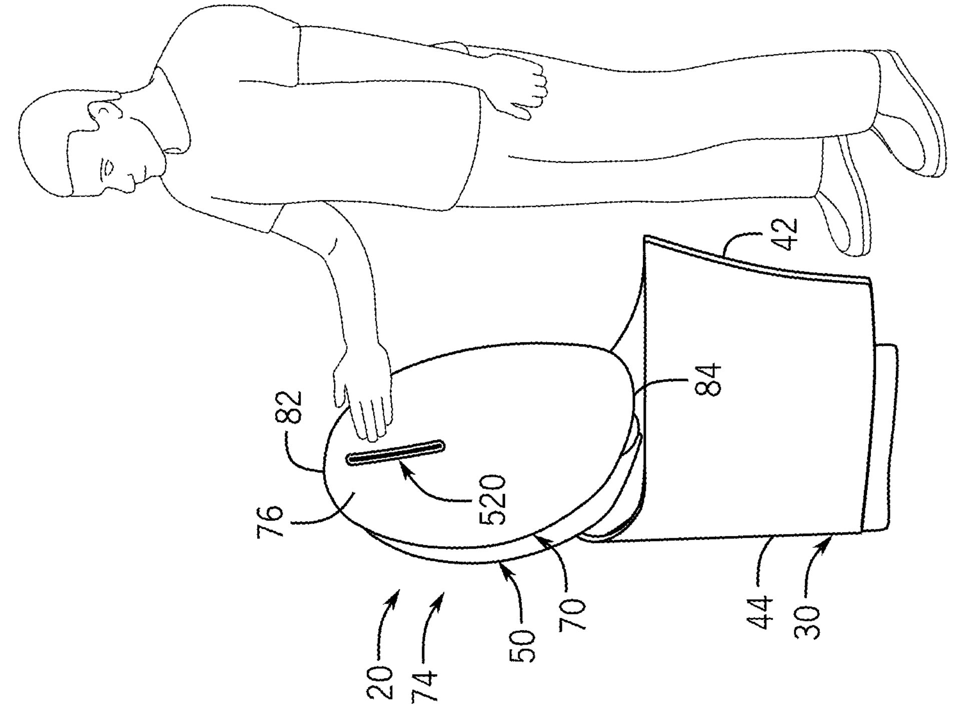
FIG. 36 is a perspective view of the toilet of FIG. 1 being operated by a user.

Accordingly, as shown in FIGS. 36-40, the toilet 20 includes a control structure 520 that is configured to control one or more features of the toilet 20. It should be appreciated that the control structure 520 may be similarly applied to the cover 70' of the toilet 20' to enable the control of one or more features of the toilet 20', according to another exemplary embodiment. Due to the positioning of the control structure 520 (as described further herein), the control structure 520 is readily accessible to a user, as shown in FIG. 36. The control structure 520 may form part of a control system 500 that can be integrated in and/or coupled to each of the toilets 20,20' to enable automatic or electronic activation of various functions of the toilets 20,20', as described in further detail herein.

Figure 37:
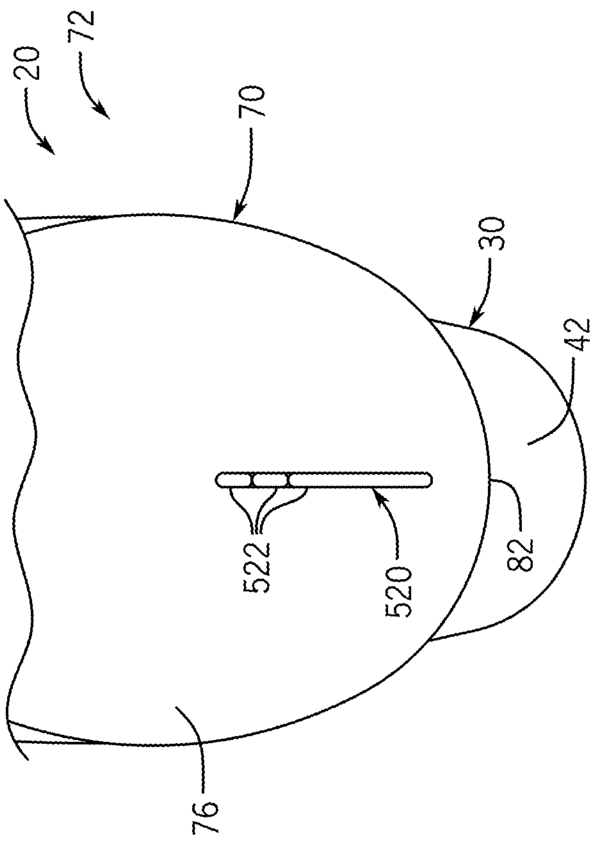
FIG. 37 is a top view of a portion of the toilet of FIG. 1.

As shown in FIG. 37, the control structure 520 includes at least one control 522 (e.g., button, actuator, etc.) that the user can press or activate to control a feature of the toilet 20. The controls 522 are configured to control a variety of different functions or features of the toilet 20, including but not limited to controlling the opening mechanism 120 (i.e., to move the seat 50 and/or the cover 70), the vacuum mechanism 220, the heating mechanism 420, the flush mechanism 620 (full and/or partial flushing), and the bidet mechanism

840. The controls 522 may optionally be touchless controls (e.g., proximity sensors, capacitive sensors, etc.). The various controls 522 may be a variety of different sizes and shapes. As shown in the embodiment of FIG. 37, the controls 522 are buttons that extend substantially in the lengthwise direction of the cover 70, where the lengthwise direction of the cover 70 extends between the front end 82 and the back end 84 of the cover 70. One of the controls 522 is substantially longer than the other controls 522, and therefore may have a more important or used function, such as controlling the flush mechanism 620, but each of the controls 522 may have the same width. According to one embodiment as shown in FIG. 37, multiple controls 522 are aligned with each other along the lengthwise direction of the cover 70.

The controls 522 may be electronic and/or mechanical controls. For example, according to one embodiment, one of the controls 522 may send an electronic signal to flush the toilet 20 (e.g., to activate the flush mechanism 620, etc.). According to another embodiment, one of the controls 522 may pull a wire to flush the toilet 20 (e.g., to activate the flush mechanism 620). The electronic or mechanical wiring for the controls 522 may extend through the opening mechanism 120 that movably attaches the cover 70 and the base 30, as described further herein.

Figure 38:
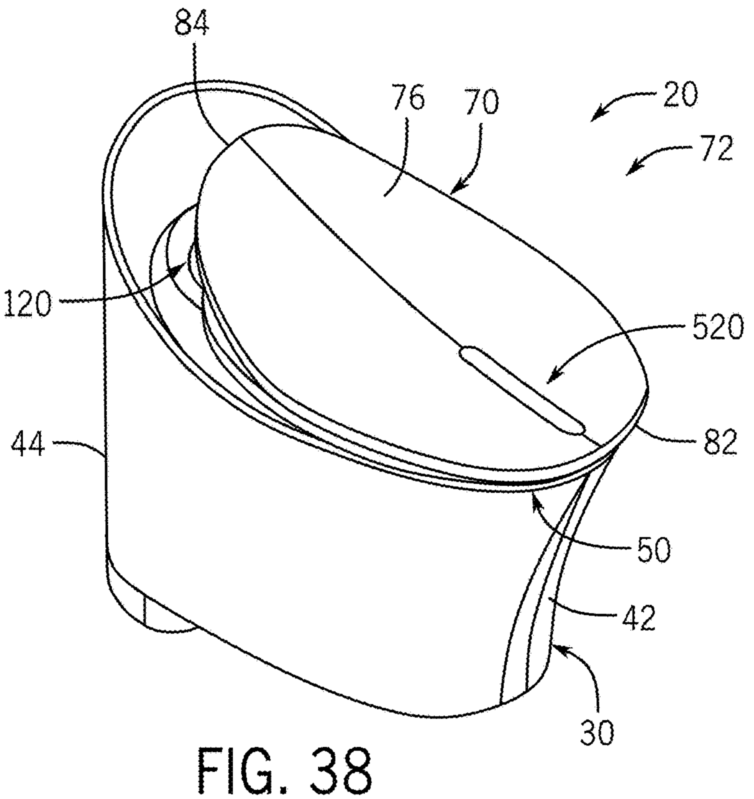
FIG. 38 is a perspective view of the toilet of FIG. 1.
Figure 39:
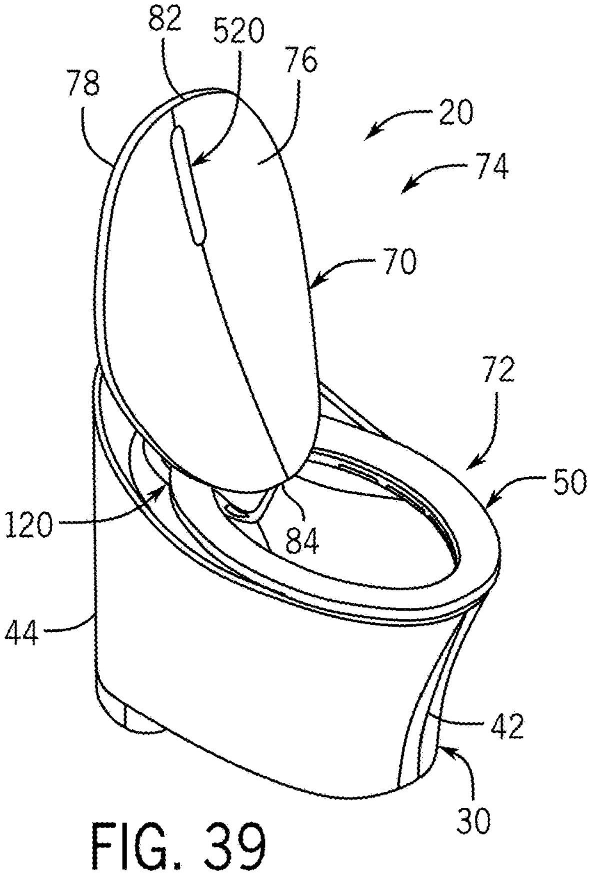
FIG. 39 is a perspective view of the toilet of FIG. 1 with the cover in the stowed position and the seat in the lowered position.
Figure 40:
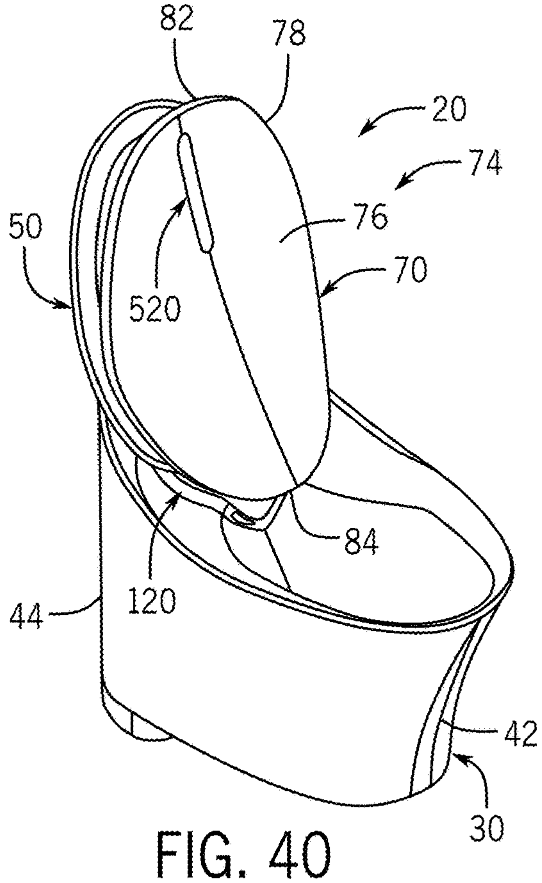
FIG. 40 is a perspective view of the toilet of FIG. 1 with the cover and the seat in the stowed position.

As shown in FIGS. 38-40, the control structure 520 is positioned along the top surface 76 of the cover 70, such the control structure 520 is exposed and readily accessible to a user, regardless of the position of the cover 70. Accordingly, the control structure 520 is exposed, readily accessible, and visible to the user (i.e., from the front end 42 of the base 30) regardless of the position of the cover 70 and regardless of the position of the seat 50 (i.e., in both the lowered position 72 and the stowed position 74). As described further herein, the cover 70 is movable between the lowered position 72 and the stowed position 74. The opening mechanism 120 moves the cover 70 such that, in the lowered position 72, as shown in FIG. 38, the top surface 76 of the cover 70 is visible and faces away from the base 30 and the bottom surface 78 of the cover 70 is hidden and faces toward the base 30, and, in the stowed position 74, as shown in FIGS. 39-40, the top surface 76 of the cover 70 is visible and faces toward the front end 42 of the base 30 in the stowed position 74 and the bottom surface 78 of the cover 70 is hidden and faces toward the back end 44 of the base 30. Accordingly, the top surface 76 of the cover 70 is visible and exposed (relative to the front end 42 of the base 30) in both the lowered position 72 and the stowed position 74, regardless of the position of the seat 50. This configuration allows the control structure 520, which is on the top surface 76 of the cover 70, to be exposed, visible, and readily accessible to the user (i.e., from the front end 42 of the base 30), regardless of the position of the cover 70 and the seat 50.

Furthermore, as shown in FIGS. 38-40, the control structure 520 is positioned closer to the front end 82 of the cover 70 than the back end 84 of the cover 70 in order to be closer to a user and more readily accessible. More specifically, the control structure 520 is positioned along the upper region of the cover 70, relative to when the cover 70 is in the stowed position 74. As described further herein, the cover 70 is pivotably coupled to the base along a region of the cover 70 that is closer to the back end 84 of the cover 70 than the front end 82 of the cover 70. Accordingly, the control structure 520 is positioned toward the front end 42 of the base 30 when the cover 70 is in the lowered position 72, as shown in FIG. 38, and is positioned relatively high above the base 30 when the cover 70 is in the stowed position 74, regardless of the position of the seat 50. Therefore, since the control structure 520 is positioned near the front end 82 of the cover 70, when the cover 70 is in the lowered position 72, the control structure 520 is positioned toward and relatively close to the front end 42 of the base 30) relative to the opening mechanism 120 and the back end 84 of the cover 70). When the cover 70 is in the stowed position 74, the control structure 520 is positioned relatively high (relative to the opening mechanism 120 and the back end 84 of the cover 70) so that the user can easily access and use the control structure 520 from a standing position and does not have to bend down, as shown in FIG. 36.

Figure 41:
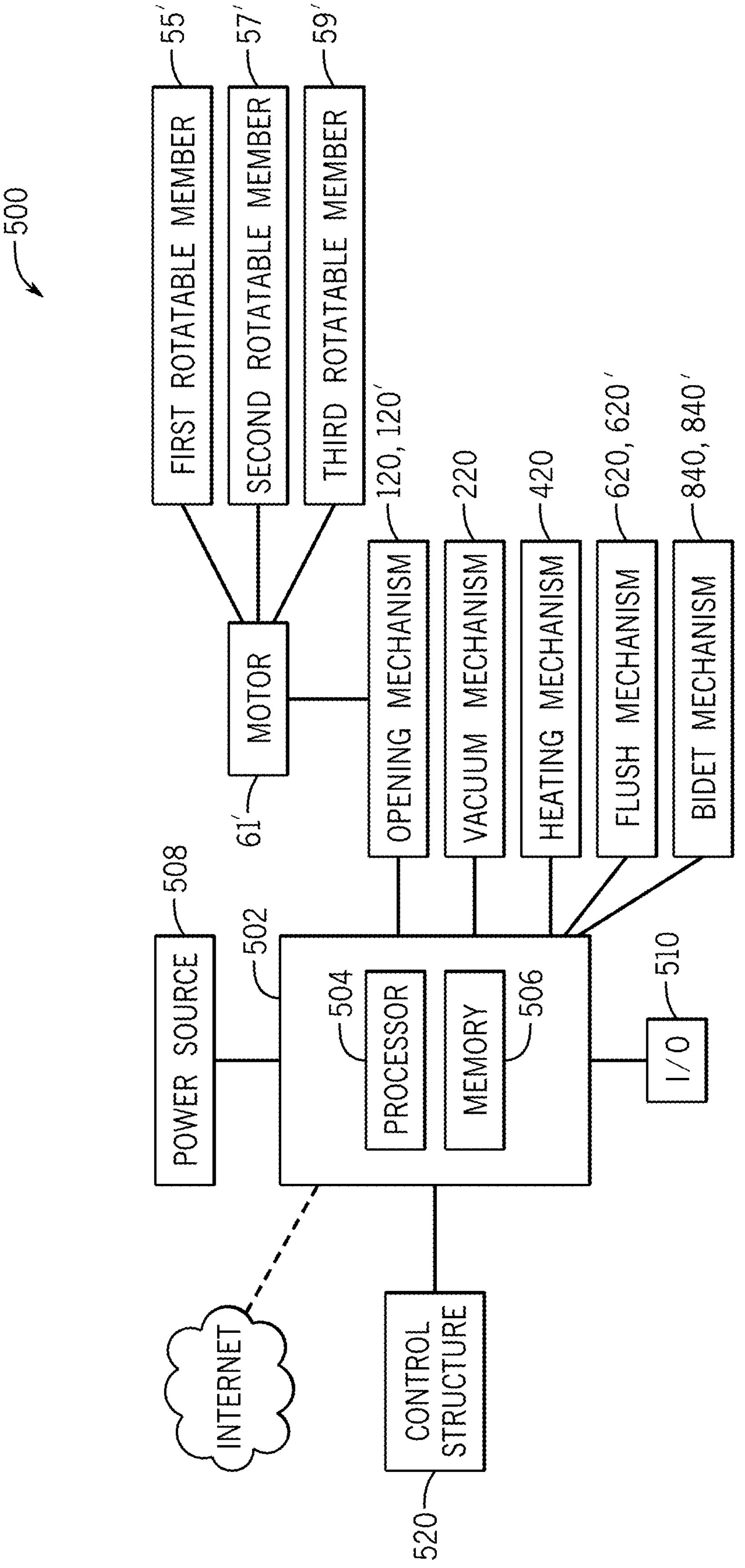
FIG. 41 is a schematic view of a control system of the toilets of FIGS. 1 and 12 according to an exemplary embodiment.

Referring to FIG. 41, a control system 500 for each of the toilets 20,20' to enable various functions of the toilets 20,20' is shown according to an exemplary embodiment. The control system 500 includes a processing circuit 502 that is cooperatively defined by a processor 504 and a memory 506. In the various embodiments described herein, the processor 504 may be implemented as a general-purpose processor, an application specific integrated circuit (ASIC), one or more field programmable gate arrays (FPGAs), a digital-signal-processor (DSP), a group of processing components, or other suitable electronic processing components. Memory 506 is one or more devices (e.g., RAM, ROM, Flash Memory, hard disk storage, etc.) for storing data and/or computer code for facilitating the various processes described herein. In other embodiments, memory 506 may be a portable storage device such as an SD card, a micro SD card, or other similar type of portable storage device. Memory 506 may be or include non-transient volatile memory or non-volatile memory. Memory 506 may include database components, object code components, script components, or any other type of information structure for supporting the various activities and information structures described herein. Memory 506 may be communicably connected to processor 504 and provide computer code or instructions to processor 504 for executing the processes described herein.

Still referring to FIG. 41, the processing circuit 502 is powered by a power source 508. According to an exemplary embodiment, the power source 508 is a battery pack that is coupled to the toilets 20,20', such as in the bases 30,30' or in the covers 70,70'. The power source 508 may be coupled in a rear portion of the covers 70,70', such that the power source 508 can also function as a counterweight to help enable rotational movement of the covers 70,70' about the angled axes 124,124'. According to another exemplary embodiment, the power source 508 is located remotely from the toilets 20,20'. The control system 500 further includes an I/O communications interface 510 that can allow for electronic communication between the toilets 20,20' and a mobile communication device, such as a smartphone, a tablet, a laptop, etc., so as to enable the remote control and programming of various functions of the toilets 20,20'. The I/O communications interface 510 may also be configured to provide various feedback signals to a user, such as audible, visual, or other types of signals to indicate various states, functions, or conditions of the toilets 20,20' (e.g., the heating mechanism 420 is operating, the vacuum mechanism 220 has completed an odor removal process, etc.). In addition, the I/O communications interface 510 may include a microphone or similar device coupled to the toilet 20' to allow a user to use voice commands to control various functions of the toilet 20'. The processing circuit 502 may be operatively coupled to the Internet to enable, for example, over-the-air software updates for various components of the toilets 20,20', downloading diagnostic information, use information, or the like.

Still referring to FIG. 41, the processing circuit 502 is also operatively coupled to the control structure 520 to enable the operation of, for example, the opening mechanisms 120,120' (e.g., motor 61', etc.), the vacuum mechanism 220, the heating mechanism 420, the flush mechanisms 620,620', and the bidet mechanisms 840,840'. The control structure 520 may include a plurality of controls 522 that are associated with the opening mechanisms 120,120' (e.g., motor 61', etc.), the vacuum mechanism 220, the heating mechanism 420, the flush mechanisms 620,620', and the bidet mechanisms 840,840', respectively.

For example, a user can selectively operate the motor 61' to move the cover 70' and the seat 50' between the lowered position 72' and the stowed position 74' by pressing or activating a control 522 on the control structure 520 associated with controlling the movement of the cover 70' and/or the seat 50'. Alternatively, a user may send a control signal via a software application available on a mobile communication device to the processing circuit 502 via the I/O communication interface 510, so as to remotely control the movement of the cover 70' and/or the seat 50'. A control signal can be sent from the processing circuit 502 to, for example, the motor 61' to control the movement of the cover 70' and/or the seat 50'. The control structure 520 may include a plurality of controls 522 associated with the various components of the opening mechanism 120', such as the first rotatable member 55', the second rotatable member 57', and the third rotatable member 59', respectively, so as to allow for the selective and independent control of rotation of the cover 70' and/or the seat 50' about the angled axis 124' (e.g., to move the cover 70' and the seat 50' between the lowered position 72' and the stowed position 74') or translation of the cover 70' and the seat 50' along the angled axis 124' (e.g., to assist a user with standing from a seated position on the seat 50'). It should be understood that the control structure 520 may include additional controls 522 to control other features of the toilets 20,20' in a similar manner described above, such as the vacuum mechanism 220, the heating mechanism 420, the flush mechanisms 620,620', and the bidet mechanisms 840,840'.

Flush Mechanism

Typically, flush mechanisms within some conventional toilets discharge water from a tank into a toilet bowl through two different types of openings: a rim opening and/or a siphon-jet opening. The rim opening is typically positioned around an inner perimeter of the toilet bowl such that water flows from the tank, through a waterway in the rim, through the rim opening, and downward along the inside surface of the toilet bowl. The siphon-jet opening is typically positioned in a lower or bottom portion of the toilet bowl, such that water flows from the tank and directly to the bottom of the toilet bowl and into the trapway, which draws out or pushes out all of the water and waste from the bowl and into the drain by creating a siphon effect. However, conventional flush mechanisms may cause splash or mist to exit out of the top of the toilet bowl while flushing, which may cause the surrounding area to be unsanitary and dirty and may not adequately clean the toilet bowl.

Figure 42:
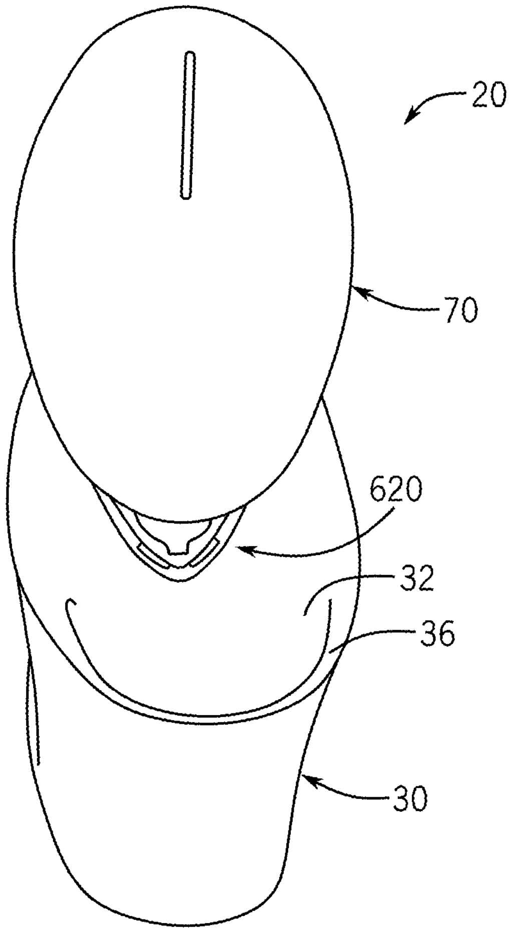
FIG. 42 is a front perspective view of the toilet of FIG. 1 with a flush mechanism according to an exemplary embodiment.

Accordingly, as shown in the embodiment of FIGS. 42-49, the toilet 20 has a toilet flush mechanism 620 that simplifies the structure of the toilet 20 (compared to conventional toilets), substantially prevents splash, mist, or bacteria from leaving the bowl 32 by capturing the splash, mist, and bacteria, and self-cleans the bowl 32. It should be appreciated that the flush mechanism 620 may be similarly applied to the toilet 20', according to another exemplary embodiment. As shown in FIG. 42, the flush mechanism 620 is positioned at and expels or dispenses water from the upper, rear, center portion of the bowl 32 (i.e., near and in front of the opening mechanism 120, as shown further herein) in order to allow the water from the flush mechanism 620 to reach all of the inner sides of the bowl 32. As explained further herein, the flush mechanism 620 replaces the need for any other type of flush mechanism that expels or dispenses water from other areas of the toilet (e.g., the rim openings or the siphon jet opening at the bottom of the bowl). Accordingly, the flush mechanism 620 provides only one source of water being dispensed into the bowl 32 such that water is only being dispensed into the bowl 32 from the upper, rear, center of the bowl 32. The openings of the flush mechanism 620 (i.e., the water layer opening 634 and the water jet openings 674) are the only openings that dispense water into the bowl 32. Additionally, it is understood that, although water is referred to herein, a variety of other types of fluids may be used (e.g., a mixture of water and soap, etc.), according to the desired configuration.

Figure 43:
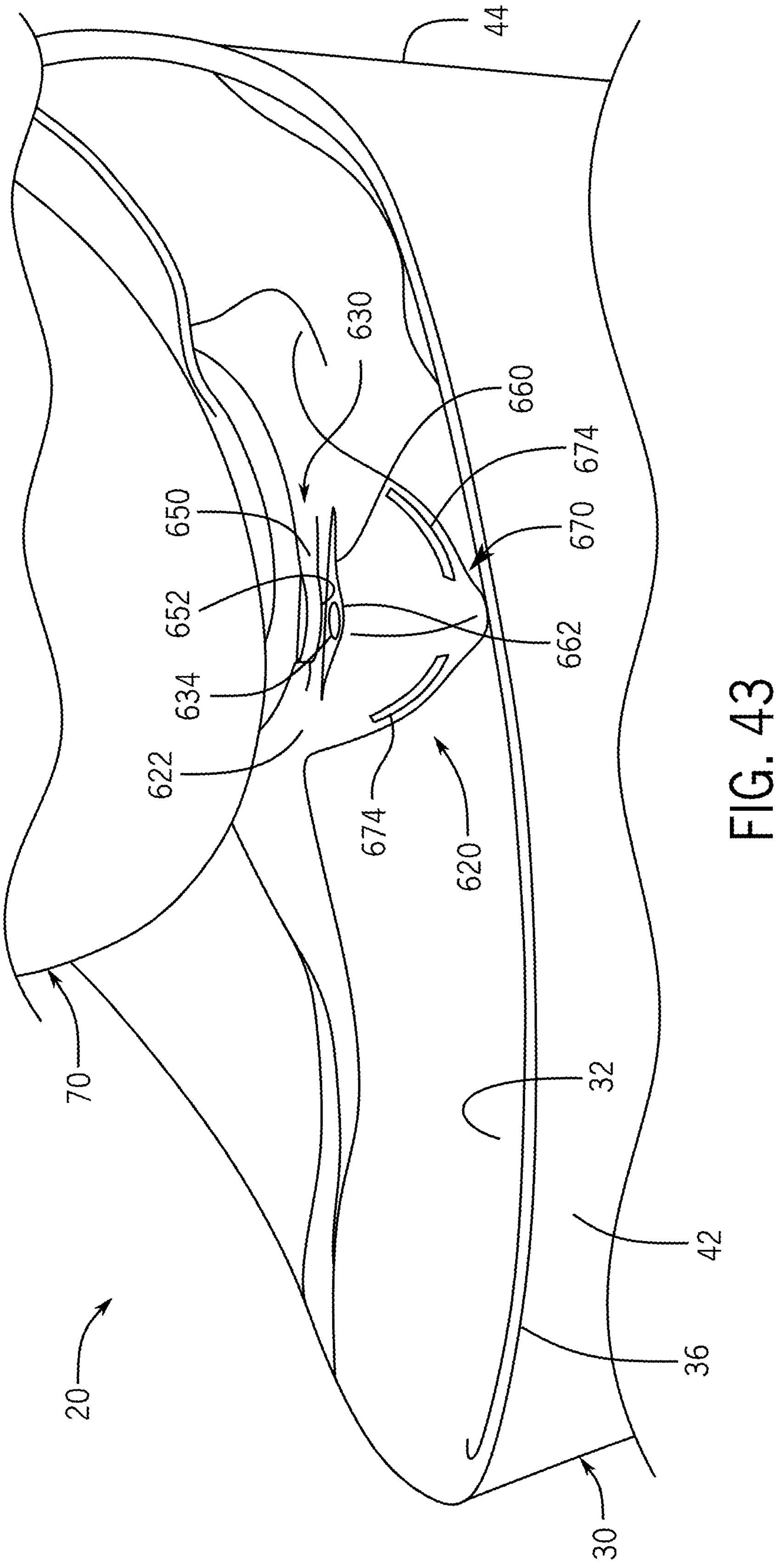
FIG. 43 is a detail view of the flush mechanism of FIG. 42.

As shown in FIG. 43, the flush mechanism 620 has two different types of water dispensers (i.e., a water layer dispenser 630 and a water jet dispenser 670) that water can flow through. The water layer dispenser 630 and the water jet dispenser 670 are each configured to dispense the water from the top, back portion of the bowl 32 and into the bowl 32 at the same time and in different manners, as described further herein, in order to contain substantially all of the water and waste within the bowl 32 (e.g., to prevent any spray or mist from leaving the bowl 32 while flushing) and to allow the toilet 20 to be self-cleaning by thoroughly cleaning the bowl 32, respectively. When the flush mechanism 620 is first activated, the water may flow from the flush mechanism 620 at full force or full pressure and then may be reduced.

Figure 44:
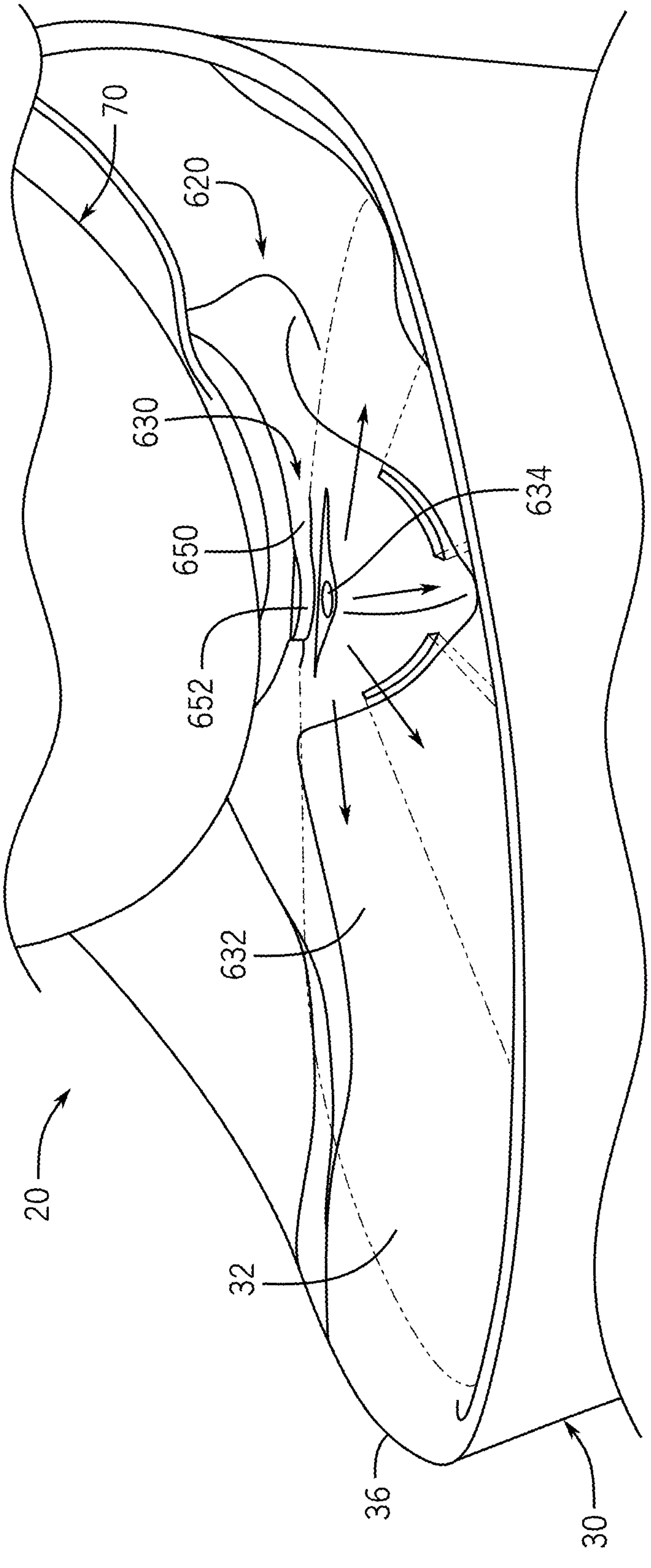
FIG. 44 is a perspective view of a water layer dispenser of the flush mechanism of FIG. 42 dispensing water.

As shown in FIG. 43, the flush mechanism 620 has a body 622 that defines the water layer dispenser 630 and the water jet dispenser 670 and defines at least respective conduits (e.g., passages, passageways, channels, waterways, tubes, ducts, etc.) for each of the water layer dispenser 630 and the water jet dispenser 670. The conduits extend through and within the body 622 and route water through each of the water layer dispenser 630 and the water jet dispenser 670. As shown in FIG. 44, the conduits each have a conduit inlet for water to flow into each of the respective conduits and a conduit outlet (i.e., the water layer opening 634 and the water jet openings 674) for water to flow out of each the conduits.

Figure 46:
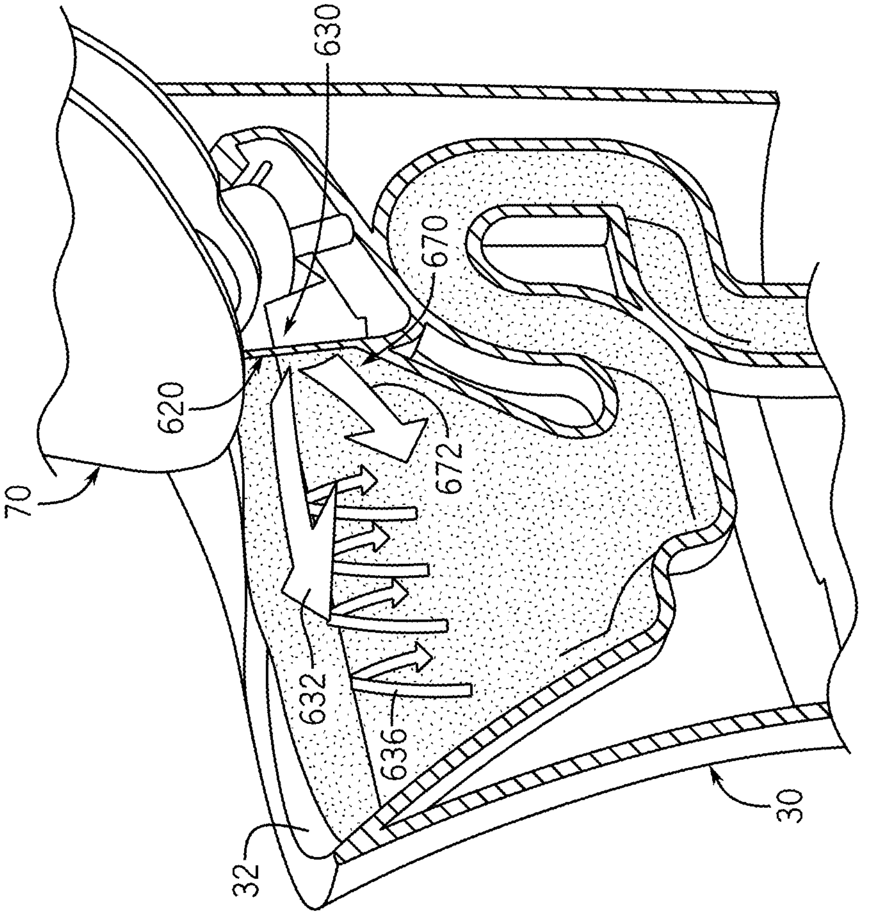
FIG. 46 is a cross-sectional view of the water layer dispenser of FIG. 44 dispensing water.
Figure 45:
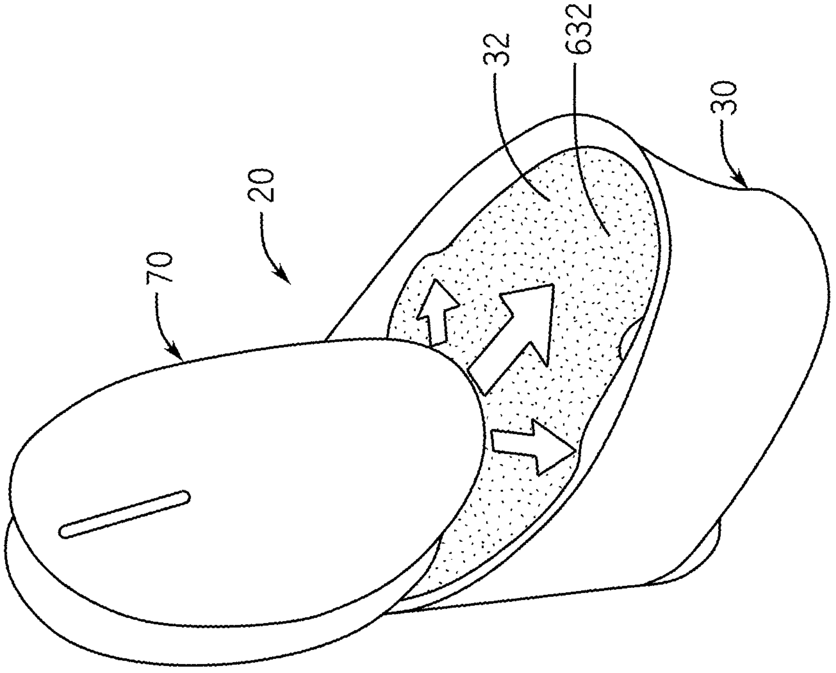
FIG. 45 is a perspective view of the water layer dispenser of FIG. 44 dispensing water.
Figure 47:
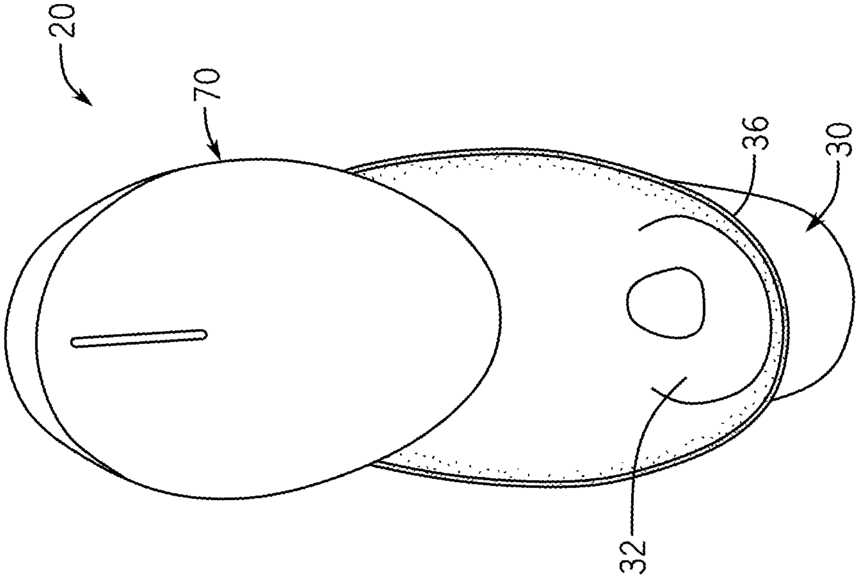
FIG. 47 is a perspective view of the toilet of FIG. 1 with the cover and the seat in the stowed position.
Figure 48:
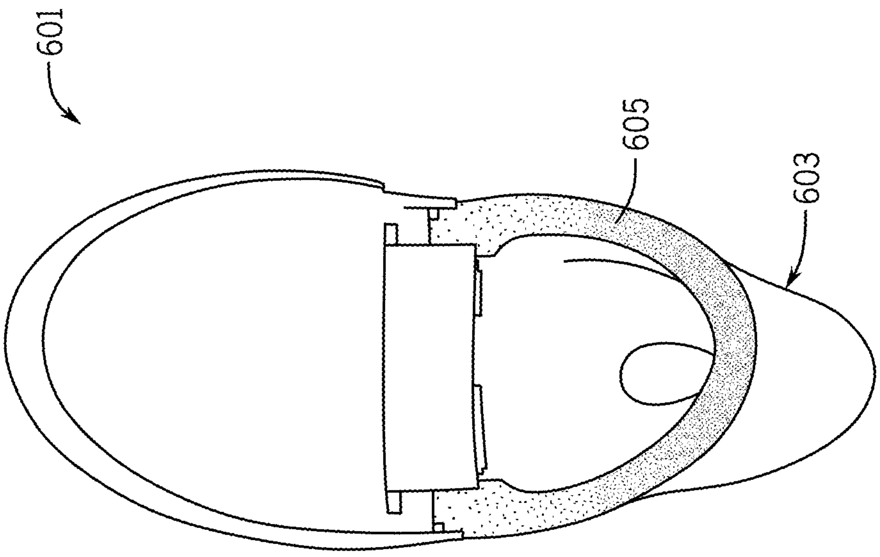
FIG. 48 PRIOR ART
FIG. 48 is a perspective view of a conventional toilet according to the prior art.

The water layer dispenser 630 of the flush mechanism 620 (e.g., the water foil dispenser) creates a substantially laminar flow of the water as the water exits out of the water layer dispenser 630 and into the bowl 32. As described further herein (and as shown in FIGS. 44-46), the water layer dispenser 630 dispenses water into the bowl 32 as a water fan, blade, or layer 632 that extends, sprays, or flows widely and completely across the entire top opening of the bowl 32 and accordingly substantially covers a lower portion of the bowl 32. The water layer dispenser 630 replaces the rim flush mechanism of conventional toilets and allows the flush mechanism 620 to be completely separate from the rim of the bowl 32 which reduces the cost of the toilet 20. The water layer 632 from the water layer dispenser 630 helps clean the bowl 32 and acts as a splash guard by preventing any mist and splash 636 (of water or waste) from leaving the bowl 32 (as shown in FIG. 46), which maintains the cleanliness of the area surrounding the toilet 20. Comparatively, conventional flush mechanisms in conventional toilets create both splash and mist, which makes the area surrounding the conventional toilet unsanitary and dirty.

In order to create the water layer 632, and the substantially laminar flow of the water, the water layer dispenser 630 includes a water layer opening 634 and a top protrusion 650, as shown in FIG. 43. The water layer nozzle or opening 634 is positioned at the top, back, center of the bowl 32. Additionally, the water layer opening 634 is aimed substantially upward and positioned directly beneath the top protrusion 650 such that any water being expelled through the water layer opening 634 is directed upward toward the top protrusion 650.

As shown in FIGS. 43-44, the top lip, extension, or protrusion 650 extends or protrudes above or over the water layer opening 634 in order to intercept the water flowing from the water layer opening 634 and to thus create laminar flow and form the water layer 632. The top protrusion 650 is vertically spaced apart from the water layer opening 634 in order to provide an area for the water layer 632 to flow out of between the top protrusion 650 and the water layer opening 634. The top protrusion 650 has a substantially horizontal bottom surface 652 that is positioned directly vertically above, but slightly spaced vertically apart from, the water layer opening 634 such that water exiting from the water layer opening 634 directly contacts and impacts the bottom surface 652 after exiting out of the water layer opening 634. Accordingly, the bottom surface 652 of the top protrusion 650 deflects the water flowing upwardly out from the water layer opening 634 and shapes the water into the water layer 632.

According to one embodiment, the water layer dispenser 630 may also include a bottom protrusion 660 that extends from the body 622 of the flush mechanism 620, directly underneath the top protrusion 650 and optionally around the water layer opening 634. The bottom protrusion 660 includes a top surface 662 that extends in front of the water layer opening 634. The top surface 662 of the bottom protrusion 660 may be angled relative to the bottom surface 652 of the top protrusion 650 in order to provide a greater area for the water to exit the water layer dispenser 630 as a water layer 632 flowing between the bottom surface 652 of the top protrusion 650 and the top surface 662 of the bottom protrusion 660. According to an alternative embodiment, the water layer dispenser 630 may not include the bottom protrusion 660.

As shown in FIGS. 44-46, water flows from the water layer dispenser 630 as a water layer 632 into the bowl 32. In order to create the water layer 632, the water enters into the water layer dispenser 630, flows through the water layer conduit within the body 622 of the flush mechanism 620, and then exits the water layer conduit through the water layer opening 634. When the water exits the water layer opening 634, the water layer dispenser 630 dispenses and directs the water upwardly through the water layer opening 634 toward the bottom surface 652 of the top protrusion 650 such that the water hits or contacts the bottom surface 652 of the top protrusion 650. When the water contacts or hits the bottom surface 652 of the top protrusion 650, the bottom surface 652 deflects the water and fans the water out into the water layer 632. More specifically, the bottom surface 652 forces the water to change from the upward, conduit flow into a fan or substantially laminar flow and subsequently splays, deflects, or fans the water layer 632 outward across the bowl 32. Accordingly, the water subsequently flows along the length of the bottom surface 652 of the top protrusion 650 and eventually flows completely out of the water layer dispenser 630 (and the flush mechanism 620) as a substantially horizontal water layer 632 extending from the top, back portion of the bowl 32.

The water layer 632 flows out from and exits out of the water layer dispenser 630 as a substantially flat and laminar fan or sheet of water that extends over and covers the entire top opening of the bowl 32, as shown in FIGS. 44-46. Accordingly, the water layer 632 extends and flows from the water layer dispenser 630 from the top, back portion of the bowl 32, across and over a center portion of the bowl 32, and all the way to the front portion and inner sides of the bowl 32, thus allowing all the inner sides of the bowl 32 to be rinsed and cleaned. As shown in FIGS. 45-46, the center portion of the water layer 632 is completely spaced apart from any walls or surfaces of the bowl 32 along the center portion of the bowl 32. Comparatively, conventional liquid dispensers that create laminar flow cause the liquid to flow in a stream, rather than a substantially flat fan. Furthermore, unlike conventional liquid dispensers creating laminar flow, the water layer dispenser 630 does not use or require an aerator to create the laminar flow.

Due to the laminar flow, the water layer dispenser 630 minimizes the amount of splash that the water layer 632 creates as the water flows and when the water layer 632 hits the inner sides of the bowl 32. Furthermore, by creating a water cover over the top opening of the bowl 32, the water layer 632 substantially prevents any mist, bacteria, and splash 636 from escaping the bowl 32 (by capturing the mist, bacteria, and splash 636) when the toilet 20 is flushed, regardless as to whether the cover 70 is in the stowed position 74 or lowered position 72, as shown in FIG. 46. Comparatively, conventional flush mechanisms can create splash or mist that exits out of the bowl and into the bathroom, which may cause the surrounding area to be unsanitary and dirty.

Additionally, the water layer 632 is relatively less opaque than water flowing from conventional liquid dispensers that create laminar flow, which may be due to air within the liquid flow due to the aerator within conventional liquid dispensers. Accordingly, the water layer 632 may appear more clear or transparent, which may be due to less air within the water layer 632 due to the configuration of the water layer dispenser 630 and the lack of an aerator within the water layer dispenser 630.

The dimensions of the water layer dispenser 630, in particular the top protrusion 650 and the bottom protrusion 660, may vary according to the desired configuration. For example, the width of the top protrusion 650 and/or bottom protrusion 660 may be wider than the diameter of the water layer opening 634. The relative dimensions and ratios of dimensions of different portions of the water layer dispenser 630 may also vary according to the desired configuration and the fluid flow. The relative dimensions, ratios of dimensions, and flow rate of the water may affect how the water flows out of the water layer dispenser 630 and the laminar flow of the water layer 632. For example, the diameter of the water layer opening 634, the angle between the longitudinal axis of the conduit and the bottom surface 652 of the top protrusion 650 (i.e., the angle of the water exiting through the water layer opening 634 (and before hitting the bottom surface 652 of the top protrusion 650)), and the gap or distance between the water layer opening 634 and the bottom surface 652 of the top protrusion 650 may vary according to the desired configuration of the water layer dispenser 630, according to each other in order to obtain an optimal dimensional ratio to create an water layer 632, and according to the size of the bowl 32.

The water layer 632 flowing out of the water layer dispenser 630 can flow in a variety of different widths according to the desired configuration and according to the size of the bowl 32 in order to reach all of the inner sides of the bowl 32. For example, the water layer 632 may flow out from the water layer dispenser 630 at approximately 120° in width, although it is understood that the water layer dispenser 630 can be configured such that the water layer 632 flows out from the water layer dispenser 630 at any angle greater or less than 120° in width. Comparatively, conventional liquid dispensers that create laminar flow are limited in how wide the liquid can flow out from the liquid dispenser and thus do not allow the liquid to flow in as wide of a sheet as the water layer dispenser 630.

The water may flow through the water layer dispenser 630 at a variety of different flow rates. For example, the water may flow through the water layer dispenser 630 at a flow rate between approximately 1 to 2 gallon/minute. However, it is understood that the flow rate of the water may be equal to or greater than approximately 2 gallons/minute.

The water layer dispenser 630 replaces and eliminates the need for a conventional rim wash within a conventional toilet that directs water through water channels or a waterway around the rim of the bowl and expels the water in the bowl through conventional rim openings. Accordingly, due to the water layer dispenser 630, the base 30 does not have any rim openings or any waterway that extends around the top rim 36 of the base 30 for rim wash. By using the water layer dispenser 630 instead of the conventional rim wash (that includes the rim waterway and rim openings), the toilet 20 may be more clean and constructed more simply and less expensively. Furthermore, as shown in the toilet 20 in FIG. 47, in which the water layer dispenser 630 is concealed, compared to the conventional toilet 601 in FIG. 48, due to the water layer dispenser 630, the top rim 36 of the base 30 of the toilet 20 is significantly more compact and slim than the conventional top rim 605 of the conventional base 603 of the conventional toilet 601, since the conventional top rim 605 includes the conventional rim wash. For example, according to one embodiment, the area of the top rim 36 of the base 30 of the toilet 20 may be approximately 96 square centimeters (cm2) and the area of the conventional top rim 605 of the conventional toilet 601 may be approximately 502 cm2. Accordingly, the top rim 36 of the base 30 of the toilet 20 is approximately 80% smaller than the conventional top rim 605 of the conventional toilet 601. Accordingly, the walls of the base 30 of the toilet 20 can be relatively thin compared to the walls of a conventional base of the conventional toilet 601. According to one embodiment, the flush mechanism 620 may include multiple water layer dispensers 630 in order to dispense multiple water layers 632.

Figure 49:
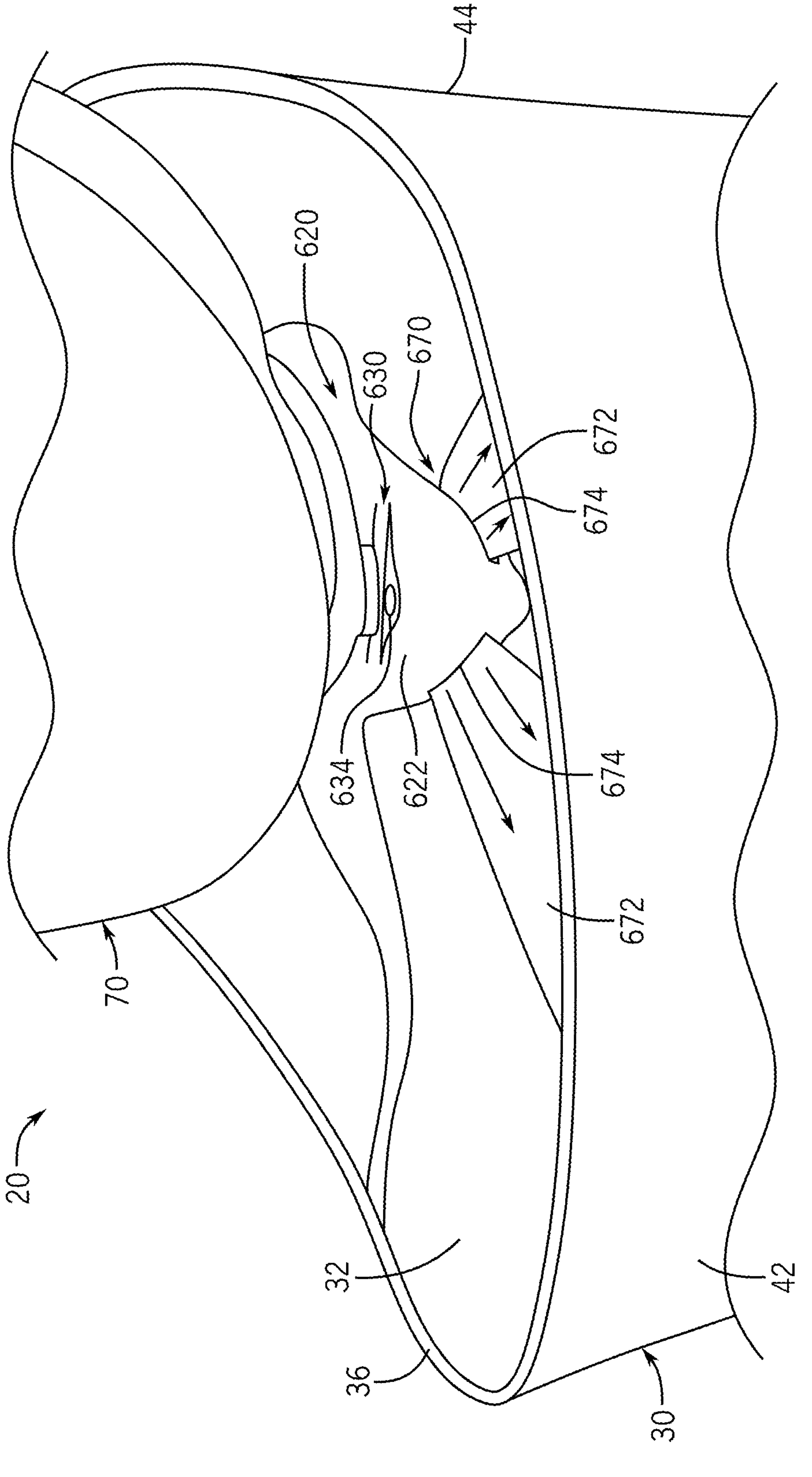
FIG. 49 is a perspective view of a water jet dispenser of the flush mechanism of FIG. 42 dispensing water.

As shown in FIG. 49, the water jet dispenser 670 of the flush mechanism 620 is configured to create and dispense water as at least one water jet 672 to rinse and flush the waste out from the bowl 32 and down the drain. Due to the configuration of the water jet dispenser 670 (i.e., the water jets 672 extending along the inner sides of the bowl 32), the water jet dispenser 670 both clears the bowl 32 from waste and cleans the inner sides of the bowl 32. Accordingly, the water jet dispenser 670 directs the water jet(s) 672 downwardly from the top, back portion of the bowl 32 (beneath the water layer dispenser 630) and at an angle along an inner side of the bowl 32 to clear the contents from the bowl 32. The water jet dispenser 670 is positioned beneath, or next to, the water layer dispenser 630 within the body 622 of the flush mechanism 620 so that the water jets 672 from the water jet dispenser 670 do not interfere with or disrupt the water layer 632 from the water layer dispenser 630.

The water jet dispenser 670 includes one or multiple water jet nozzles or openings 674 that each create and dispense a water jet 672 (as shown in FIG. 49, the water jet dispenser 670 includes two water jet openings 674 that thus create and dispense water in two water jets 672). The water jet openings 674 are positioned next to each other along the body 622 of the flush mechanism 620 and are positioned beneath or next to the water layer opening 634 of the water layer dispenser 630. Accordingly, the water jet openings 674 are positioned at the top, back, center portion of the bowl 32. The water jet openings 674 are angled away from each other in order to direct the water jets 672 in substantially opposite or different directions along the inner sides of the bowl 32. Accordingly, the water jet openings 674 direct the two water jets 672 downwardly into from the top, back portion of the bowl 32 and at an angle along an inner side of the bowl 32, which allows the water jets 672 to downwardly sweep and rinse at least the back and bottom of the bowl 32 as well as some of the inner sides and front of the bowl 32, since the water jets 672 are dispensed at an angle and the inner sides of the bowl 32 are curved, which allows the water from the water jets 672 to reach more areas of the bowl 32. As the water pressure of the water jets 672 decreases, the further the water jet 672 is from the water jet openings 674, the water jets 672 will lower and downwardly sweep the inner sides of the bowl 32. Optionally, the water pressure of the water jets 672 may be varied in order to manipulate how, where, and when the water jets 672 sweep the inner sides of the bowl 32. According to one embodiment, the water jet openings 674 direct the water jets 672 to either side of the body 622 at approximately 45° relative to the vertical axis to prevent or minimize splash.

As shown in FIG. 49, the water jet openings 674 are substantially wide and flat in order to create water jets 672 that are also substantially wide and flat. This configuration, advantageously, provides a more concentrated flow of water along a wider area of the inner surface of the bowl 32 due to the shape of the water jet openings 674, which allows the contents in the bowl 32 to be evacuated more easily and cleans the inner sides of the bowl 32 while flushing with a smaller amount of water.

The water jets 672 are dispensed with sufficient force and volume of water to force the contents within the toilet bowl to be completely flushed and evacuated. Accordingly, the water jet dispenser 670 replaces any conventional siphon-jet opening of a conventional toilet and the base 30 does not include any siphon-jet openings that dispense water into the base 30. However, the water jets 672 may dispense water in such a manner that achieves the siphon effect to flush the contents within the bowl 32 out of the bowl 32, without using any conventional siphon-jet openings. Alternatively, the water jets 672 may simply wash out the contents out from the bowl 32.

As described above, the water layer dispenser 630 and the water jet dispenser 670 of the flush mechanism 620 each replace the conventional rim wash and the conventional siphon-jet opening, respectively. Since the water layer dispenser 630 and the water jet dispenser 670 can be constructed out of the same part (i.e., the body 622 of the flush mechanism 620) and are relatively close to each other along the body 622 and within the bowl 32 (i.e., at the top, back, center portion of the bowl 32), the toilet 20 configuration (in particular the base 30) is greatly simplified compared to conventional toilets.

Figure 50:
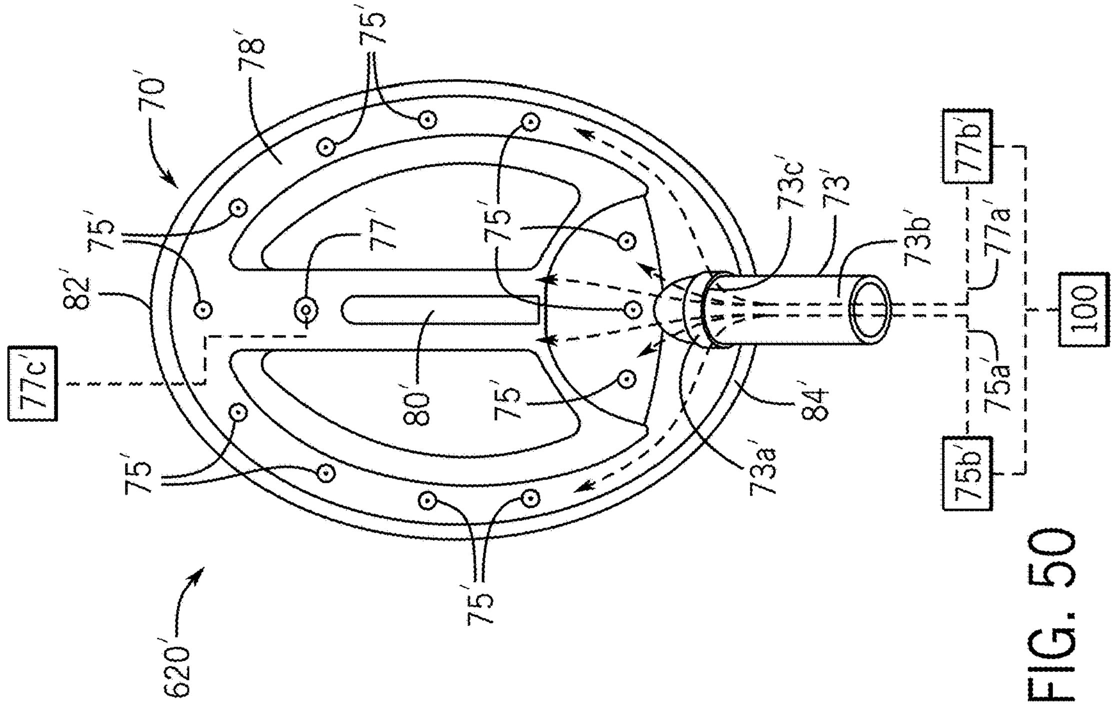
FIG. 50 is a bottom view of a flush mechanism of the toilet of FIG. 12 according to another exemplary embodiment.

Referring to FIGS. 50-53, a toilet flush mechanism 620' of the toilet 20' is shown according to another exemplary embodiment. The flush mechanism 620' can, advantageously, simplify the structure of the toilet 20' (compared to conventional toilets), help to prevent splashing or misting outside of the bowl 32' during a flush cycle, help to reduce bacteria by substantially containing any splash or mist inside the bowl 32', and can provide a self-cleaning function, similar to the toilet 20 discussed above. It should be appreciated that the flush mechanism 620' may be similarly applied to the toilet 20, according to another exemplary embodiment. As shown in FIG. 50, the flush mechanism 620' is defined by an inner portion of the cover 70' at the bottom surface 78'. The flush mechanism 620' is defined in part by the cover 70', which includes a plurality of different internal fluid channels and associated spray holes or nozzles for providing different cleaning functions for the toilet bowl 32', the details of which are discussed below. In addition, the flush mechanism 620' includes a UV light source 80' for providing an additional cleaning function for the toilet bowl 32'.

Still referring to FIG. 50, the flush mechanism 620' is defined by a first channel **75*a*' that is associated with a plurality of spray nozzles 75' on the cover 70' and a second channel 77*a*' that is associated with a steam nozzle 77' on the cover 70'. The first channel 75*a*' and the second channel 77*a*' are each fluidly coupled to a water supply source 100, such as a household water supply, a tank of the toilet, or other water supply source. The first channel 75*a*' may be fluidly coupled to a first valve 75*b*' and the second channel 77*a*' may be fluidly coupled to a second valve 77*b*' to selectively and independently control the discharge of water through the first plurality of nozzles 75' and the steam nozzle 77'. The valves 75*b*',77*b*' may be electronically-controlled via the control system 500, so as to allow a user to control the operation of the valves (e.g., via the control structure 520**, etc.).

Figure 52:
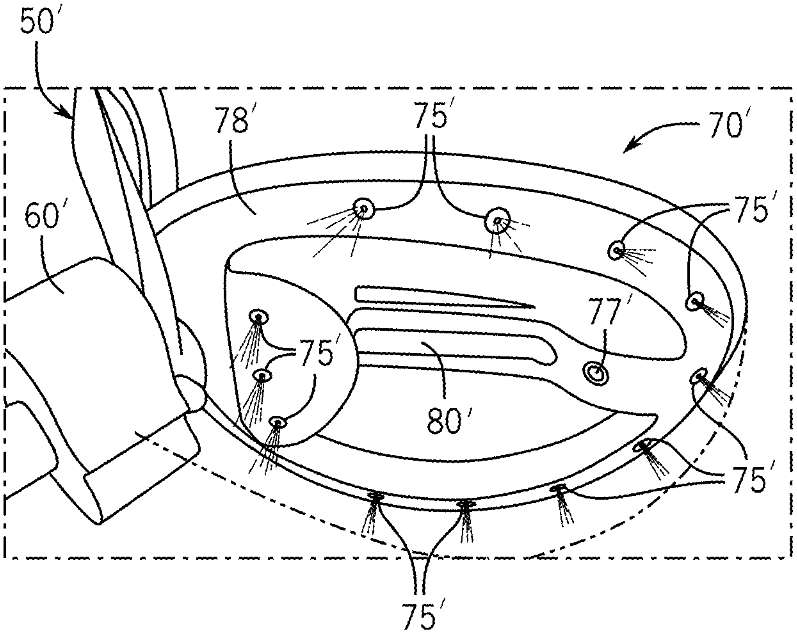
FIG. 52 is a bottom perspective view of the flush mechanism of FIG. 50 performing a rinsing function.

As shown in the exemplary embodiment of FIG. 50, the first channel **75*a*' is fluidly coupled to the plurality of spray nozzles 75'. The spray nozzles 75' are located generally along a perimeter of the cover 70' at the bottom surface 78'. The first channel 75*a*' may extend along an interior of the cover 70' between the top surface 76' and the bottom surface 78', and may be separated from the second channel 77*a*' by an internal wall of the cover 70'. According to another exemplary embodiment, the first channel 75*a*' and the second channel 77*a*' are each defined by separate fluid conduits (e.g., pipes, tubes, etc.) that extend through the cover 70'. The spray nozzles 75' are configured to receive water from the water supply source 100 via the first valve 75*b*' in response to a user input, such as an electronic signal received from the control system 500 (e.g., a signal sent from a control 522 of the control structure 520 on the cover 70', a signal sent from a mobile communication device, etc.). The spray nozzles 75' are configured to discharge the water as a spray into the bowl 32', as shown in FIG. 52, so as to provide a bowl-rinsing function. In other words, the flush mechanism 620' can be operatively coupled to the control system 500 to allow for the electronic control of the discharge of water through the spray nozzles 75' to perform a rinsing function of the bowl 32'. This rinsing function can be performed while the cover 70' is in the lowered position 72' and the cover 50' is in the stowed position 74', such that the cover 70' can substantially block or prevent water from splashing out of the bowl 32'** during rinsing.

Figure 51:
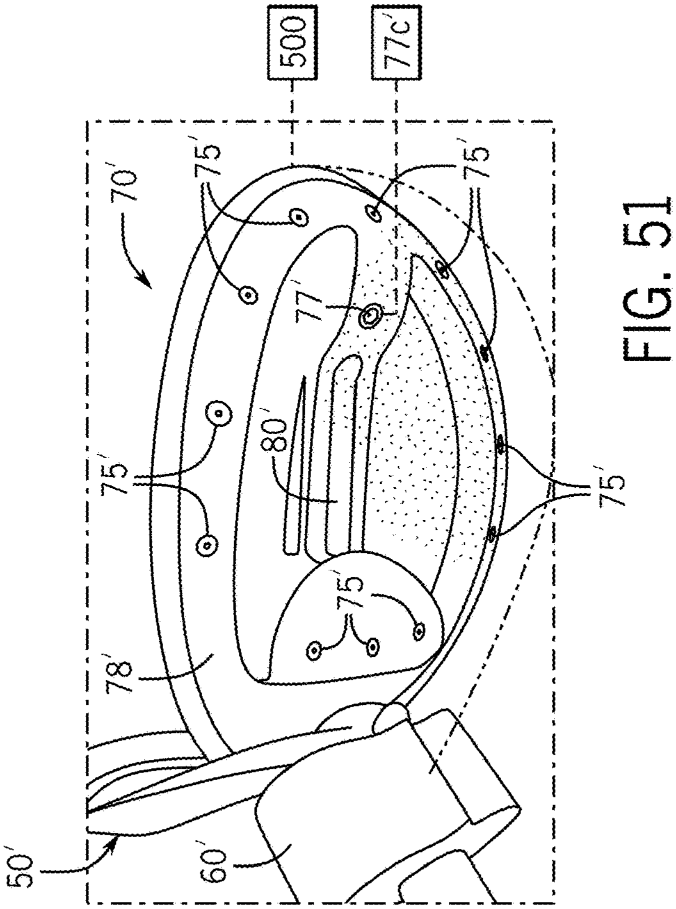
FIG. 51 is a bottom perspective view of the flush mechanism of FIG. 50 performing a steam-cleaning function.

Still referring to FIG. 50, the second channel **77*a*' is fluidly coupled to the steam nozzle 77'. The second channel 77*a*' may extend along an interior of the cover 70' between the top surface 76' and the bottom surface 78', and may be separated from the first channel 75*a*'. The steam nozzle 77' is located generally toward a front to middle portion of the cover 70' at the bottom surface 78'. The steam nozzle 77' is oriented to discharge steam toward the inner surface of the bowl 32', so as to provide a steam-cleaning function of the toilet 20'. For example, the steam nozzle 77' may include a heat source 77*c*' coupled to the second channel 77*a*' downstream of the steam nozzle 77', so as to selectively heat a flow of water from the water source 100 to produce steam in response to a user input, such as an electronic signal received from the control system 500. The steam nozzle 77' is configured to discharge the steam produced by the heat source 77*c*' into the bowl 32' to provide a steam-cleaning function, as shown in FIG. 51**.

According to an exemplary embodiment, the heat source **77*c*' is coupled to the cover 70' between the top surface 76' and the bottom surface 78'. The heat source 77*c*' may be operatively coupled (e.g., electronically wired or wirelessly coupled, etc.) to the control system 500 to allow for the electronic control of the heat source 77*c*' in response to a user input. The heat source 77*c*' may include a heating element, a ceramic member, or other type of heat source. Similar to the rinsing function performed by the spray nozzles 75', the steam-cleaning function can be performed while the cover 70' is in the lowered position 72' and the seat 50' is in the stowed position 74', such that the cover 70' can substantially block or prevent water from splashing out of the bowl 32' during steam-cleaning. In this manner, the flush mechanism 620' can help to prevent substantially any mist, bacteria, or splash from escaping the bowl 32' when the toilet 20'** is cleaned or flushed.

Figure 53:
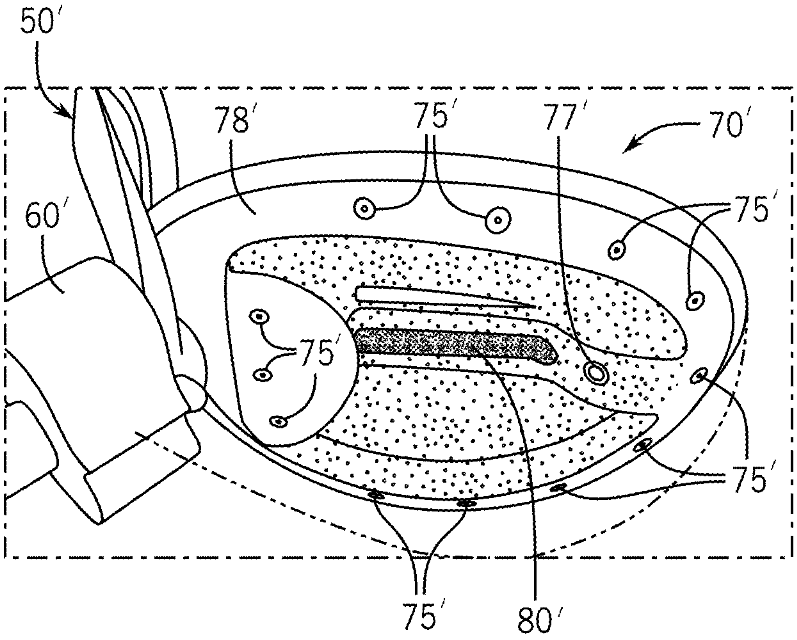
FIG. 53 is a bottom perspective view of the flush mechanism of FIG. 50 performing an ultraviolet (UV) light cleaning function.

Still referring to FIG. 50, the flush mechanism 620' further includes an ultraviolet (UV) light source 80' coupled to the cover 70' at the bottom surface 78'. The UV light source 80' is configured to emit ultraviolet rays into the bowl 32' to provide a UV cleaning function. The UV light source 80' can, advantageously, help to kill bacteria and microbes within the toilet 20' to provide an anti-bacterial and anti-microbial function. The UV light source 80' may be operatively coupled to the control system 500 to allow for the electronic control of the UV light source 80' in response to a user input, so as to provide the UV cleaning function, as shown in FIG. 53.

According to an exemplary embodiment, operation of the spray nozzles 75', the steam nozzle 77', and the UV light source 80' may be programmed by a user to occur automatically in a particular sequence and/or at particular time intervals. For example, the control system 500 may be communicably coupled to an electronic communication device via the I/O communication interface 510 (e.g., smartphone, tablet, laptop, etc.) via a software application (e.g., via a communication protocol, such as Bluetooth, etc.). The user may selectively program the toilet 20' to operate the spray nozzles 75', the steam nozzle 77', and/or the UV light source 80' at particular time intervals, on certain days, and in certain sequences via the software application (e.g., first steam clean using steam nozzle 77', then rinse using spray nozzles 77', then operate the UV light source 80', etc.).

Alternatively, or additionally, the control structure 520 on the cover 70' may include different controls 522 associated with the spray nozzles 75', the steam nozzle 77', and the UV light source 80', respectively, so as to allow a user to control these functions of the toilet 20' electronically while the cover 70' is in the lowered position 72'.

Alternatively, or additionally, according to one embodiment, a substance (e.g., a foam, etc.) may be injected into the water that is being dispensed into the bowls 32,32' to flush the toilets 20,20' in order to further prevent the water in the bowls from splashing.

Toilet Support

Generally speaking, most conventional toilets extend completely to a mounting surface, such as a floor, such that there is no gap or separation between the bottom of the base and the floor. At most, there is a small crack or crevice between the bottom of the base and the floor. Accordingly, any liquid that escapes from or does not end up in the toilet bowl may drip down along the outer surface of the base and into the small crevice between the bottom of the base and the floor, which is difficult (if not impossible) to clean.

Accordingly, as shown in one embodiment in FIGS. 54-58, the toilet 20, in particular the outer surface of the base 30, may have a particular shape and configuration in order to allow the toilet 20 and the surrounding area (in particular the floor 10 that the toilet 20 is positioned along, on top of, and attached to) to be cleaned more easily. As described further herein, the base 30 includes a lower support 720 that creates a gap 730 between at least a portion of the bottom surface 38 of the base body 34 and the floor 10. The support 720 (and therefore the resulting gap 730) of the toilet 20 helps maintain the cleanliness and performance of the toilet 20. For example, any liquid that does not make it into the bowl 32 (e.g., liquid that splashes from the bowl 32) and drips along the outer surface of the base body 34 drips directly onto the floor 10 from the bottom surface 38 of the base body 34 (for easy cleanup), rather than slipping into a crevice between the base 30 and the floor 10, which would be relatively difficult (if not impossible) to clean. It should be appreciated that the support 720 may be similarly applied to the base 30' of the toilet 20', according to another exemplary embodiment.

Figure 54:
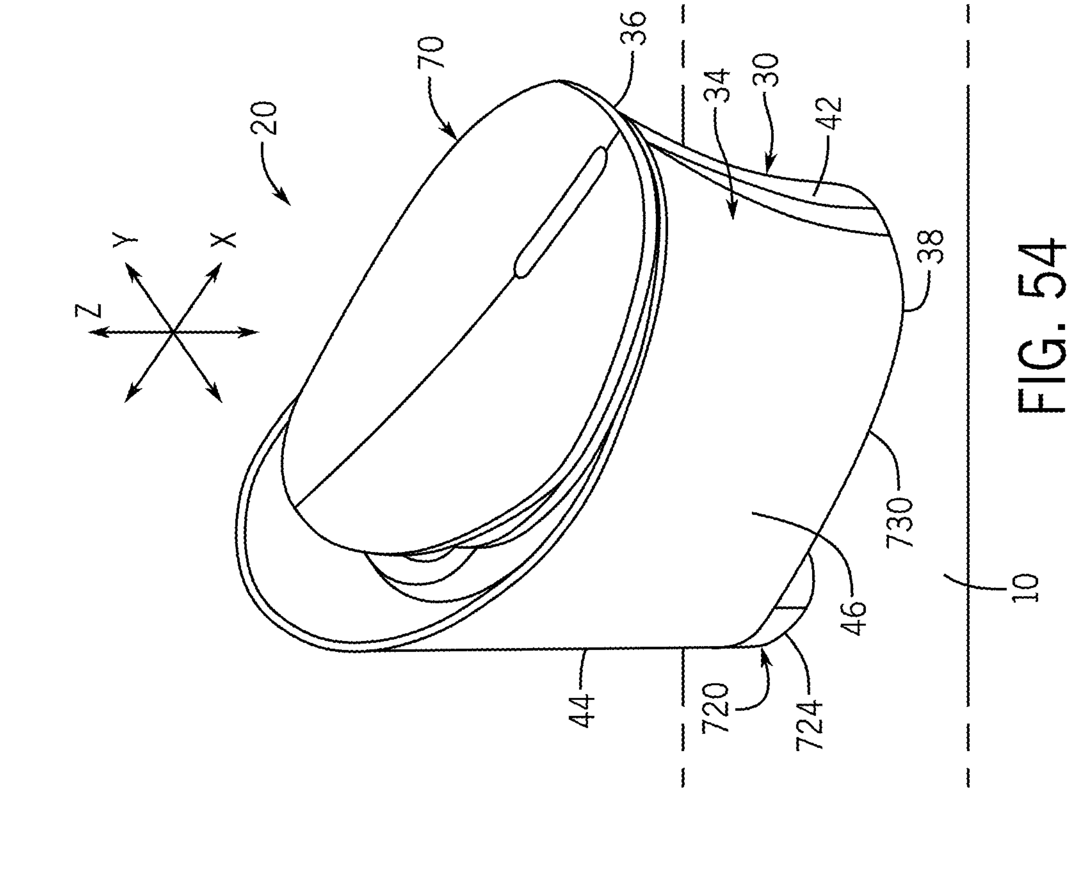
FIG. 54 is a perspective view of the toilet of FIG. 1.
Figure 55:
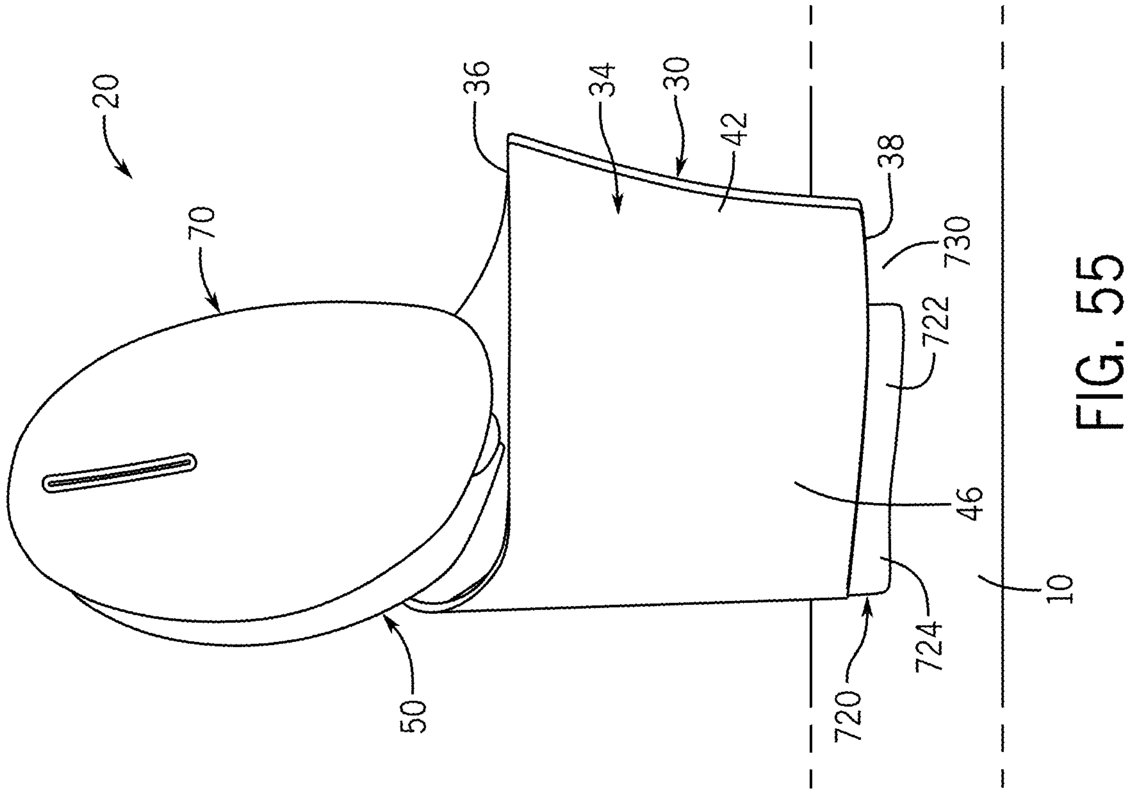
FIG. 55 is a perspective view of the toilet of FIG. 1 with the cover and the seat in the stowed position.
Figure 56:
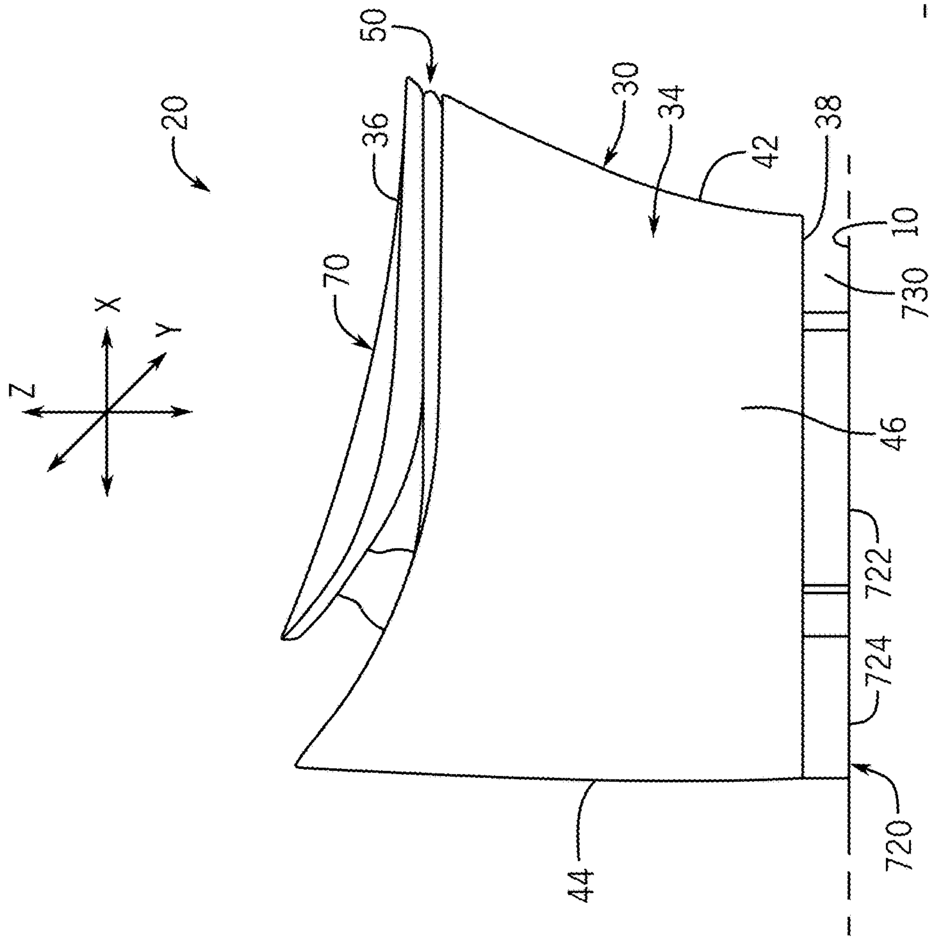
FIG. 56 is a side view of the toilet of FIG. 1.
Figure 57:
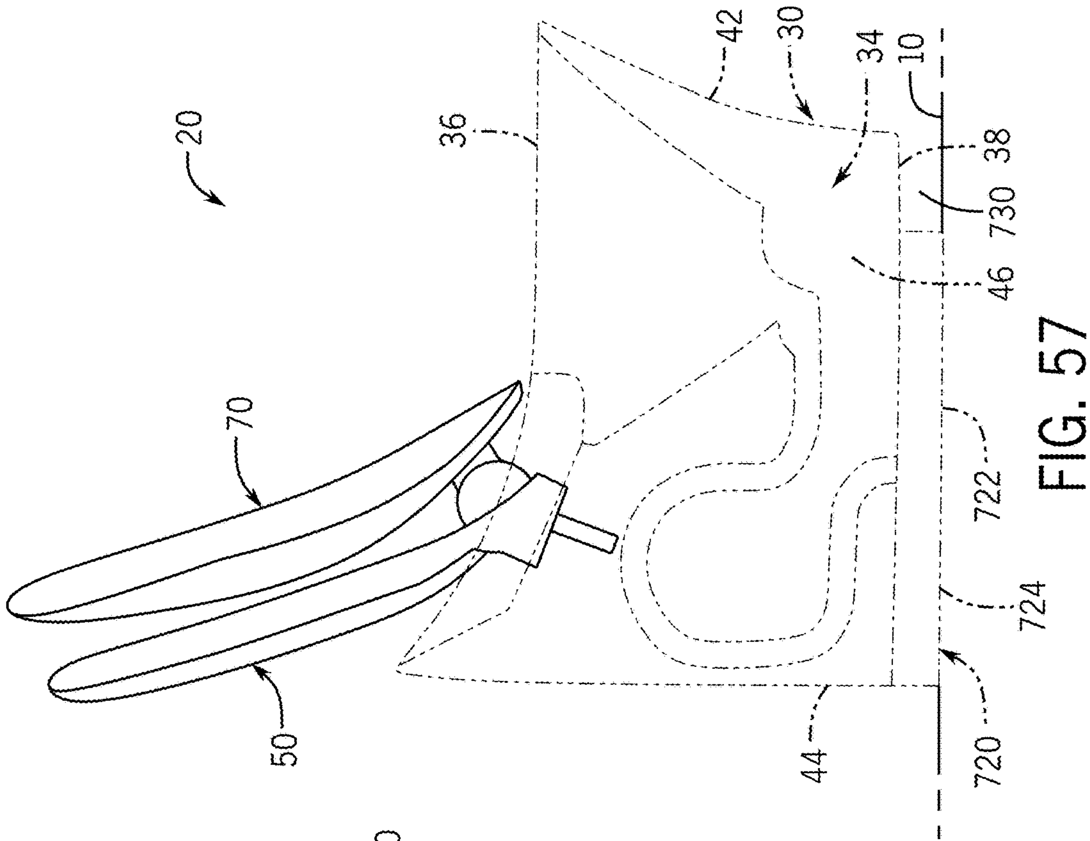
FIG. 57 is a side, partially transparent view of the toilet of FIG. 1 with the cover and the seat in the stowed position.

As described further herein, the outer surface of the base body 34 extends vertically (i.e., along the z-axis) in a substantially straight line between the top rim 36 and the bottom surface 38, as shown in FIGS. 54-57. The outer surface of the base body 34 extends around the outer perimeter of the base body 34 and has a general cylindrical shape. The two sides 46 of the base body 34 refer to the outer surfaces on both sides of the base 30 that extend between the front end 42 and the back end 44 of the base 30. The bottom surface 38 of the base body 34 is the portion of the base 30, aside from the support 720, as described further herein, that is closest to the floor 10 and faces the floor 10. As shown in FIGS. 55-57, the bottom surface 38 of the base body 34 is a substantially flat surface and extends substantially horizontally in the longitudinal and lateral directions (i.e., along the depth (the x-axis) and the width (the y-axis) of the toilet 20). The bottom surface 38 may extend along the entire bottom (i.e., width and depth) of the base body 34 or may extend along the entire width of the base body 34 and only a portion of the depth of the base body 34. Accordingly, the bottom surface 38 may create a substantially 90° corner between the bottom surface 38 of the base body 34 and the outer surface of the base body 34 (e.g., the surface along the sides 46 and the front end 42). Alternatively, the bottom surface 38 of the base body 34 may extend upward from the outer perimeter of the base body 34 to a center region of the base body 34.

In order to increase the cleanliness of the toilet 20, the base 30 further includes the lower support 720 (e.g., support, pedestal, extension) positioned beneath the bottom surface 38 of the base body 34 and attaches the base body 34 to the floor 10 of the surrounding area (i.e., the bathroom). The support 720 is configured to directly contact the floor 10 such that the base body 34 is indirectly coupled to the floor 10 through the support 720. The support 720 extends in a substantially straight and vertical manner from the bottom surface 38 of the base body 34 to the floor 10 and is positioned directly underneath only a portion of the bottom surface 38. The support 720 may be sufficiently tall in order to sufficiently space the bottom surface 38 of the base body 34 from the floor 10 and such that the gap 730 extends sufficiently vertically to allow the floor 10 along the gap 730 to be easily accessed and cleaned on a regular basis. The support 720 may also be sufficiently short such that the user cannot easily see the contact point between the base 30 and the floor 10, as described further herein. According to one embodiment, the height of the support 720 is approximately 40 millimeters (mm).

The support 720 vertically separates the base body 34 and the floor 10. Since the support 720 does not extend along the entire bottom surface 38 of the base body 34, the support 720 creates a space or gap 730 that extends vertically between the base body 34 and the floor 10. Accordingly, the bottom surface 38 of the base body 34, in particular along the entire front end 42 of the base 30, is spaced apart from and does not contact the floor 10 due to the support 720.

The support 720 extends horizontally along only a portion of the bottom surface 38 of the base body 34. Accordingly, as shown in FIGS. 54-58, the support 720 includes a back portion 724 and a front portion 722. The back portion 724 of the support 720 is positioned along the back end 44 of the base body 34. The back portion 724 of the support 720 extends horizontally (laterally) along the entire width of the bottom surface 38 of the base body 34 (i.e., along the y-axis). The back portion 724 of the support 720 extends horizontally (longitudinally) along only a portion of the depth of the base body 34 (i.e., along the x-axis) such that the back portion 724 is positioned toward and along the back end 44 of the base body 34 and only a portion of the sides 46 of the base body 34. As shown in FIGS. 56-57, the back end of the back portion 724 is aligned with and extends from the back end 44 of the base 30 and the front end of the back portion 724 is positioned along a middle portion of the base body 34.

The front portion 722 of the support 720 is positioned in front of the back portion 724 of the support 720 (i.e., closer to the front end 42 of the base body 34 than the back portion 724 of the support 720). The front portion 722 of the support 720 extends horizontally (i.e., laterally) along the only a portion of the width of the bottom surface 38 of the base body 34 (i.e., along the y-axis) such that each of the sides of the front portion 722 do not extend to and are not aligned with both sides 46 of the base body 34. Accordingly, the total width of the front portion 722 of the support 720 is less than the entire width of the bottom surface 38 of the base body 34, and the front portion 722 is positioned along a middle portion of the bottom surface 38 of the base body 34 (e.g., in the middle between the sides 46 of the base body 34) such that the front portion 722 of the support 720 is offset from the two sides 46 of the base body 34 as well as the front end 42 of the base 30.

The front portion 722 of the support 720 extends horizontally (i.e., longitudinally) along only a portion of the depth of the base body 34 (i.e., along the x-axis) between the front end of the back portion 724 of the support 720 and the front end 42 of the base body 34. More specifically, the front portion 722 extends from the front of the back portion 724 of the support 720 to an area behind the front end 42 of the base 30. The back end of the front portion 722 extends from the front end of the back portion 724 and the front end of the front portion 722 is positioned along a middle portion of the bottom surface 38 of the base body 34 such that the front end of the front portion 722 does not extend to and is not aligned with the front end 42 of the base body 34. Accordingly, the total depth of the support 720 (as a whole) is less than the total depth of the bottom surface 38 of the base body 34 such that the front portion 722 of the support 720 is offset from the front end 42 of the base 30. As shown in FIGS. 56-57, the back end of the support 720 (i.e., the back end of the back portion 724 of the support 720) is in line with the back end 44 of the base body 34 and the front end of the support 720 (i.e., the front end of the front portion 722 of the support 720) is spaced apart or offset from the front end 42 of the base body 34. According to one embodiment, the front end of the support 720 is offset from the front end 42 of the base body 34 by approximately 86.59 mm.

Accordingly, due to the size difference between and relative positioning of the front portion 722 of the support 720 and the bottom surface 38 of the base body 34, the support 720 is not positioned along and does not extend along any portion of the front end 42 of the base body 34 and extends along only a portion of the sides 46 of the base body 34. The bottom surface 38 of the base body 34 overhangs the front and at least a portion of the sides of the support 720 (i.e., the bottom surface 38 overhangs both the front end and the sides of the front portion 722 of the support 720). Therefore, the front portion 722 of the support 720 creates the gap 730 under the bottom surface 38 of the base body 34. The gap 730 extends vertically between and is positioned between the bottom surface 38 of the base body 34 and the floor 10. Specifically, the gap 730 is positioned beneath the front end 42 and a portion of the sides 46 of the base body 34. The front end 42 and a portion of the sides 46 of the base body 34 are vertically spaced apart from the floor 10 and do not contact the floor 10 due to the gap 730, and therefore due to the support 720. Additionally, the gap 730 also extends horizontally (i.e., both longitudinally and laterally) between the front end 42 of the base 30 and the front end of the front portion 722 and between at least a portion of the two sides 46 of the base body 34 and opposite sides of the front portion 722 of the support 720. The base 30, including any portion of the base body 34 and the support 720, does not extend within the gap 730.

Figure 58:
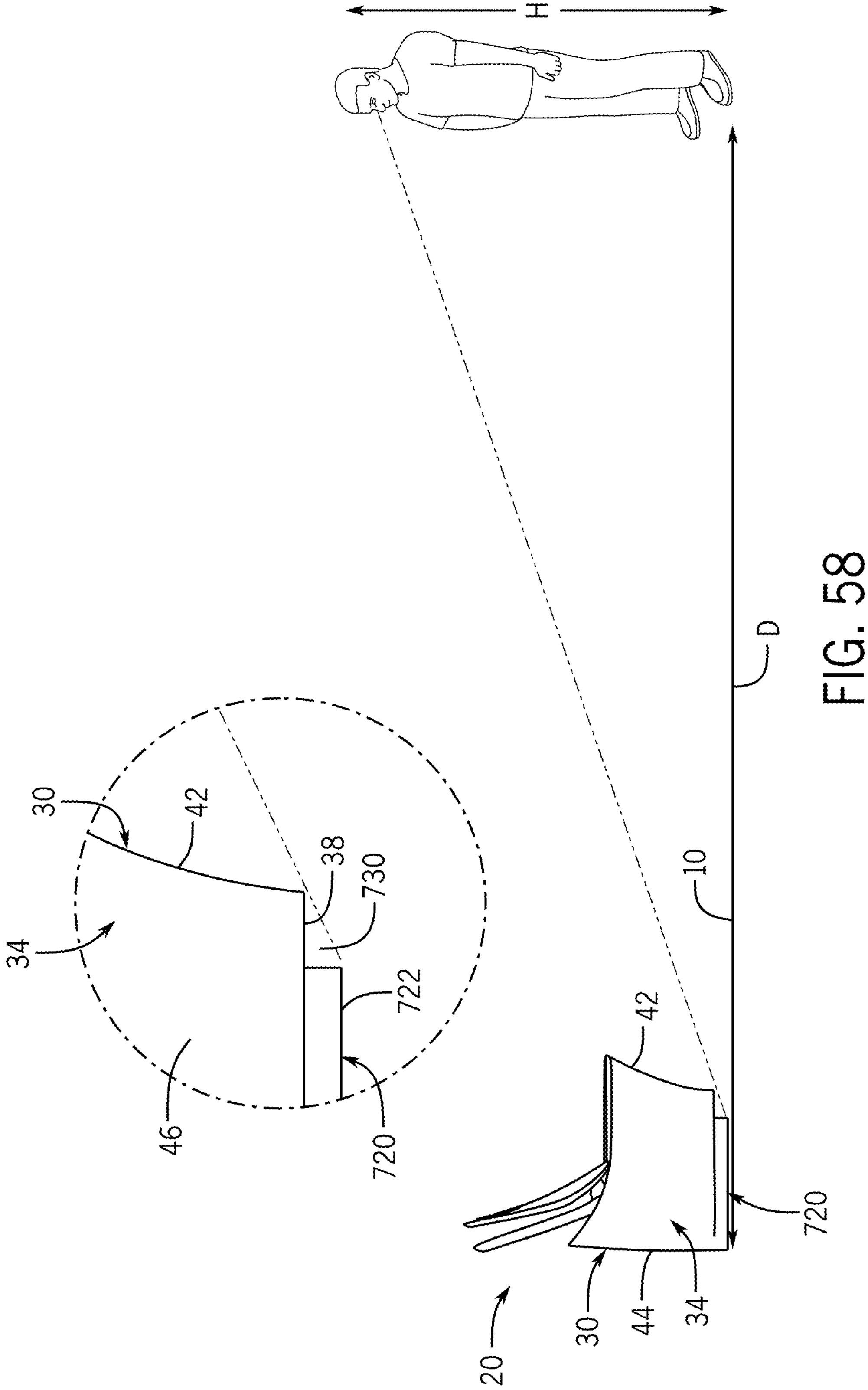
FIG. 58 is a side view and an enlarged side view of a user spaced apart from the front end of the toilet of FIG. 1.

As shown in FIG. 58, the support 720 is shaped and configured to elevate and hold the base body 34 above the floor 10 at a certain distance that gives the illusion that the base 30, in particular the front end 42 of the base 30, is floating above the floor 10. More specifically, the support 720 hides the corner or crevice where the base 30 meets the floor 10 underneath the bottom surface 38 of the base body 34 such that the user cannot easily see the contact point between the base 30 and the floor 10. FIG. 54 also shows how the contact point between the front of the base 30 and the floor 10 is obscured. As shown in FIG. 58, due to the elevation provided by the support 720, the user has to be separated from the toilet by a significant distance "D" in order to see where the base 30 meets the floor 10. For example, assuming the height "H" of the user is 5 feet (i.e., 1524 mm), the user can only see the contact point between the base 30 and the floor 10 when the user is at a distance D of 12 feet (i.e., 3657.60 mm) from the front end 42 of the base 30. Accordingly, a user more than 5 feet tall and less than 12 feet away from the front end 42 of the base 30 cannot see the contact point between the front end of the support 720 and the floor 10. However, since bathrooms are typically very small and limited in space, it is unlikely that the user will view the toilet 20 from a distance D of 12 feet. Therefore, if the height H of the user is more than 5 feet or the user is at a distance D that is less than 12 feet from the front end 42 of the base 30, the user cannot see the contact point between the base 30 and the floor 10.

Self-Cleaning Opening Mechanism

Figure 59:
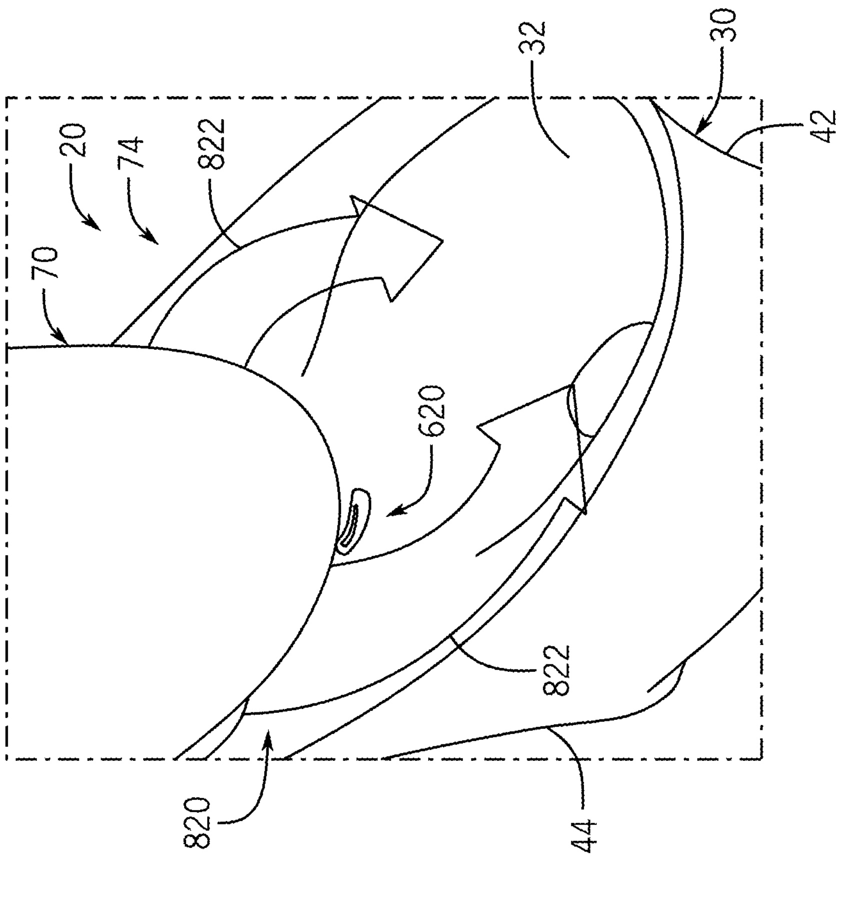
FIG. 59 is a perspective view of the toilet of FIG. 1 with a self-cleaning mechanism.

According to another exemplary embodiment shown in FIG. 59, the toilet 20 has a self-cleaning mechanism 820 that cleans the opening mechanism 120. The self-cleaning mechanism 820 allows the opening mechanism 120 to be easily and regularly cleaned, thus allowing the toilet 20 to maintain its cleanliness more easily. It should be appreciated that the self-cleaning mechanism 820 may be similarly applied to the opening mechanism 120' of the toilet 20', according to another exemplary embodiment.

The self-cleaning mechanism includes cleaning waterways or water conduits that release and direct at least one cleaning stream 822 (of water and/or another liquid) to clean the opening mechanism 120. According to one embodiment, the toilet 20 has two water conduits that each release a cleaning stream 822 such that there are two cleaning streams 822 on either side of the opening mechanism 120, as shown in FIG. 59.

The cleaning streams 822 are directed toward, along, and/or from the opening mechanism 120 such that the opening mechanism 120 is washed with the cleaning streams 822. More specifically, the cleaning streams 822 are directed from the area of the base 30 along which the opening mechanism 120 is positioned (e.g., the top, back portion of the bowl 32, above the flush mechanism 620 and behind the cover 70). After cleaning the opening mechanism 120, the cleaning streams 822 flow downward along the inner sides of the bowl 32 and into the bowl 32 to be disposed, as shown in FIG. 59. The cleaning water conduits may be separate from or attached to the conduits for the flush mechanism 620.

Cover Adjustment Mechanism

According to another exemplary embodiment shown in FIG. 60, the toilet 20 has a cover adjustment mechanism 830 that allows the position of the cover 70 to be adjusted according to the user's needs and preferences. Accordingly, the toilet 20 can accommodate users of different sizes (e.g., both adults and children) and with different support needs (e.g., elderly users), in particular while the user is sitting down on the seat 50 of the toilet 20. It should be appreciated that the cover adjustment mechanism 830 may be similarly applied to the cover 70' of the toilet 20', according to another exemplary embodiment.

More specifically, while the cover 70 is in the stowed position 74, the cover adjustment mechanism 830 is configured to move the cover 70 horizontally (i.e., longitudinally along the depth of the toilet 20) between two positions (i.e., a forward position 832 and a backward position 834) relative to the seat 50 and the base 30, as shown in FIG. 60. In the forward position 832, the cover 70 is relatively closer to the front end 42 (than the back end 44) of the base 30 in order to accommodate smaller users or users that need more support. In the backward position 834, the cover 70 is relatively closer to the back end 44 (than the front end 42) of the base 30 in order to provide more room for larger users. The cover adjustment mechanism 830 may move the cover 70 between the two positions (i.e., the forward position 832 and the backward position 834) or may allow the cover 70 to be positioned anywhere in between the two positions. Once the cover 70 is positioned according to the user's preferences, the cover 70 may click, snap, or lock into place.

Bidet Mechanism

Figure 62:
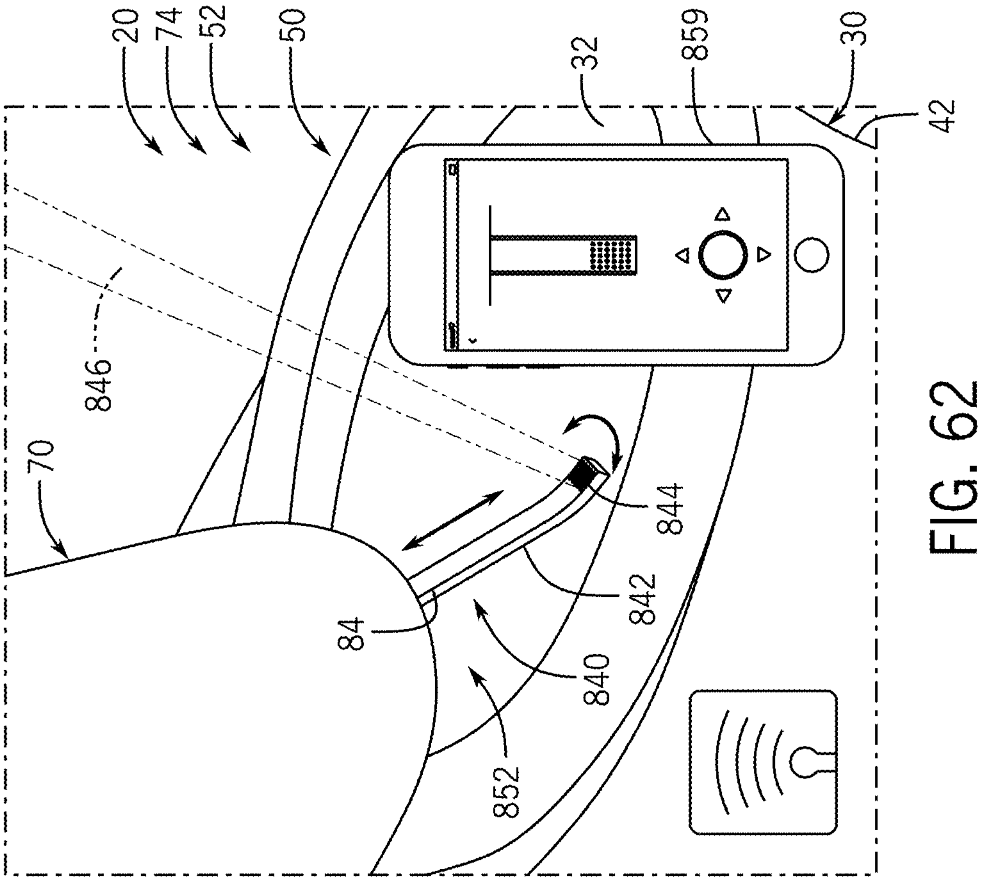
FIG. 62 is a perspective view of the toilet of FIG. 1 with the bidet mechanism and a mobile communication device.
Figure 61:
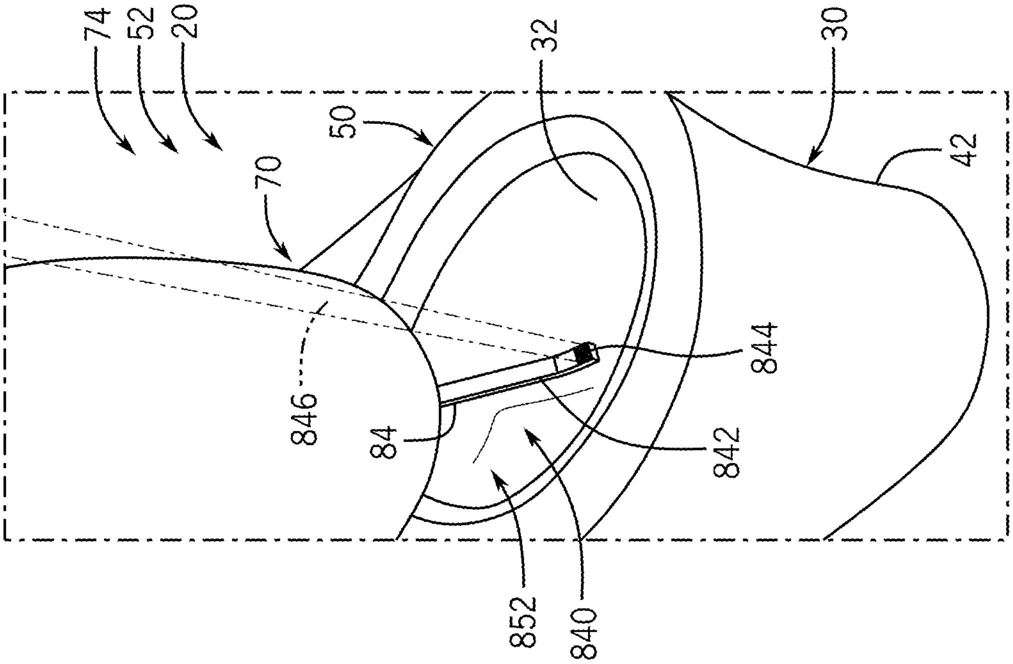
FIG. 61 is a perspective view of the toilet of FIG. 1 with a bidet mechanism.

According to another exemplary embodiment shown in FIGS. 61-62, the toilet 20 has a bidet mechanism 840 that is configured to clean the underside of a user. The bidet mechanism 840 includes a bidet wand 842 that is retractable into and extendable out from the cover 70. Accordingly, the bidet wand 842 is movable between a stowed or retracted position and an exposed or extended position 852. In the extended position 852, as shown in FIGS. 61-62, the bidet wand 842 is at least partially exposed and extended out from the cover 70 and extends over a portion of the bowl 32 of the base 30. Optionally, the bidet wand 842 may extend both downwardly and forward into the extended position 852 in order be recessed within a portion of the bowl 32 and positioned within a central area of the bowl 32. Accordingly, the user can use the bidet mechanism 840 and wash themselves when the bidet wand 842 is in the extended position 852. In the retracted position, the bidet wand 842 is retracted into the cover 70 and is substantially concealed by the cover 70 for storage.

The bidet wand 842 is positioned near or along the back end 84 of the cover 70 such that the bidet wand 842 can extend out from the back end 84 of the cover 70 and over a portion of the bowl 32 when the cover 70 is in the stowed position 74. The bidet wand 842 is movably attached to the cover 70. Accordingly, the cover 70 includes an aperture that the bidet wand 842 can move within and in and out of between the retracted position and the extended position 852. In the retracted position, the bidet wand 842 is positioned substantially within the aperture of the cover 70. By positioning the bidet wand 842 with, or at least partially within, the cover 70, the bidet mechanism 840 conserves and saves space within the toilet 20 and promotes better hygiene.

The bidet wand 842 includes at least one upper nozzle 844 positioned on the top side of the bidet wand 842 and toward the end of the bidet wand 842 (i.e., along an end of the bidet wand 842 that is furthest from the cover 70 in the extended position 852). As shown in FIGS. 61-62, when the bidet mechanism 840 is turned on, the nozzles 844 upwardly dispense a stream or jet rinse 846 to clean the user. The jet rinse 846 may optionally be angled upward and toward the front end 42 of the base 30 in order to better clean the user. The jet rinse 846 may be water.

Additionally, as shown in FIG. 62, the exact position of the bidet wand 842, while the bidet wand 842 is in the extended position 852, may be adjusted according to a user's preference. For example, the bidet wand 842 may be moved in between the retracted position and the extended position 852 in order to position the bidet wand 842 closer to or further from the back end 84 of the cover 70 and higher or lower. Additionally, the bidet wand 842 may be moved side-to-side (i.e., relative to the width of the base 30) in order to change the lateral position of the jet rinse 846.

The bidet mechanism 840 may be controlled by controls on the toilet 20 (e.g., control structure 520, etc.) and/or controls on a software application that may be accessible via a mobile communication device 859 (as shown in FIG. 62), for example. Accordingly, the toilet 20 may wirelessly connect to and communicate with the phone 859, such as via the control system 500. The controls may allow the user to control a variety of different aspects of the bidet mechanism 840, including turning the bidet mechanism 840 on and off and positioning the bidet wand 842.

According to one embodiment, the bidet mechanism 840 may be multi-functional and also used to rinse and clean the opening mechanism 120 and the area surrounding the opening mechanism 120 in order to increase the cleanliness of the toilet 20. Accordingly, the bidet wand 842 includes lower nozzles 864 positioned on the bottom side of the bidet wand 842 (and/or along the end of the bidet wand 842 that is furthest from the cover 70 in the extended position 852). The bidet wand 842 may dispense chemical cleanser, such as hydrogen peroxide, from the lower nozzles 864 in order to clean the toilet 20.

According to another embodiment, the bidet mechanism 840 may be used to refill the bowl 32 with liquid after the toilet 20 has been flushed. Accordingly, water is ejected out of the bidet wand 842 (through the lower nozzles 864 (and/or through the upper nozzles 844 if the cover 70 is in the lowered position 72)) in order to refill the bowl 32 with water. The bidet mechanism 840 may act as a secondary refill mechanism to the flush mechanism 620, which may act as the primary refill mechanism. This configuration may be particularly beneficial if the toilet 20 is a tankless toilet by quickly and completely refilling the bowl 32 with water.

Figure 64:
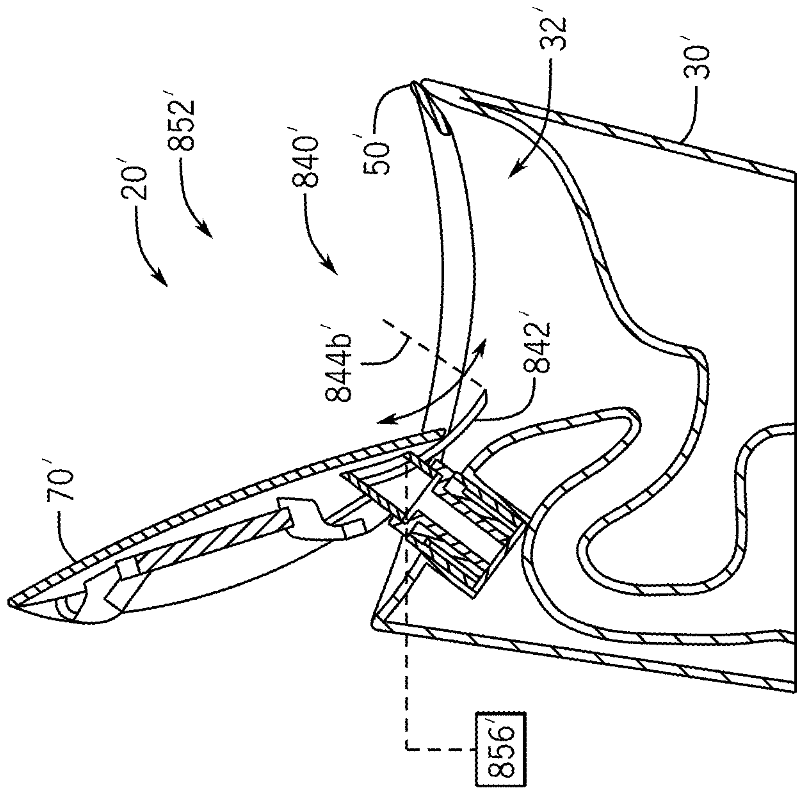
FIG. 64 is a side cross-sectional view of the toilet of FIG. 12 with the bidet mechanism in a first extended position.
Figure 63:
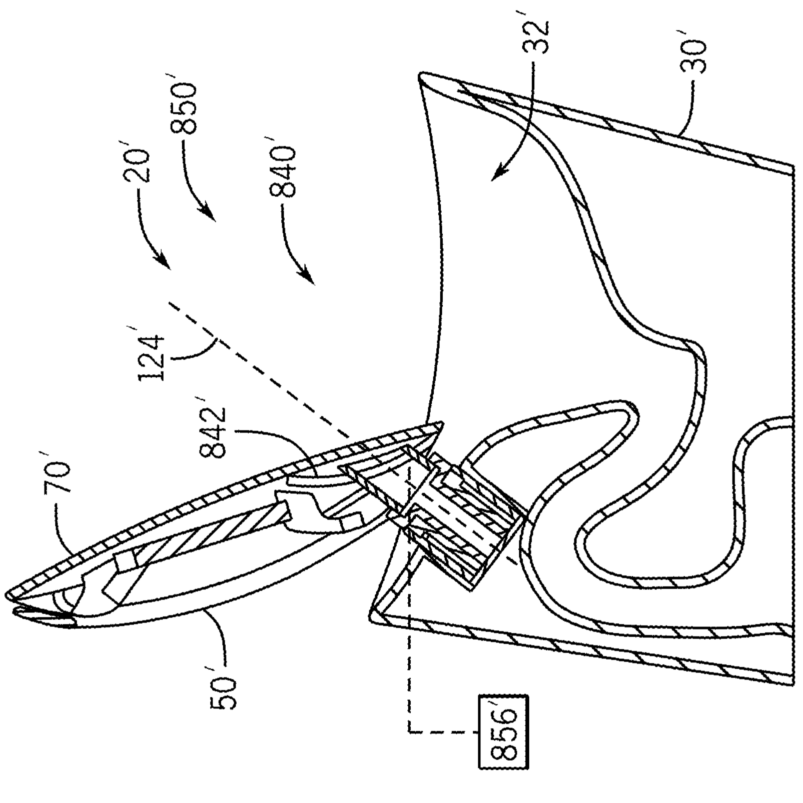
FIG. 63 is a side cross-sectional view of the toilet of FIG. 12 with a bidet mechanism in a retracted position.
Figure 66:
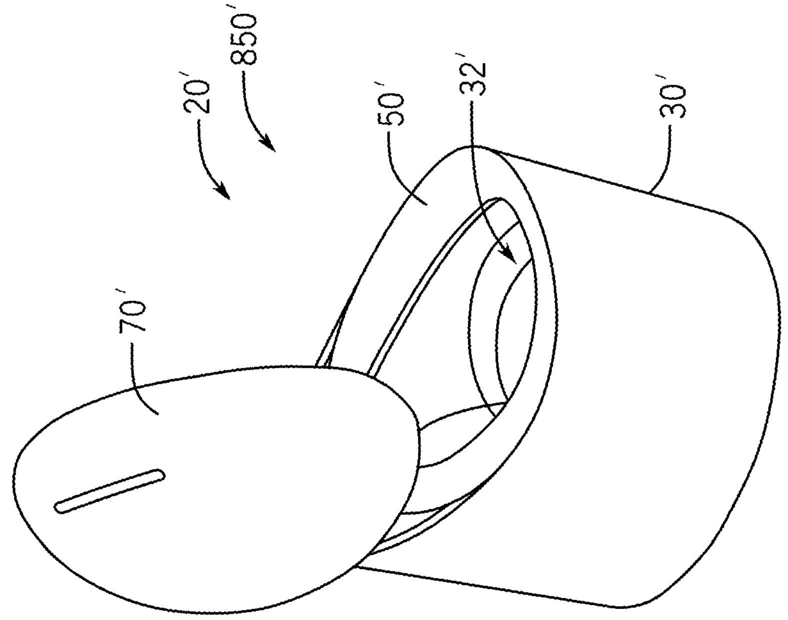
FIG. 66 is a perspective view of the toilet of FIG. 12 with the bidet mechanism in the retracted position.
Figure 67:
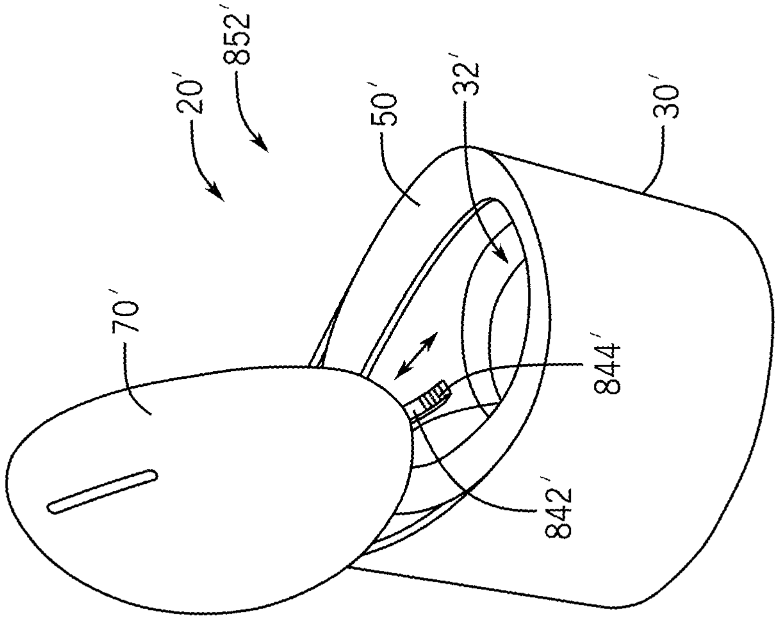
FIG. 67 is a perspective view of the toilet of FIG. 12 with the bidet mechanism in the first extended position.

According to another exemplary embodiment shown in FIGS. 63-68, the toilet 20' includes a bidet mechanism 840' similar to the bidet mechanism 840 of the toilet 20. The bidet mechanism 840' includes a bidet wand 842' that is retractable into and extendable out from the cover 70'. As such, the bidet wand 842' is movable between a stowed or retracted position 850' inside the cover 70', a first extended position 852', and a second extended position 854'. In the first extended position 852' (as shown in FIGS. 64 and 67), the bidet wand 842' is at least partially exposed and extended out from the cover 70' over a portion of the bowl 32' a first distance. The first extended position 852' may be associated with cleaning a posterior portion of a male or a female user. For example, the bidet wand 842' may include a nozzle 844' disposed in an upper surface of the bidet wand 842'. The nozzle 844' may define a spray axis **844*a*' that faces in a generally upward and forward direction toward a front of the bowl 32' at the first extended position 852', so as to direct fluid toward a posterior area of a male or a female user while the user is seated on the seat 50'**.

Figure 65:
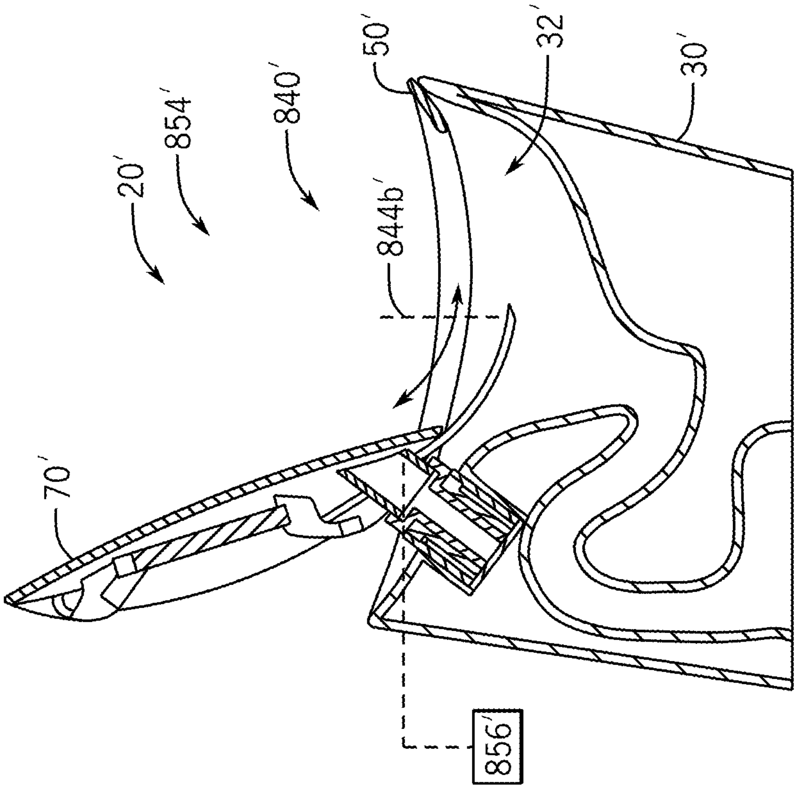
FIG. 65 is a side cross-sectional view of the toilet of FIG. 12 with the bidet mechanism in a second extended position.
Figure 68:
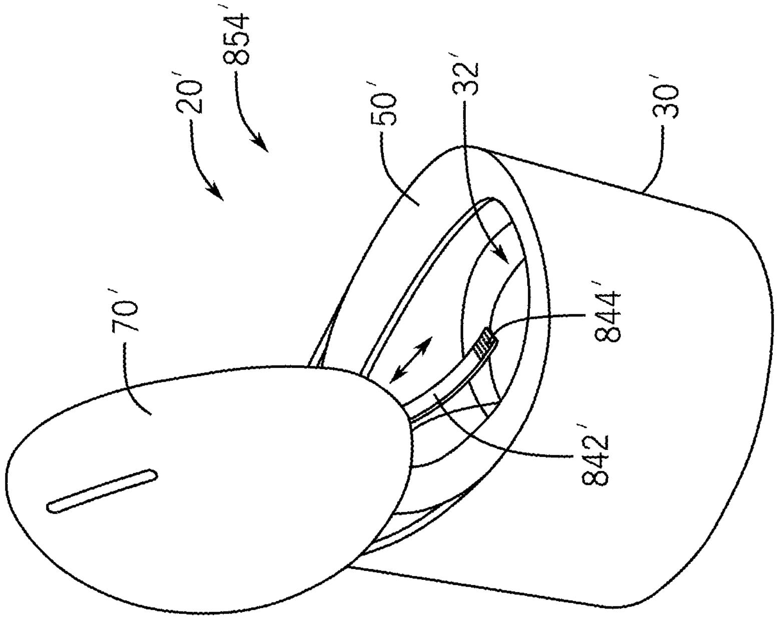
FIG. 68 is a perspective view of the toilet of FIG. 12 with the bidet mechanism in the second extended position.

In the second extended position 854' (as shown in FIGS. 65 and 68), the bidet wand 842' is fully extended out from the cover 70' a second distance that is greater than the first distance. The second extended position 854' may be associated with cleaning a vaginal area of a female user. For example, the nozzle 844' may be located forward toward the front of the bowl 32' and may define a spray axis **844*b*' that faces more upright than the spray axis 844*a*' at the first extended position 852', so as to direct fluid toward a vaginal area of the female user while the female user is seated on the seat 50'. According to an exemplary embodiment, the bidet wand 842' can be selectively moved to various positions located between the retracted position 850', the first extended position 852', and the second extended position 854'**, so as to provide further control to a user.

According to the exemplary embodiment shown, the bidet wand 842' has a generally arcuate or bowed shape that allows for the wand to switch or change between the two different spray axis orientations at the first extended position 852' and the second extended position 854', respectively. The bidet mechanism 840' may further include a motor 856' operatively coupled to the bidet wand 842' to selectively control the movement of the bidet wand 842' between the retracted position 850', the first extended position 852', and the second extended position 854'. According to an exemplary embodiment, the motor 856' forms part of a linear actuator for translating the bidet wand 842' between the various positions. The motor 856' may be housed within the cover 70', such as between the top surface 76' and the bottom surface 78'. The motor 856' may be operatively coupled to the control system 500 to allow for electronic control of the movement of the bidet mechanism 840' and the discharge of fluid from the bidet mechanism 840', such as via a mobile communication device, the control structure 520 (e.g., by actuating a control 522 associated with the bidet mechanism 840', etc.), or other types of controls (e.g., voice commands, etc.).

Cover Flush Control Mechanism

In order to activate the flush mechanism 620 to flush the toilet 20, the toilet 20 may include a variety of different controls, according to the desired configuration. According to another exemplary embodiment shown in FIG. 69, the toilet 20 includes a cover flush control mechanism 880 that is configured to activate the flush mechanism 620. It should be appreciated that the cover flush control mechanism 880 may be similarly applied to the flush mechanism 620' of the toilet 20', according to another exemplary embodiment.

More specifically, by pushing or pulling the cover 70 backward or forward, respectively, while the cover 70 is in the stowed position 74 (and thus rotating the cover 70 about a lateral axis 886 that extends along the width of the base 30 and through the opening mechanism 120), the user can activate various features of the flush mechanism 620.

Figure 69:
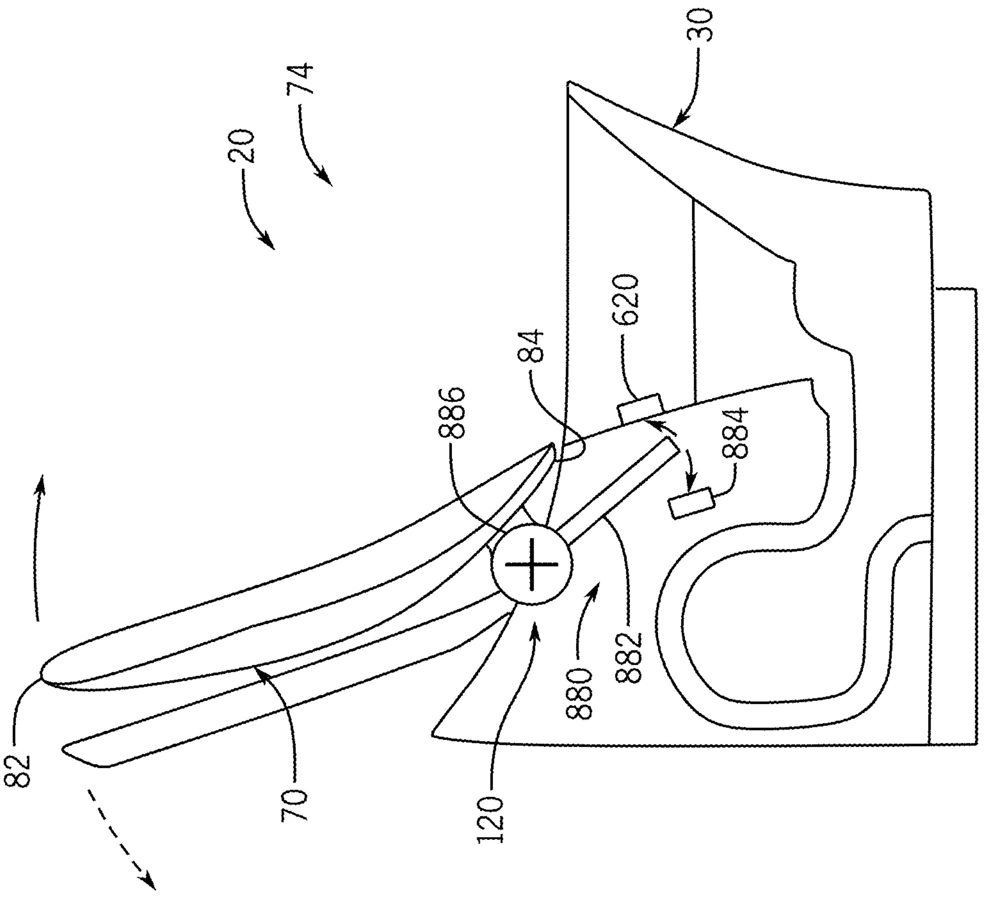
FIG. 69 is a side, cross-sectional view of the toilet of FIG. 1 with a cover flush control mechanism according to an exemplary embodiment.

As shown in FIG. 69, the cover flush control mechanism 880 includes an extension 882 that extends from a portion of the cover 70 toward the back end 84 of the cover 70. The extension 882 extends into the base 30 of the toilet 20 below the lateral axis 886, where at least the majority of the cover 70 is positioned above the lateral axis 886. The cover flush control mechanism 880 also includes an actuator 884 positioned within the base 30. Accordingly, when the cover 70 is pushed or pulled, the extension 882 is rotated with the cover 70 about the lateral axis 886 and contacts the actuator 884, which activates the flush mechanism 620. In order to capture both the pushing and the pulling movements of the cover 70, the actuator 884 may extend around both sides of the extension 882 within the base 30 or the cover flush control mechanism 880 may include multiple actuators 884.

According to one embodiment, pushing and pulling the cover 70 backward and forward, respectively, may activate different features of the flush mechanism 620. For example, pulling the cover 70 forward may activate a full flush, while pushing the cover 70 backward may activate a half flush for a courtesy flush, rinse, or pre-wash. Accordingly, while the user is seated on the seat 50 and using the toilet 20, and thus the seat 50 is in the use position 52 and the cover 70 is in the stowed position 74, the user may lean back on the cover 70 in order to activate the flush mechanism 620 to provide a half flush. Once the user has finished using the toilet 20 completely, the user may pull the cover 70 forward to activate the flush mechanism 620 to provide a full flush. However, it is understood that the toilet 20 may be configured such that pulling the cover 70 forward activates the half flush and pushing the cover 70 backward activates the full flush.

According to one embodiment, portions of the opening mechanism 120, such as the ball 172, may act like a faucet valve in order to allow the toilet 20 to be partially or fully flushed. Alternatively, or additionally, the seat 50 may be pushed or pulled about the lateral axis 886, while the seat 50 is in the stowed position 74, in order to activate the flush mechanism 620.

Deflector Structures

Figure 70A:
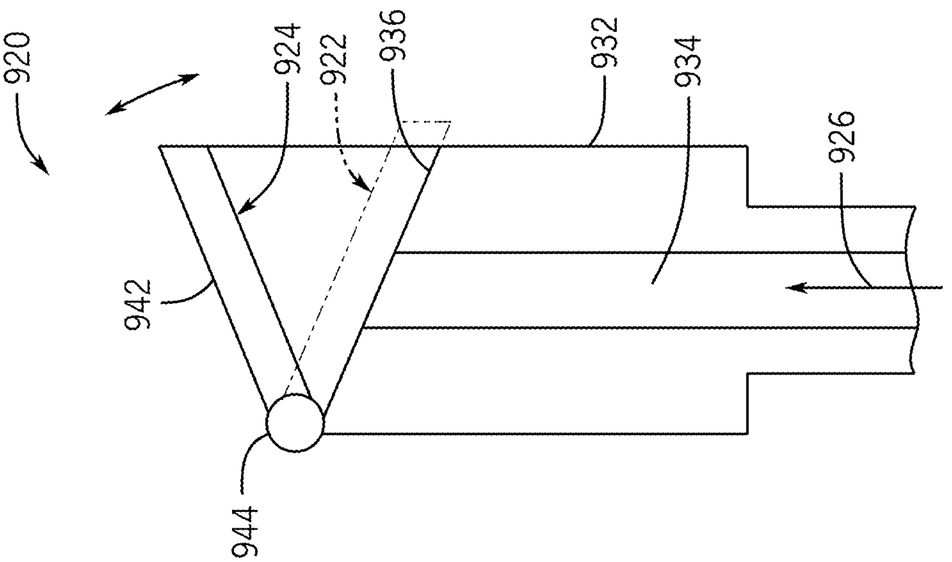
FIG. 70A is a side, cross-sectional view of a variable deflector structure that can be used in the toilets of FIGS. 1 and 12 according to an exemplary embodiment.
Figure 70C:
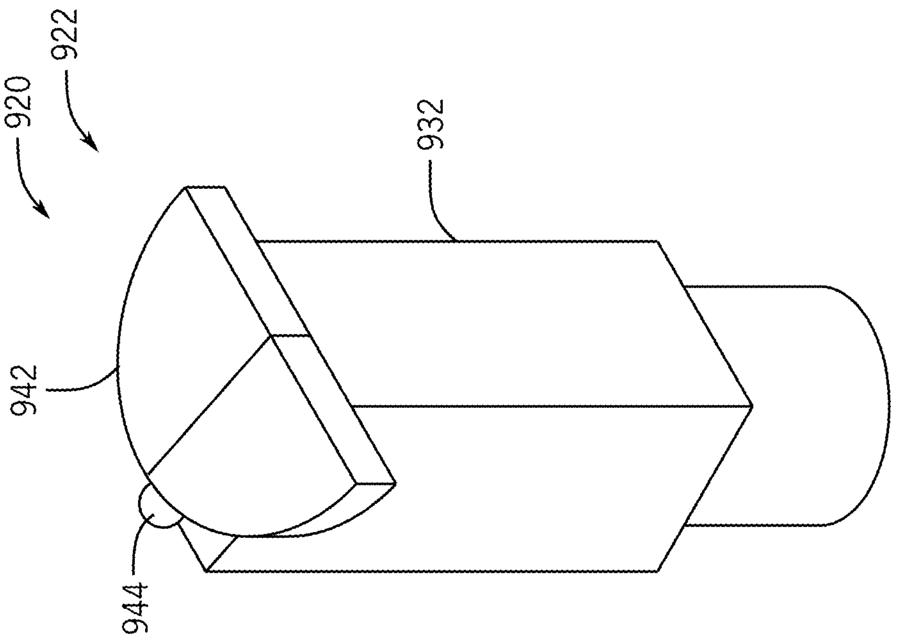
FIG. 70C is a perspective view of the variable deflector structure of FIG. 70 in a closed position.
Figure 70B:
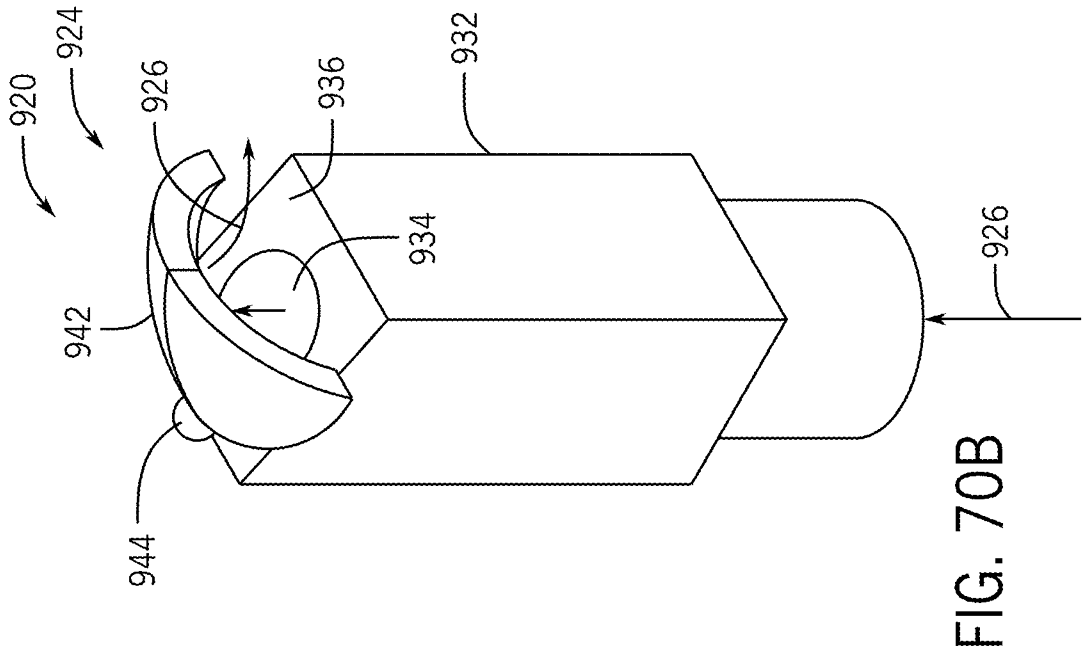
FIG. 70B is a perspective view of the variable deflector structure of FIG. 70 in an open position.

According to another exemplary embodiment shown in FIGS. 70A-70C, the toilet 20 may include a variable deflector structure 920 (e.g., a variable valve structure) to help flush and/or clean the bowl 32. The variable deflector structure 920 controls, directs, and shapes the flow of water as the water enters into the bowl 32. It should be appreciated that the variable deflector structure 920 may be similarly applied to the bowl 32' of the toilet 20', according to another exemplary embodiment. As shown in FIG. 70A, the variable deflector structure 920 is automatically movable between a closed position 922 (shown in FIG. 70C) and an open position 924 (shown in FIG. 70B), depending on whether fluid is flowing through the variable deflector structure 920.

The variable deflector structure 920 includes a nozzle 932 and a fluid passageway 934 that extends through and along the length of the nozzle 932. The variable deflector structure 920 allows fluid (e.g., liquid, such as water) to pass through the nozzle 932 within the passageway 934 and exit out of the top portion of the nozzle 932. The passageway 934 extends through a top surface 936 of the nozzle 932.

The variable deflector structure 920 also includes a lid 942 and a hinge 944. The lid 942 is positioned along the top surface 936 of the nozzle 932 and movably attached to the nozzle 932 through the hinge 944. The lid 942 is constructed out of a flexible material that can be curved due to the force of the liquid passing through the passageway 934, as described further herein. In the open position 924, the lid 942 is substantially spaced apart from the top surface 936 of the nozzle. In the closed position 922, the lid 942 is substantially flat and against and aligned with the top surface 936 of the nozzle 932, thus closing off access to the top of the passageway 934. The hinge 944 allows the lid 942 to move relative to the nozzle 932.

The variable deflector structure 920 may further include a spring that automatically pulls the lid 942 closed, and returns the variable deflector structure 920 back to the closed position 922, when not in use (e.g., when fluid is not flowing through the passageway 934).

When the variable deflector structure 920 is in the closed position 922 (as shown in FIG. 70C), the lid 942 is substantially flat against the top surface 936 of the nozzle 932, which prevents any debris from entering into the passageway 934 from the top of the nozzle 932. Once a liquid stream 926 is injected into the passageway 934 and starts to flow up through the passageway 934, the liquid stream 926 hits the bottom surface of the lid 942, thereby overcoming the force of the spring and forcing the lid 942 to move upward (i.e., away from the top surface 936 of the nozzle 932) about the hinge 944. This action moves the variable deflector structure 920 into the open position 924. As shown in FIG. 70B, as the liquid stream 926 exits vertically out of the top of the passageway 934, the liquid stream 926 is deflected by the lid 942 to move substantially horizontally outward.

Due to the flexibility of the lid 942 and the force of the liquid stream 926, the lid 942 arcs or curves upward as the top of the passageway 934 is opened and develops a curve such that the lid 942 has a non-flat impingement surface, where the impingement surface is the lower surface of the lid 942. The lid 942 is positioned such that the middle portion of the lid 942 is curved upward relative to the sides of the lid 942. The curve of the lid 942 shapes the liquid stream 926 to achieve a substantially laminar, horizontal flow that can reach all of the inner sides of the bowl 32. Accordingly, the curve of the lid 942 may shape the liquid stream 926 to have a dome-like shape.

When the liquid stream 926 slows down or stops flowing through the passageway 934, the spring helps move the lid 942 back down to the top surface 936 of the nozzle 932, thus moving the variable deflector structure 920 back into the closed position 922.

Figure 71:
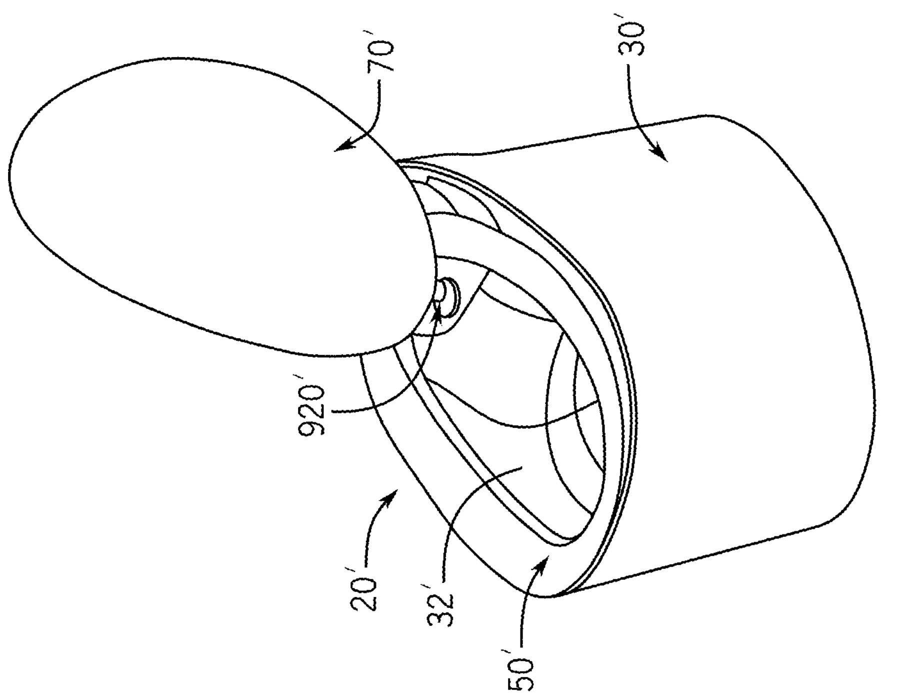
FIG. 71 is a perspective view of the toilet of FIG. 12 including a deflector structure according to another exemplary embodiment.
Figure 72A:
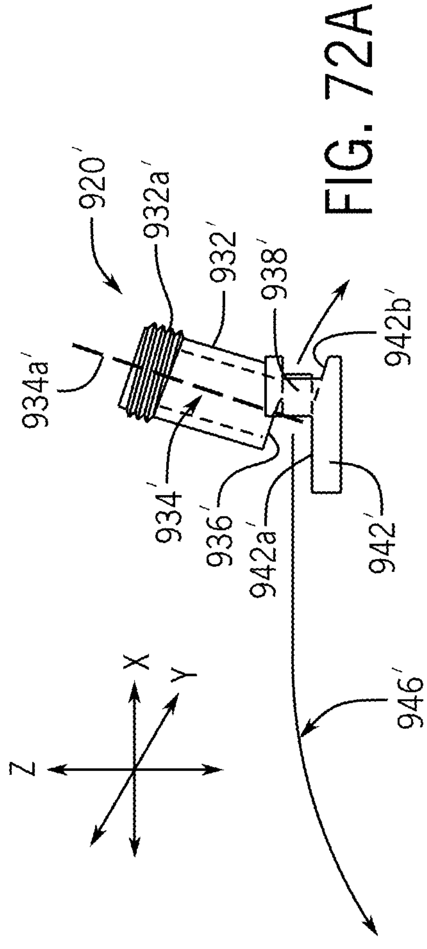
FIG. 72A is a partially transparent side view of the deflector structure of FIG. 71.
Figure 72B:
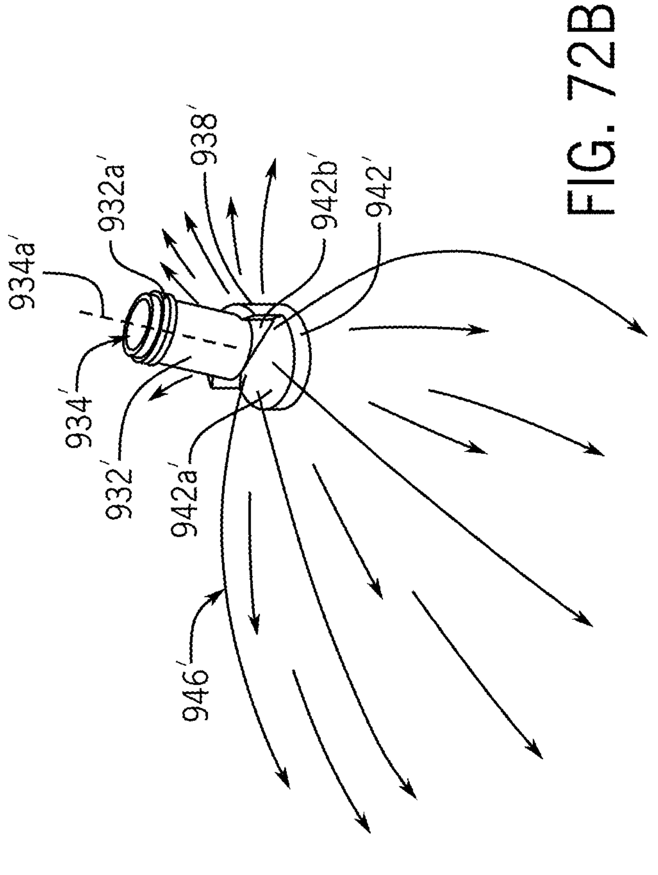
FIG. 72B is a perspective view of the deflector structure of FIG. 71.

Referring to FIGS. 71-72B, the toilet 20' is shown to include a deflector structure 920' to help flush and/or clean the bowl 32', according to another exemplary embodiment. The deflector structure 920' can control, direct, and shape the flow of water as the water enters into the bowl 32', similar to the variable deflector structure 920 discussed above. It should be appreciated that the deflector structure 920' may be similarly applied to the toilet according to another exemplary embodiment. As shown in FIG. 71, the deflector structure 920' is located at a rear portion of the bowl 32' near the back of the cover 70' and below the seat 50'. As shown in FIGS. 72A-72B, the deflector structure 920' includes a nozzle 932' that defines a fluid passageway 934' that extends through and along the length of the nozzle 932'. The nozzle 932' may include an attachment feature, shown as threads 932*a*', for coupling the nozzle 932' to the toilet 20', such as to a fluid conduit extending from a rear portion of the bowl 32' near the cover 70', although other fastening arrangements besides threads may be used, such as press-fit features, twist-and-locking features, bayonet features, etc. The fluid passageway 934' defines an axis 934*a*' that is oriented at an oblique angle between the x-axis and the z-axis (e.g., 45 degrees, etc.). The deflector structure 920' allows fluid (e.g., liquid, such as water) received from a fluid supply source (e.g., a household water supply, a toilet tank, etc.) to pass through the nozzle 932' within the passageway 934' and exit out of a bottom portion of the nozzle 932'. The passageway 934' extends through a bottom surface 936' of the nozzle 932'.

The deflector structure 920' further includes a lower member 942' coupled to or integrally formed with the nozzle 932' by an upper wall 938'. The upper wall 938' includes an opening at a rear portion thereof to allow for water to pass from the nozzle 932' through the upper wall 938' in a rearward direction. The nozzle 932' is oriented at an angle relative to the lower member 942', such that the majority of the water (e.g., greater than 50%, etc.) exiting from the nozzle 932' impinges on the lower member 942' and is directed in a forward direction toward a front of the toilet 20', which is indicated generally by arrows 946' in FIGS. 72A-72B. In this manner, the deflector structure 920' can direct water into the bowl 32' to perform a rinsing function.

Still referring to FIGS. 72A-72B, the lower member 942' defines a first upper impingement surface 942*a*' and a second upper impingement surface 942*b*' each spaced apart in a longitudinal direction (i.e., along the z-axis) from the bottom surface 936'. The first upper impingement surface 942*a*' is located forward of the nozzle 932' and the second upper impingement surface is located rearward of the nozzle 932'. The apex or joint between the first upper impingement surface 942*a*' and the second upper impingement surface 942*b*' is located at the opening of the passageway 934' adjacent the bottom surface 936', so as to direct water in both a forward and a rearward direction. The second upper impingement surface 942*b*' is oriented at an angle relative to the first upper impingement surface 942*a*', so as to direct water leaving the nozzle 932' at the bottom surface 936' in the rearward direction, opposite to the first upper impingement surface 942*a*' (forward direction). The lower member 942' is generally planar and has a generally cylindrical shape so as to help fan or distribute the water exiting the nozzle 932' to form a substantially laminar, horizontal flow of water 946'. The upper wall 938' is located along a side periphery of the lower member 942', so as to further help guide or direct water in either a forward or a rearward direction toward an interior of the bowl 32'. In this manner, the lower member 942' can, advantageously, help to achieve a substantially laminar, horizontal flow of water from the nozzle 932' that can reach all of the inner surfaces of the bowl 32'.

Water Layer Mechanism

Figure 74:
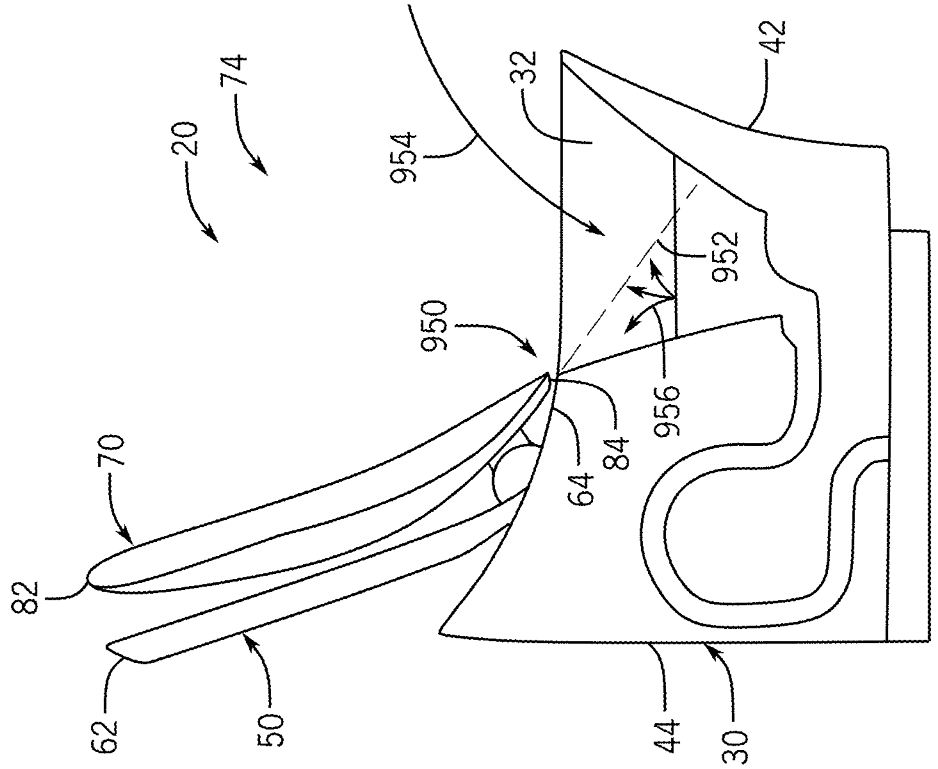
FIG. 74 is a side, cross-sectional view of the toilet of FIG. 1 with a water layer mechanism according to another exemplary embodiment.
Figure 73:
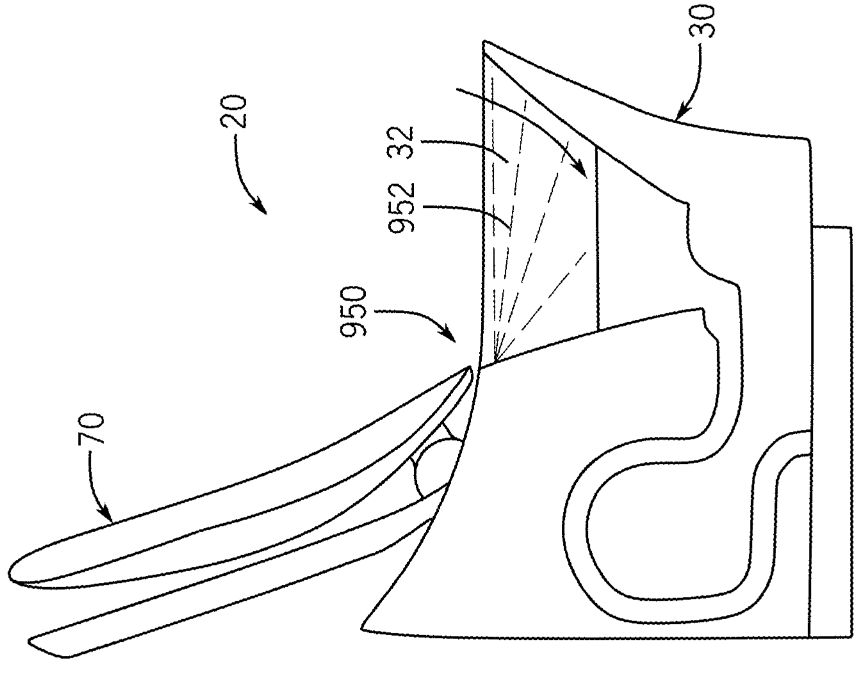
FIG. 73 is a side, cross-sectional view of the toilet of FIG. 1 with a water layer mechanism according to another exemplary embodiment.
Figure 75:
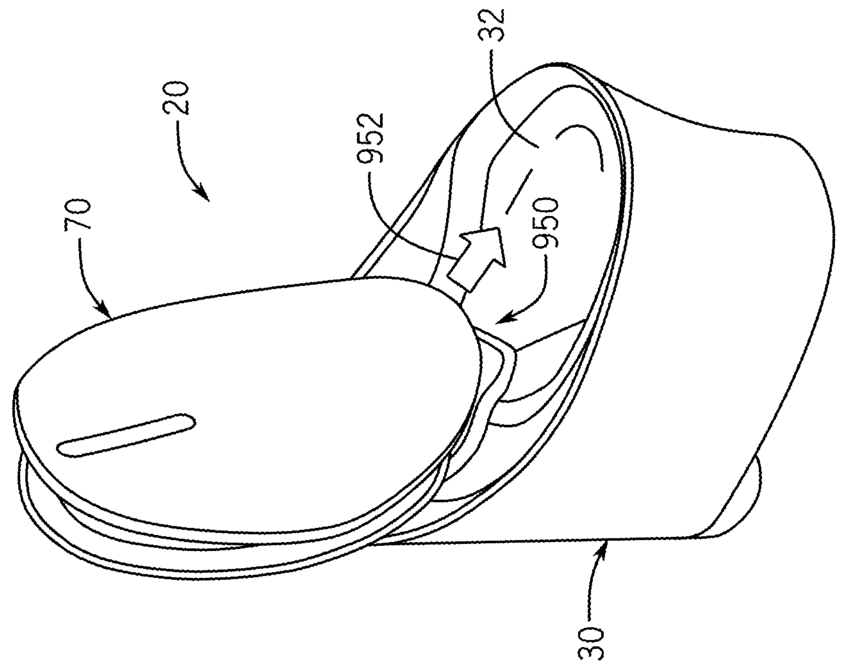
FIG. 75 is a perspective view of the toilet of FIG. 1 with a water layer mechanism according to another exemplary embodiment.

According to various embodiments shown in FIGS. 73-75, the toilet 20 may include a water layer mechanism 950 that is configured to dispense a water layer 952 into the bowl 32 as the toilet 20 is being flushed. The water layer 952 may be similar to the water layer 632, in particular with laminar flow, as described further herein. The water layer mechanism may be used alternately to or in addition to the flush mechanism 620 and/or the various components of the flush mechanism 620. It should be appreciated that the water layer mechanism 950 may be similarly applied to the toilet 20', according to another exemplary embodiment.

According to one embodiment shown in FIG. 73, in order to clean the toilet 20 more completely, the water layer mechanism 950 moves the water layer 952 in order to allow the water layer 952 to directly contact all of the inner sides of the bowl 32. Accordingly, when the toilet 20 is flushed, the water layer 952 directly contacts more (or all) of the inner sides of the bowl 32, rather than passively flowing down the inner sides of the bowl 32.

For example, according to one embodiment, the water layer mechanism 950 may slowly decrease the water pressure of the water layer 952 such that the water layer 952 naturally sweeps across the entire inner surface of the bowl 32, from top to bottom, as the water pressure decreases and the water layer 952 naturally lowers within the bowl 32. According to another embodiment, the water layer mechanism 950 has a movable mechanism that physically moves the nozzle through which the water layer 952 is directed, which aims the water layer 952 to different inner surfaces of the bowl 32 without decreasing the water pressure.

According to another embodiment as shown in FIG. 74, the water layer mechanism 950 is configured to continuously dispense the water layer 952 downward into the bowl 32 at an angle while the user is urinating (see urine 954) into the bowl 32. Accordingly, both the urine 954 and any resulting splash 956 from the urine 954 is absorbed into the water layer 952, which keeps the toilet 20 and the surrounding area more clean. The water layer 952 may have a lower water pressure in order to be directed more downward into the bowl 32. This same water layer 952 may also be used to help flush the toilet 20 by increasing the water pressure.

Furthermore, the water layer mechanism 950 may optionally be attached to or extend from the back end 84 of the cover 70 or the back end 64 of the seat 50. Alternatively, having the seat 50 in the stowed position 54 may change the aim or angle of the water layer 952 such that the water layer 952 is aimed or angled downwardly further into the bowl 32 when the seat 50 is in the stowed position 54, compared to when the seat 50 is in the use position 52.

According to another embodiment as shown in FIG. 75, the water layer mechanism 950 is configured to dispense the water layer 952 substantially parallel to the inner sides of the bowl 32. Accordingly, the water layer mechanism 950 orients the water layer 952 to flow along an inner side wall of the bowl 32 and subsequently flow around the entire inner perimeter of the bowl 32. Accordingly, the water layer 952 flows from a region of the bowl 32 near the back end 44 of the base 30 to a region of the bowl 32 near the front end 42 of the base 30, and back to the region of the bowl 32 near the back end 44 of the base 30. The water layer mechanism 950 may dispense the water layer 952 only to one side of the water layer mechanism 950, rather than both sides, such that all of the water from the water layer mechanism 950 flows in the same direction and swirls within the bowl 32.

The configuration of the water layer mechanism 950 in FIG. 75 can replace the conventional rim wash in conventional toilets and thus improves the structure and configuration of the toilet 20, as discussed further herein regarding the water layer dispenser 630 of the flush mechanism 620 that dispenses the water layer 632 across the opening of the bowl 32, rather than along the inner side walls of the bowl 32.

Figure 76:
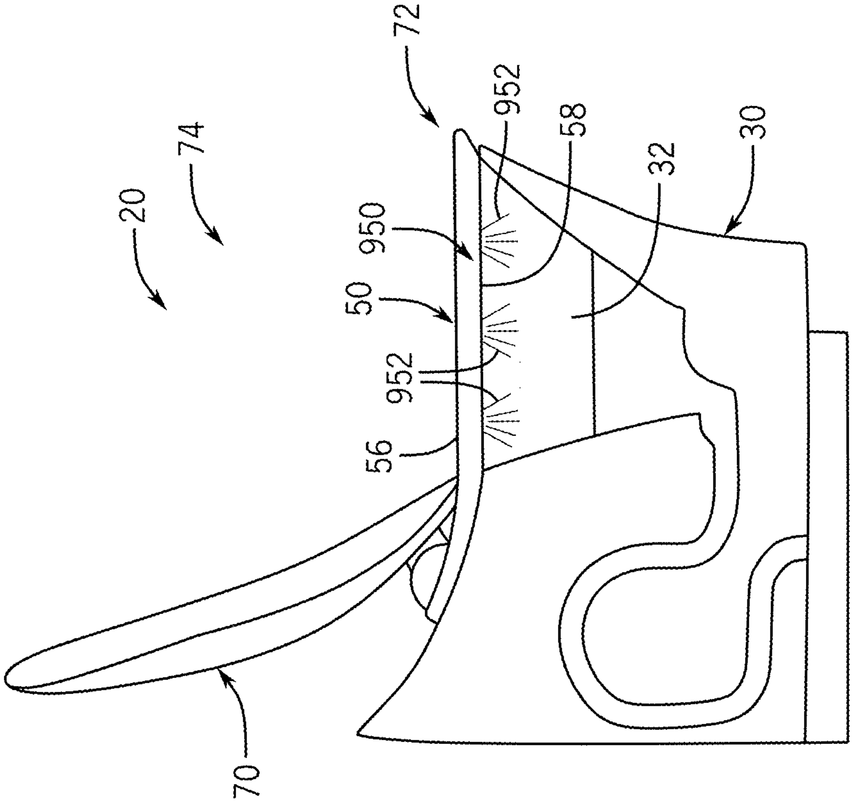
FIG. 76 is a side, cross-sectional view of the toilet of FIG. 1 with a water layer mechanism according to another exemplary embodiment.

According to another embodiment as shown in FIG. 76, the toilet 20 includes multiple water layer mechanisms 950 on the seat 50. Each of the water layer mechanisms 950 dispenses a water layer 952 into and toward the bowl 32 from the bottom surface 58 of the seat 50 while the seat 50 is in the lowered position 72, such that multiple water layers 952 are being dispensed into the bowl 32 at different areas about the inner perimeter of the bowl 32 from the seat 50 at the same time. These water layer mechanisms 950 help the toilet 20 to flush more cleanly. The water layer mechanisms 950 may be positioned intermittently about the majority of the perimeter of the seat 50.

According to another embodiment, the water layer mechanism 950 may provide a water layer 952 that is arced across a portion of the top opening of the bowl 32 and can be turned on while the user is sitting on the toilet 20 in order to allow the user to wash or rinse their hands within the bowl 32 while sitting on the toilet 20.

Foam Mechanism

Figure 77:
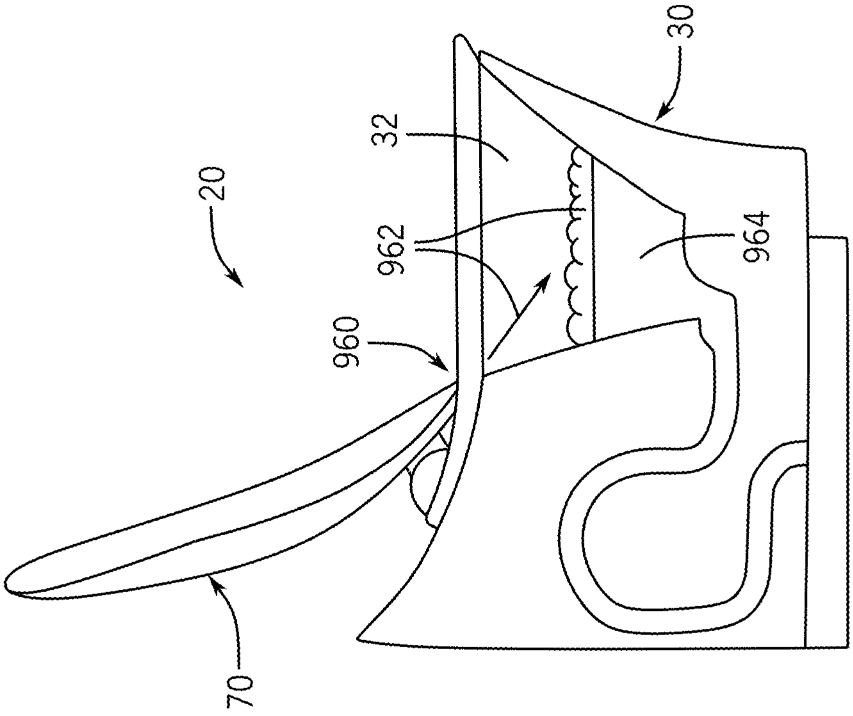
FIG. 77 is a side, cross-sectional view of the toilet of FIG. 1 with a foam mechanism according to one embodiment.

According to another exemplary embodiment shown in FIG. 77, the toilet 20 includes a foam mechanism 960 that dispenses foam 962 into the bowl 32 and thus covers any liquid 964 contained in the bowl 32. By interrupting the top surface of the liquid 964 within the bowl 32, the foam 962 mitigates how much the liquid 964 can splash (i.e., substantially prevents splash), in particular as a result of urination. It should be appreciated that the foam mechanism 960 may be similarly applied to the toilet 20', according to another exemplary embodiment.

The foam 962 may be manually or automatically dispensed. For example, the foam mechanism 960 may include a control that the user can push to dispense the foam 962 before going to the bathroom. Alternatively, or additionally, by moving the seat 50 from the lowered position 72 into the stowed position 74, the seat 50 may automatically trigger the foaming action of the foam mechanism 960 to dispense the foam 962 into the bowl 32.

Water Cushion Structure

Figure 78:
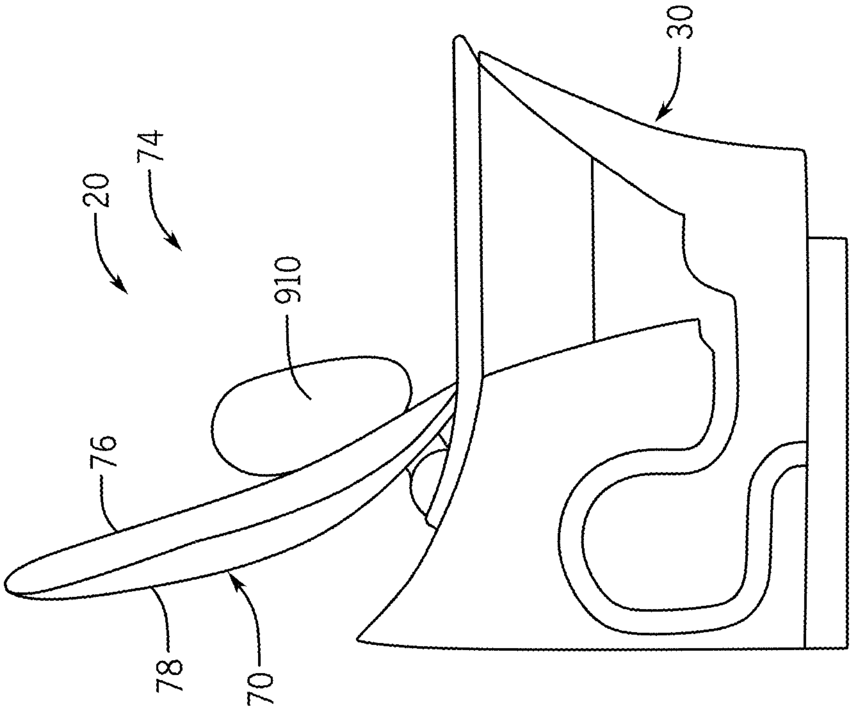
FIG. 78 is a side, cross-sectional view of the toilet of FIG. 1 with a water cushion structure according to one embodiment.

According to another exemplary embodiment shown in FIG. 78, the toilet 20 has a water cushion structure 910 that provides lumbar support to the user when the user leans back on the cover 70. The water cushion structure 910 is filled with water in order to provide lumbar support. It should be appreciated that the water cushion structure 910 may be similarly applied to the cover 70' of the toilet 20', according to another exemplary embodiment.

The water cushion structure 910 is positioned along the top surface 76 of the cover 70 such that, when the user is sitting on the seat 50 (in the lowered position 72), the user can lean back on and be supported by the water cushion structure 910. Since the water cushion structure 910 is filled with water, the water cushion structure 910 may automatically mold or adapt to the shape of the user's back for comfort.

Handwashing Station

Figure 80:
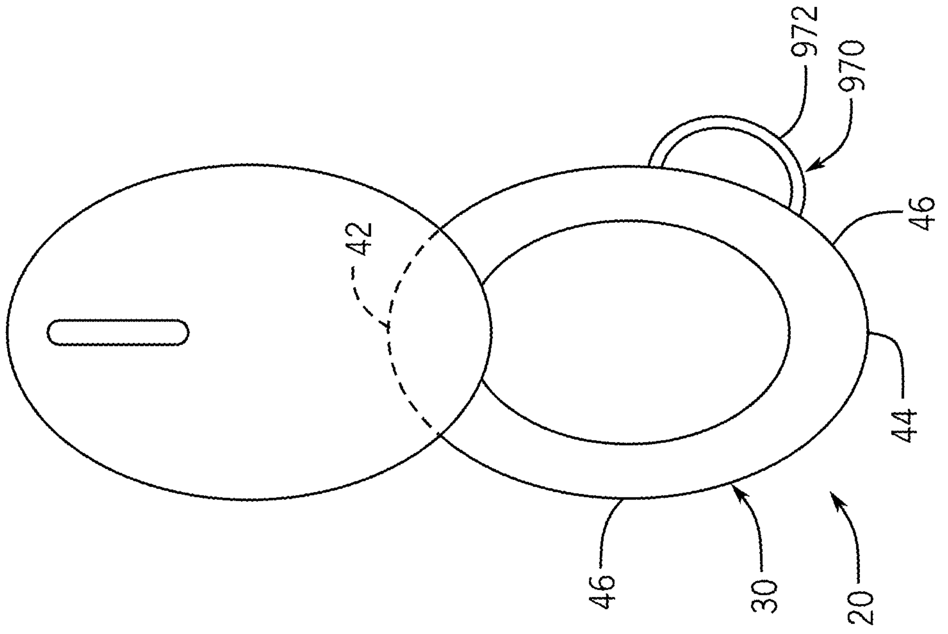
FIG. 80 is a top view of the toilet of FIG. 79.
Figure 79:
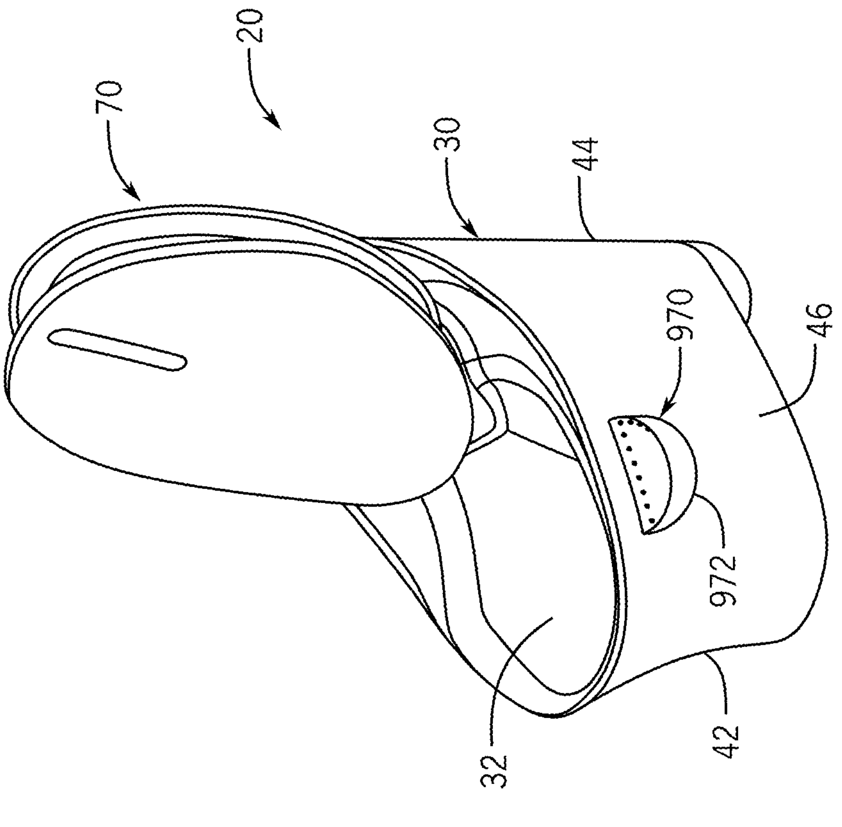
FIG. 79 is a perspective view of the toilet of FIG. 1 with a handwashing station.
Figure 81:
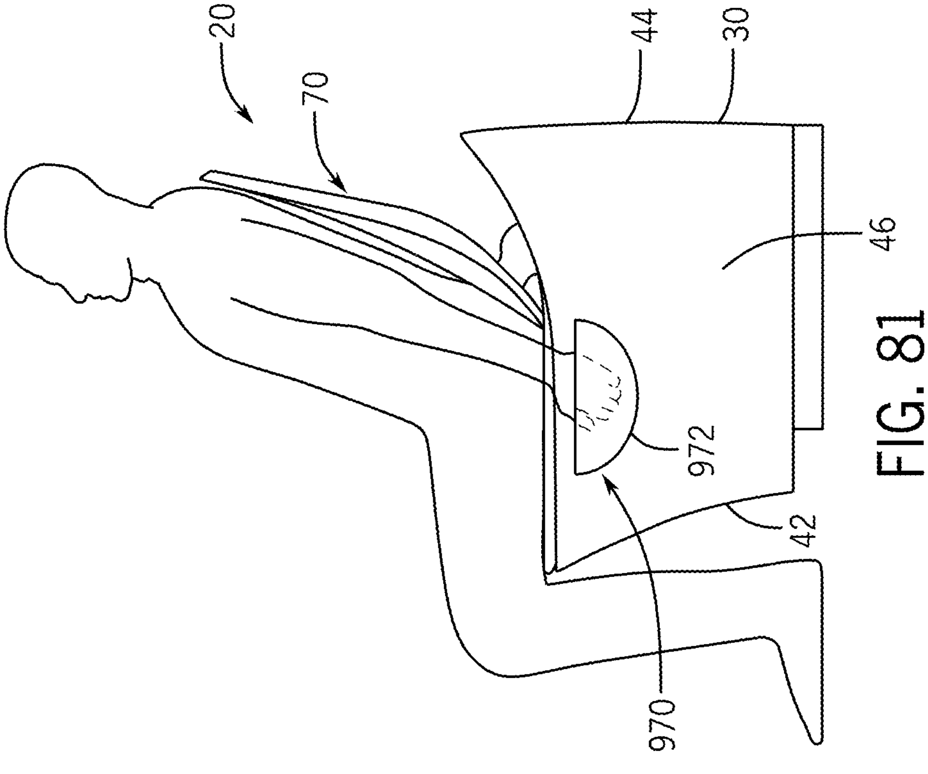
FIG. 81 is a side, cross-sectional and partially transparent view of the handwashing station of FIG. 79 being used.

According to another exemplary embodiment shown in FIGS. 79-81, the toilet 20 has a handwashing station 970 for the user to wash their hand(s) or quickly rinse off their hand(s) while sitting on the toilet 20. It should be appreciated that the handwashing station 970 may be similarly applied to the toilet 20', according to another exemplary embodiment.

As shown in FIGS. 79-80, the handwashing station 970 includes a basin 972 positioned along one of the sides 46 of the base 30. As shown in FIG. 80, the basin 972 may be positioned closer to the front end 42 of the base 30 in order to allow the user to easily reach the basin 972. The toilet 20 directs water into the basin 972. Accordingly, as shown in FIG. 81, a user can easily and conveniently reach their hand into the basin 972 while sitting on the seat 50 of the toilet 20 to wash or rinse their hand(s).

UV Light Cleaning Mechanism

Figure 82:
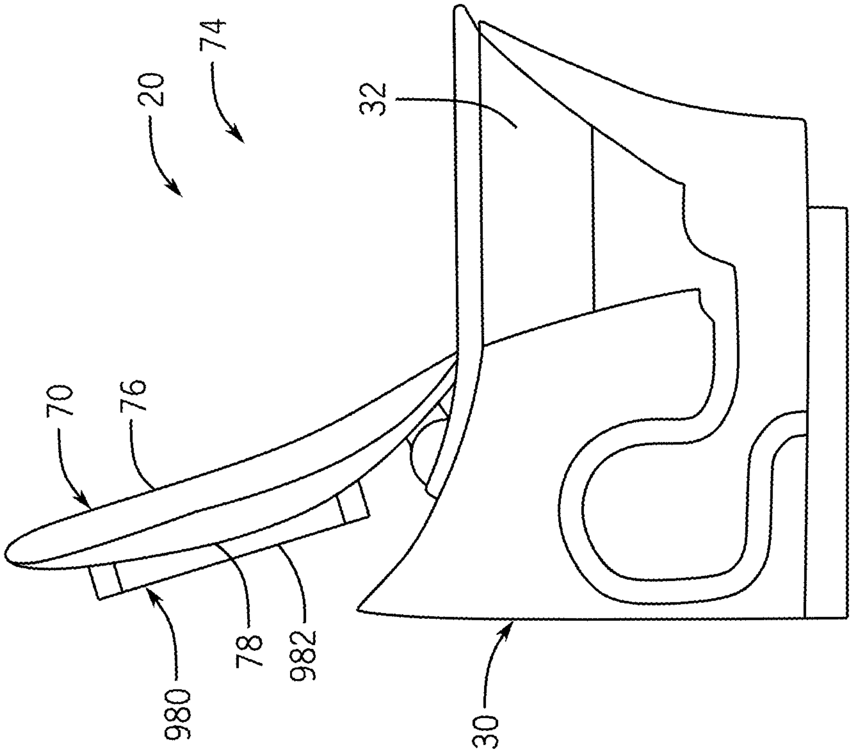
FIG. 82 is a side, cross-sectional view of the toilet of FIG. 1 with a UV light cleaning mechanism.

According to another exemplary embodiment shown in FIG. 82, the toilet 20 has an ultraviolet (UV) light cleaning mechanism 980 in order to clean the inside of the toilet 20 more easily and thoroughly, similar to the UV light source 80' of the toilet 20'. The UV light cleaning mechanism 980 can kill bacteria and microbes within the toilet 20 and is therefore anti-bacterial and anti-microbial.

As shown in FIG. 72, the UV light cleaning mechanism 980 is positioned along the bottom surface 78 of the cover 70. Accordingly, since the bottom surface 78 of the cover 70 is always hidden or facing away from the user due to the opening mechanism 120 (as described further herein), the UV light cleaning mechanism 980 is also always hidden and concealed from the user. Alternatively, the UV light cleaning mechanism 980 may be positioned along the bottom surface 58 of the seat 50.

The UV light cleaning mechanism 980 includes lights 982 that extend along at least a portion of the length of the cover 70 and may be molded or glued (with, for example, epoxy) to the cover 70.

The UV light cleaning mechanism 980 turns on (automatically or manually) when the cover 70 is moved into the lowered position 72 in order to disinfect the inside of the toilet 20 (e.g., within the bowl 32).

Figure 83:
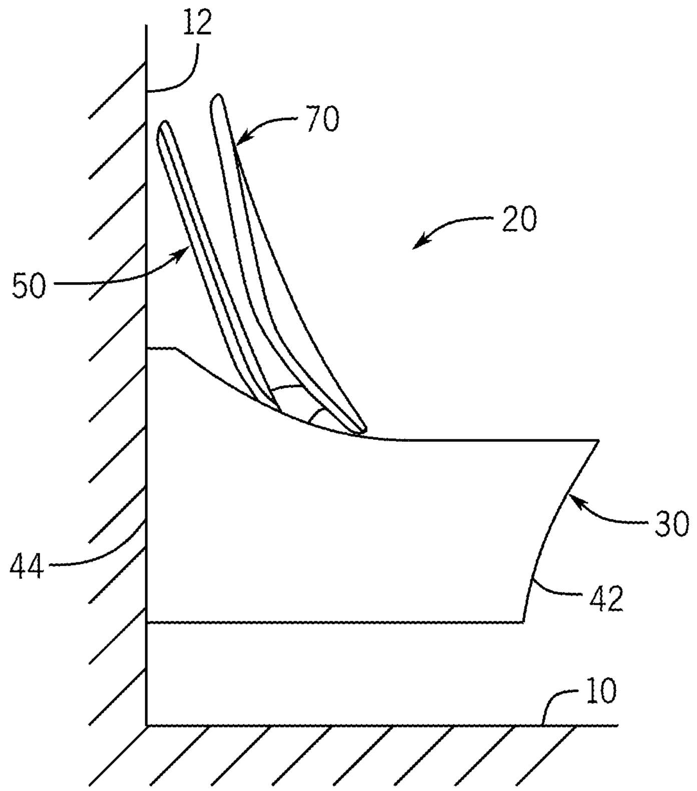
FIG. 83 is a side view of a toilet according to another exemplary embodiment.

As described further herein, the toilet may be positioned along, attached to, or mounted to a floor. However, according to another embodiment as shown in FIG. 83, the toilet 20 may be wall-hung or mounted on a wall 12 such that the entire toilet 20 is completely separated and spaced apart from the floor 10 (i.e., the toilet 20 does not contact the floor 10). The back end 44 of the base 30 of the toilet 20 may be attached to the wall 12. It should be appreciated that the toilet 20' may be similarly configured to be wall-hung or mounted on the wall 12 in a similar manner, according to another exemplary embodiment.

Figure 84:
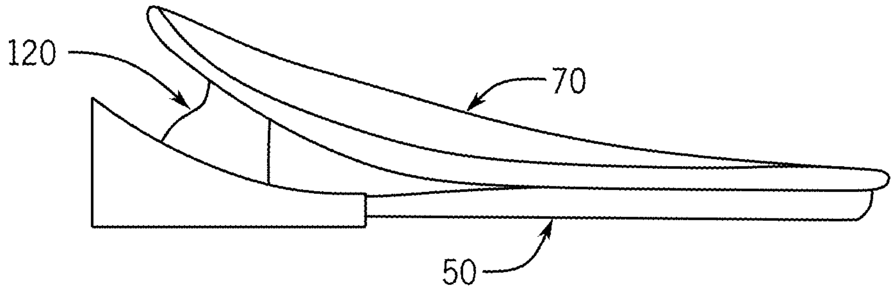
FIG. 84 is a side view of a cover and seat assembly of the toilet of FIG. 1 according to another exemplary embodiment.

Additionally, the various components of the toilet 20 may be used together or separately. Furthermore, various components of the toilet 20 may be add-on or replacement components on a conventional toilet. For example, as shown in FIG. 84, the seat 50 and/or the cover 70 (with or without the opening mechanism 120) may be added onto a conventional toilet after market. Optionally, the toilet 20 may include a quick release ring to allow the user to easily remove the whole seat 50 and/or cover 70 for easy cleaning. Furthermore, the various sources of liquid within the toilet 20 may have automatic shut-off valves that automatically close the liquid passageway when a portion of the toilet 20 (e.g., the seat 50) is removed to prevent liquid from leaking out. It should be appreciated that these features may be similarly applied to the cover 70' and the seat 50' of the toilet 20', according to another exemplary embodiment.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the toilet assembly as shown in the various exemplary embodiments is illustrative only. Additionally, any element disclosed in one embodiment may be incorporated or utilized with any other embodiment disclosed herein. For example, the various features, components, functions, and systems of the toilet 20 may be incorporated in the toilet 20' and vice versa. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A toilet comprising:

a base; and a seat rotatably coupled to the base;

a cover movable between a stowed position and a lowered position; and a bidet configured to retract into the cover to a retracted position and extend out of the cover to an extended position when the cover is in the stowed position.

2. The toilet of claim 1, wherein the bidet is configured to further extend to a second extended position.

3. The toilet of claim 1, further comprising:

a seat opening mechanism configured to move the cover and the seat relative to the base.

4. The toilet of claim 1, wherein the bidet is configured to clean the seat opening mechanism.

5. The toilet of claim 1, wherein the bidet includes upper nozzles pointed in a first direction and lower nozzles pointed in a second direction.

6. The toilet of claim 5, wherein the upper nozzles dispense water and the lower nozzle dispense chemical cleanser.

7. The toilet of claim 1, further comprising:

a motor configured to move the bidet between the retracted position and extended position.

8. The toilet of claim 7, wherein the motor receives instructions from a mobile communication device.

9. The toilet of claim 8, wherein the instructions cause the bidet to dispense water for cleaning a user, dispense water for cleaning the toilet, or dispense water for filling a bowl.

10. A toilet seat assembly comprising:

a seat;

a cover movable between a stowed position and a lowered position; and a bidet configured to retract into the cover to a retracted position and extend out of the cover to an extended position when the cover is in the stowed position.

11. The toilet seat assembly of claim 10, wherein the bidet is configured to further extend to a second extended position.

12. The toilet seat assembly of claim 10, wherein the bidet is configured to clean a seat opening mechanism for opening the seat and cover.

13. The toilet seat assembly of claim 10, wherein the bidet includes upper nozzles pointed in a first direction and lower nozzles pointed in a second direction.

14. The toilet seat assembly of claim 13, wherein the upper nozzles dispense water and the lower nozzle dispense chemical cleanser.

15. The toilet seat assembly of claim 10, further comprising:

a motor configured to move the bidet between the retracted position and extended position.

16. The toilet seat assembly of claim 15, wherein the motor receives instructions from a mobile communication device.

17. The toilet seat assembly of claim 16, wherein the instructions cause the bidet to dispense water for cleaning a user, dispense water for cleaning the toilet, or dispense water for filling a bowl.

18. A method for operation of a toilet, the method comprising:

generating a first control signal for opening a cover of the toilet from a lowered position to a stowed position; and generating a second control signal for extending a bidet wand from a retracted position inside of the cover to an extended position out of the cover when the cover is in the stowed position.

19. The method of claim 18, further comprising:

generating a third control signal to cause the bidet to dispense water for cleaning a user.

20. The method of claim 18, further comprising:

generating a third control signal to cause the bidet to dispense water for cleaning the toilet or dispense water for filling a bowl.

* * * * *